US006487570B1

(12) United States Patent
Forcier

(10) Patent No.: US 6,487,570 B1
(45) Date of Patent: Nov. 26, 2002

(54) SCRIPT CHARACTER PROCESSING METHOD FOR AUTOMATICALLY SUPPLEMENTING BLANK WRITING SPACE

(75) Inventor: Mitchell D. Forcier, Walnut Creek, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/175,055

(22) Filed: Oct. 19, 1998

Related U.S. Application Data

(60) Division of application No. 09/090,761, filed on Jun. 4, 1998, now Pat. No. 5,953,735, which is a division of application No. 08/711,906, filed on Sep. 12, 1996, which is a division of application No. 08/077,293, filed on Jun. 14, 1993, now Pat. No. 5,590,257, which is a continuation-in-part of application No. 07/693,316, filed on Apr. 29, 1991, now Pat. No. 5,220,649, which is a continuation-in-part of application No. 07/673,292, filed on Mar. 20, 1991, now Pat. No. 5,231,698.

(51) Int. Cl.$^7$ .............................................. G06F 17/21
(52) U.S. Cl. ........................ 707/541; 707/530; 707/531
(58) Field of Search ................................ 707/530, 531, 707/541; 382/13, 186

(56) References Cited

U.S. PATENT DOCUMENTS

| | | | | |
|---|---|---|---|---|
| 3,676,856 A | * | 7/1972 | Manly | 395/419.17 |
| 3,688,275 A | * | 8/1972 | Frederickson et al. | 395/146 |
| 3,714,636 A | * | 1/1973 | Manly | 395/148 |
| 3,739,348 A | * | 6/1973 | Manly | 395/117 |
| 4,440,513 A | * | 4/1984 | Kataoka et al. | 382/187 |
| 4,538,183 A | * | 8/1985 | Kanno et al. | 358/452 |
| 4,616,327 A | * | 10/1986 | Rosewarne et al. | 395/135 |
| 4,723,211 A | * | 2/1988 | Barker et al. | 395/147 |
| 4,727,588 A | | 2/1988 | Fox et al. | 382/13 |
| 4,802,104 A | * | 1/1989 | Oglso | 395/153 |
| 4,839,634 A | | 6/1989 | More et al. | 345/173 |

(List continued on next page.)

OTHER PUBLICATIONS

PenPoint Application Development Guide, Go Corp., Foster City, CA, pp. 27–29, Jan. 1991.*
Using PenPoint Developer Release, Beta Edition, pp. 34–64, Go Corp., Foster City, CA, Jan. 1991.*
PenPoint™ Application Development Guide, GO Corporation, Foster City, California, pp. 27–29, published Jan. 1991.
Using PenPoint Developer Release, Beta Edition, pp. 36–64, GO Corporation, Foster City , California, published Jan. 1991.

*Primary Examiner*—Stephen S. Hong
(74) *Attorney, Agent, or Firm*—Law Offices of Albert S. Michalik, PLLC

(57) ABSTRACT

A pen-based processor needs to be usable to input and edit script like a text-based computer but retain a resemblance to the user of a pad and pencil. The disclosed system and method implement input, editing and other manipulation of glyphs including handwritten script, ASCII test, bit-mapped images and drawings in a common document, using a compatible internal representation of the data and a simple, consistent set of user control functions. These functions are invoked using an intuitive and interactive set of user gestures which do not distract the user from the task of inputting or editing the document. A two-step gesture method avoids confusion between strokes and command gestures and allows use of similar gestures for different functions within the same and different contexts. The system infers from customary user writing conventions that certain relationships of data are to be preserved and maintains the relationships, subject to user override, during editing. The display document is formatted to contain lined or unlined areas of glyphs that can be edited, including insertion of a moving space into pre-existing document text and word wrapping. Adjoining drawing areas are unaffected by editing of text data.

14 Claims, 52 Drawing Sheets

U.S. PATENT DOCUMENTS

| | | | | |
|---|---|---|---|---|
| 5,063,600 A | | 11/1991 | Norwood | 382/186 |
| 5,220,649 A | * | 6/1993 | Forcier | 395/148 |
| 5,231,698 A | * | 7/1993 | Forcier | 395/146 |
| 5,297,216 A | * | 3/1994 | Sklarew | 382/189 |
| 5,313,527 A | * | 5/1994 | Guberman et al. | 382/186 |
| 5,321,770 A | * | 6/1994 | Huttenlocher et al. | 382/174 |
| 5,396,566 A | * | 3/1995 | Bruce et al. | 382/187 |
| 5,479,596 A | | 12/1995 | Capps et al. | 707/539 |
| 5,517,578 A | | 5/1996 | Altman et al. | 382/181 |
| 5,528,743 A | | 6/1996 | Tou et al. | 707/541 |
| 5,596,350 A | | 1/1997 | Capps et al. | 345/173 |
| 5,613,019 A | | 3/1997 | Altman et al. | 382/311 |
| 5,633,957 A | | 5/1997 | Robinson | 382/292 |

* cited by examiner

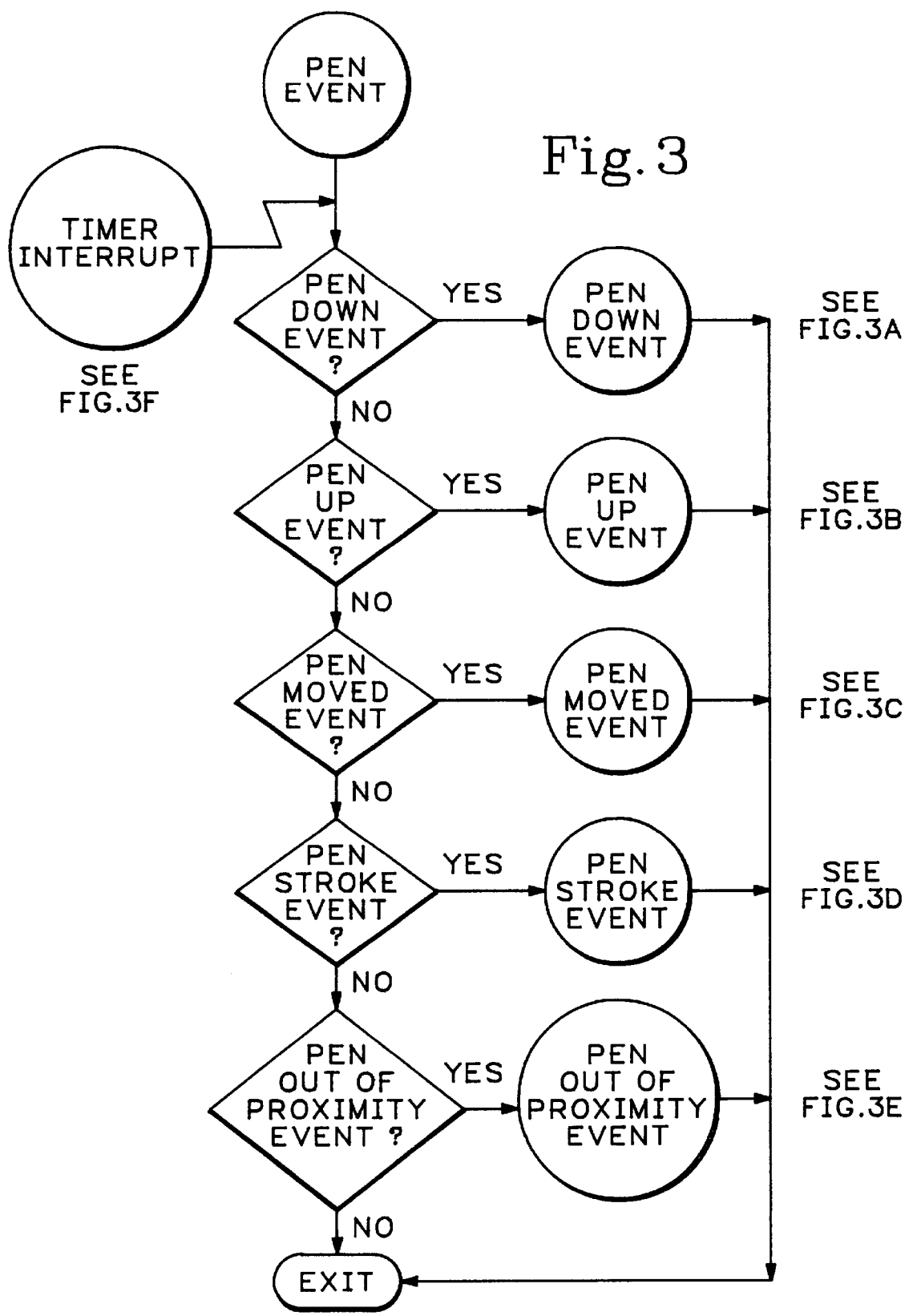

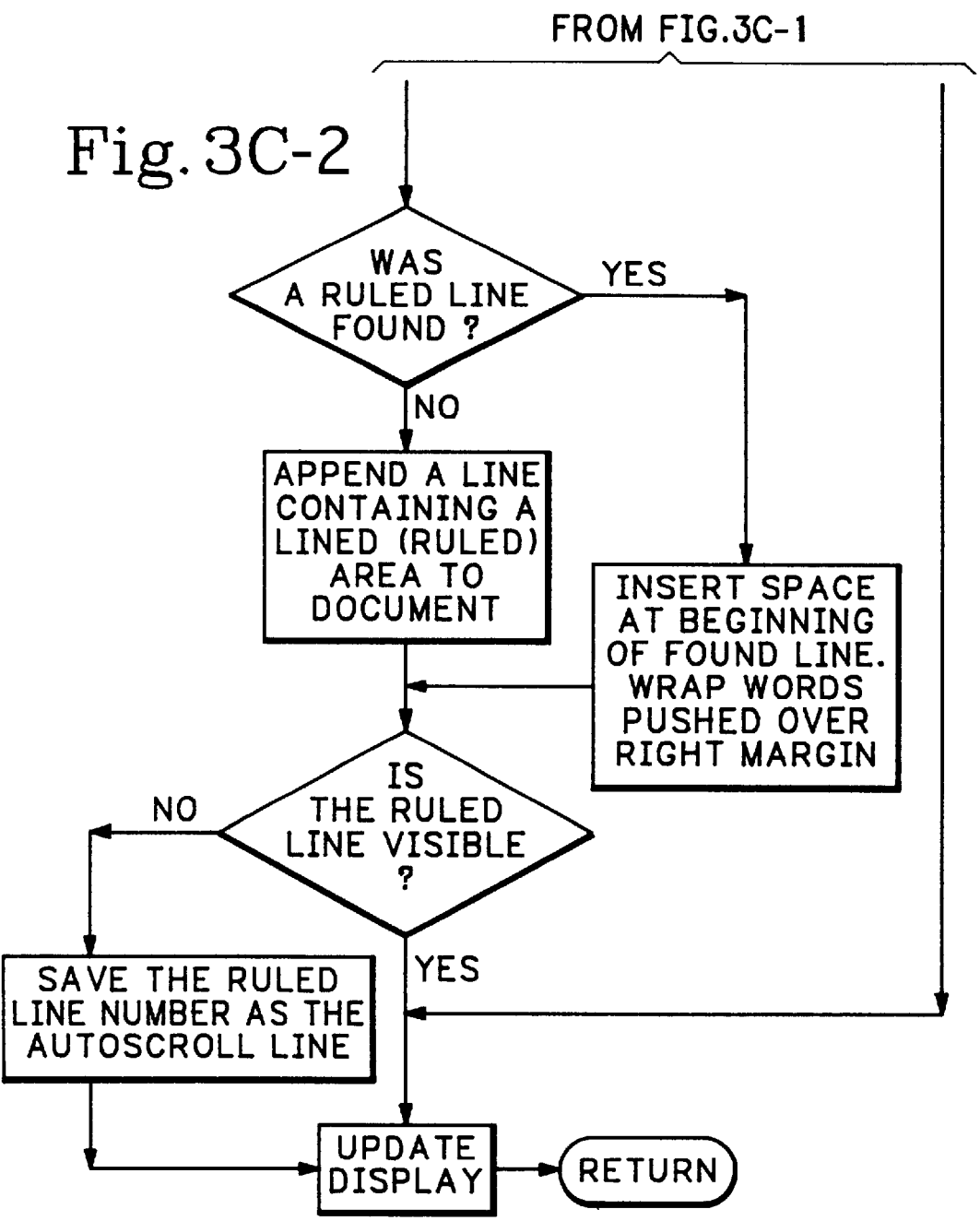

| GESTURE PROMPT | GESTURE | |
|---|---|---|
| EDIT ●⤴ 50 | PEN UP | ROPE SELECT<br>○ STRETCHING BOX SELECT<br>⌐ MARK BLOCK<br>← DELETE LINE CONTENTS/DELETE LINE<br>→ INSERT BOL MARKER/INSERT LINE<br>↓ DELETE SPACE/STROKES/BOL MARKER<br>↑ INSERT SPACE<br>INSERT MOVING SPACE |
| SELECT ⤴52 | PEN UP | ROPE SELECT<br>○ STRETCHING BOX SELECT<br>⌐ MARK BLOCK<br>← SELECT LINE UPWARD<br>→ SELECT LINE DOWNWARD<br>↓ SELECT STROKES TO THE LEFT<br>↑ SELECT STROKES TO THE RIGHT<br>SELECT WORD/OBJECT |

Fig. 4I

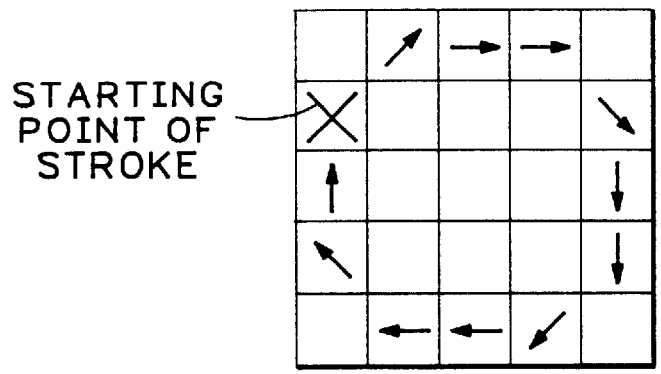
Fig.6B
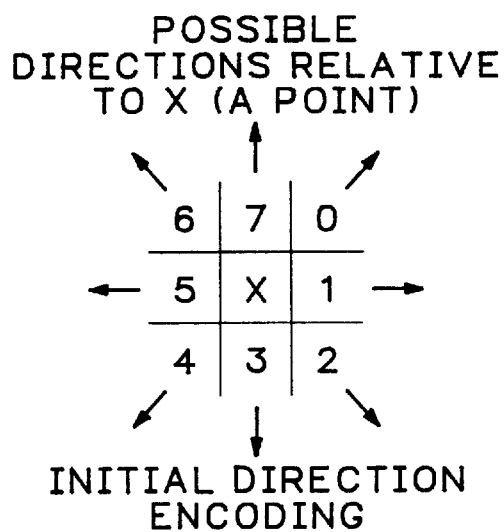
Fig.6C
| 3 | 2 | 3 |
|---|---|---|
| 2 | 1 | 2 |
| 3 | 2 | 3 |
'L' FORMATION
DETECTION MATRIX
Fig.6D

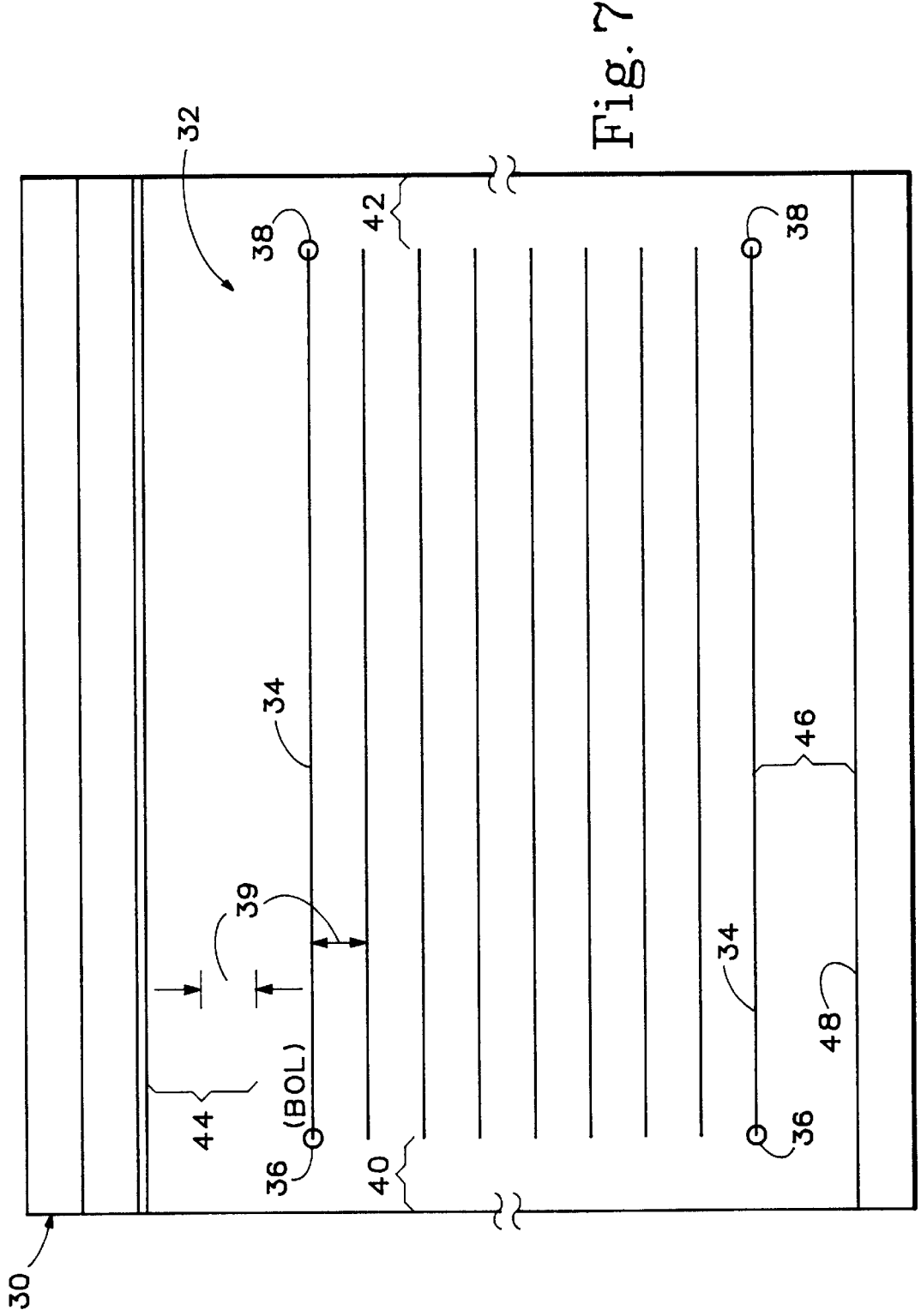

FIG. 12A

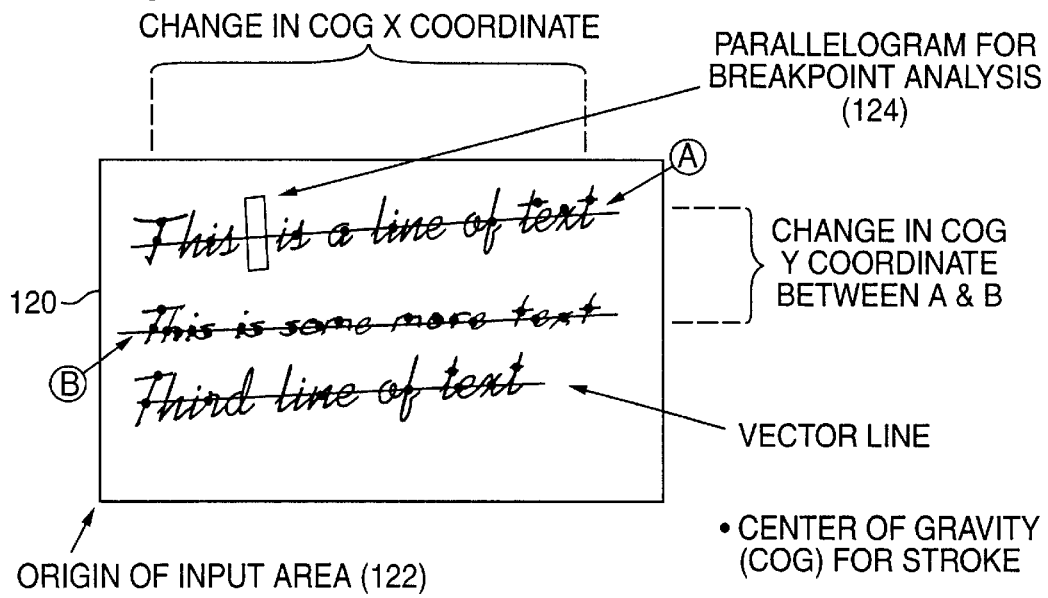

CHANGE IN COG X COORDINATE

PARALLELOGRAM FOR BREAKPOINT ANALYSIS (124)

CHANGE IN COG Y COORDINATE BETWEEN A & B

VECTOR LINE

• CENTER OF GRAVITY (COG) FOR STROKE

ORIGIN OF INPUT AREA (122)

FIG. 12B

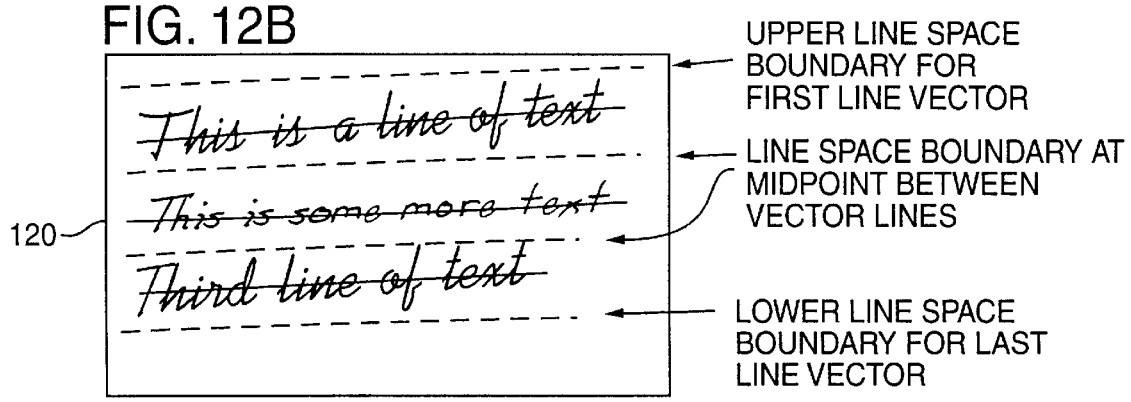

UPPER LINE SPACE BOUNDARY FOR FIRST LINE VECTOR

LINE SPACE BOUNDARY AT MIDPOINT BETWEEN VECTOR LINES

LOWER LINE SPACE BOUNDARY FOR LAST LINE VECTOR

FIG. 12C

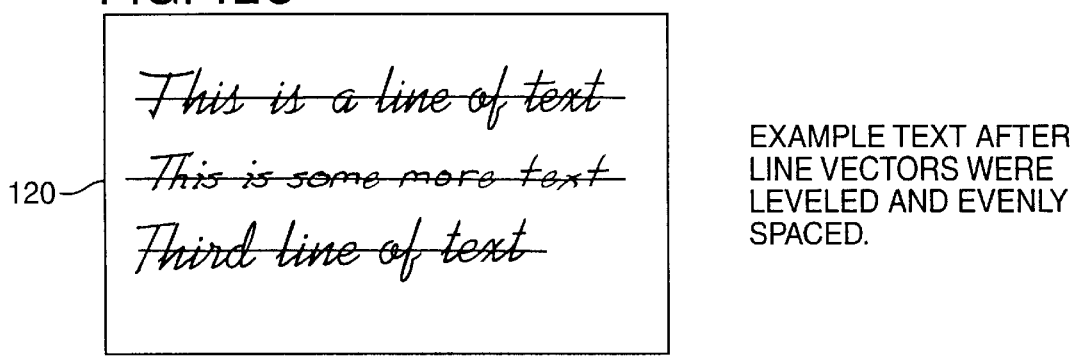

EXAMPLE TEXT AFTER LINE VECTORS WERE LEVELED AND EVENLY SPACED.

EXAMPLE OF WORDS WRAPPING FROM ONE COLUMN OF LINE VECTORS TO ANOTHER.

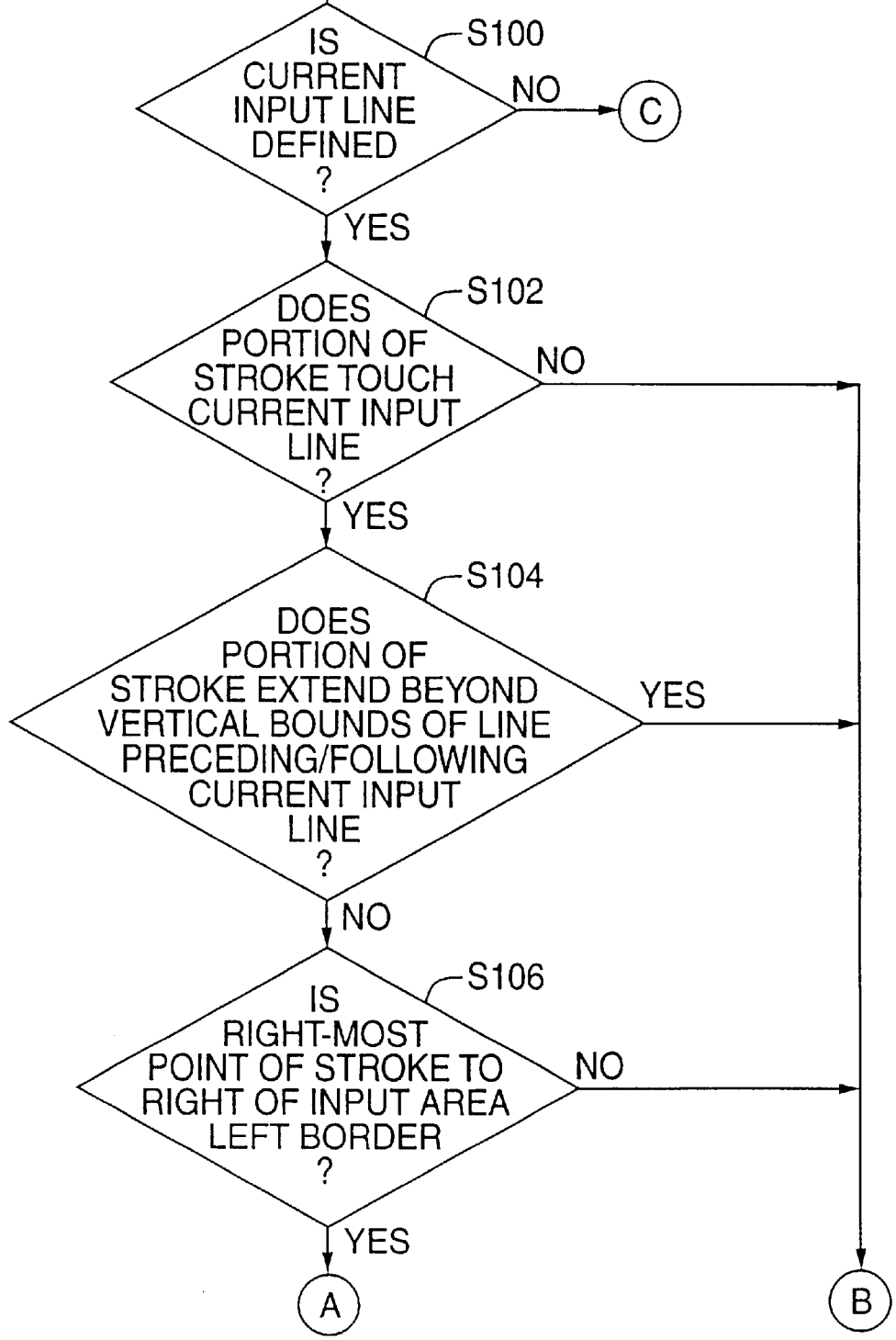

FIG. 19A

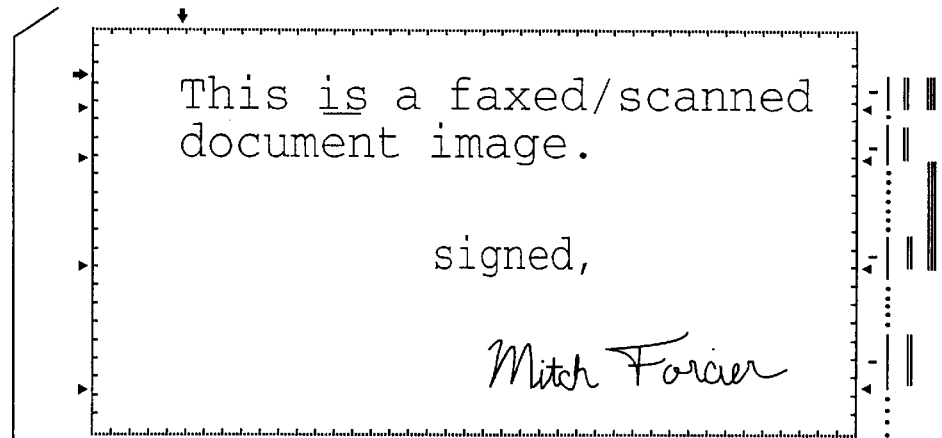

LEGEND
1. | ROWS CONTAINING VISIBLE POINTS FOR THE LINE OF TEXT
2. - MIDDLE ROW OF GROUP OF ROWS USED BY LINE OF TEXT
3. : SEPARATION WHITESPACE
4. ‖ ROWS ABOVE BASELINE THAT CONTAIN VISIBLE POINTS
5. ⫼ LINE HEIGHT
6. ▸◂ BASELINE
7. ▲ LEFT/RIGHT MARGIN
8. → TOP-MOST ROW CONTAINING VISIBLE POINTS (ROW 1)
9. ↓ LEFT-MOST VISIBLE POINT ON DOCUMENT IMAGE (POSITION 1)

FIG. 19B

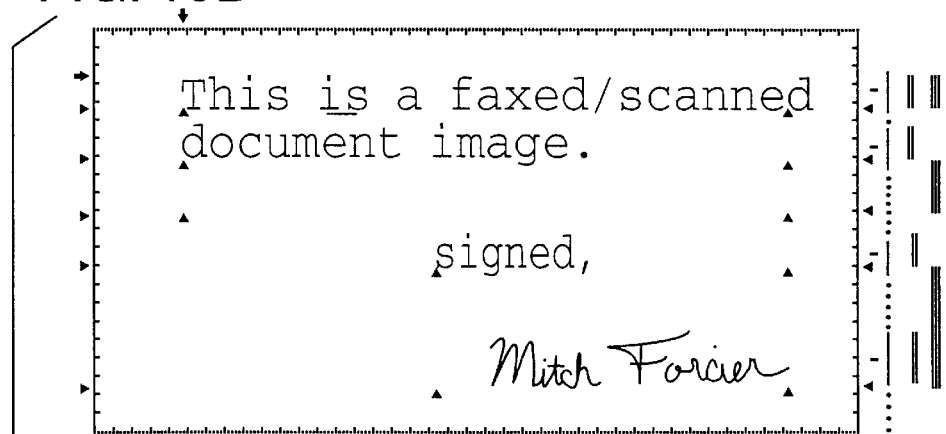

LEGEND
1. | ROWS CONTAINING VISIBLE POINTS FOR THE LINE OF TEXT
2. - MIDDLE ROW OF GROUP OF ROWS USED BY LINE OF TEXT
3. : SEPARATION WHITESPACE
4. ‖ ROWS ABOVE BASELINE THAT CONTAIN VISIBLE POINTS
5. ⫼ LINE HEIGHT
6. ▸◂ BASELINE
7. ▲ LEFT/RIGHT MARGIN
8. → TOP-MOST ROW CONTAINING VISIBLE POINTS (ROW 1)
9. ↓ LEFT-MOST VISIBLE POINT ON DOCUMENT IMAGE (POSITION 1)

SCRIPT CHARACTER PROCESSING METHOD FOR AUTOMATICALLY SUPPLEMENTING BLANK WRITING SPACE

RELATED APPLICATION DATA

This application is a division of U.S. application Ser. No. 09/090,761, filed Jun. 4, 1998, now U.S. Pat. No. 5,953,735, issued Sep. 14, 1999, which is a division of U.S. Ser. No. 08/711,906, filed Sep. 12, 1996, which is a division of application Ser. No. 08/077,293, filed Jun. 14, 1993, now U.S. Pat. No. 5,590,257, issued Dec. 31, 1996, which is a continuation-in-part of U.S. Ser. No. 07/693,316, filed Apr. 29, 1991, now U.S. Pat. No. 5,220,649, issued Jun. 15, 1993, which is a continuation-in-part of U.S. Ser. No. 07/673,292, filed Mar. 20, 1991, now U.S. Pat. No. 5,231,698, issued Jul. 27, 1993.

BACKGROUND OF THE INVENTION

This invention relates generally to pen-based computer systems and more particularly to an interactive method for entry and editing of script, text and drawings in a document display.

Script refers to handwritten characters and words. Text refers to typewritten characters and words and includes binary-encoded characters such as ASCII text. Drawings refers to hand drawn sketches but can also include imported drawings originally drawn by or on a machine.

Existing pen-based systems use gestures to edit exclusively script or ASCII text (i.e., not both interchangeably or simultaneously). They are limited, moreover, to gestures that by their form, context, or location can be distinguished from the data that they act upon. For instance, free-form gestures applied to ASCII text are recognizable because the ASCII exists in what can be termed a different plane. Free form gestures applied to selected script are recognizable because pen actions following a selection are assumed to be gestures OR because writing applied to a selected area is assumed to be a gesture. Free-form gestures occurring within a gesture sensitive area of the screen are easily recognized. Otherwise, prior systems require an explicit action to initiate gesture recognition especially within script such as selection of text or scrip or keyboard or similar input of a control command. One could alternatively designate a set of unique strokes to define gesture commands, but this approach requires interpretation of all strokes during script entry which is compute-intensive and virtually precludes mixing script, ASCII text and sketches.

Editing of untranslated script in existing systems is typically restricted to opening up space between characters or words, erasing characters or words, and applying enhancements to pieces of script (e.g., underline, bold, etc.). No known prior pen-based system enables script words to be word-wrapped, let alone doing it with mixed script and ASCII text. Developers have probably been reluctant to attempt script word wrap for the following reasons:

Processing strokes consumes a lot of CPU time making it difficult to provide whole screen word wrapping reflow and display in a timely manner.

Strokes consume a lot of memory.

A word wrapping algorithm for handwritten script is unheard of, to say nothing of one that can maintain the user's spacing of strokes (words).

A technique is not available for opening space within a line of script for the user to write additional script and automatically providing more writing space as the user writes (i.e., a "moving" space).

Certain pieces of information that delimit paragraphs and preserve horizontal/vertical whitespace during word wrap must somehow exist within the script document. The common approach to adding this sort of information to a document involves explicitly delimiting paragraphs and specifying whitespace, neither of which is conducive to the free flow of thoughts while writing.

Mixing ASCII and script text with graphics requires a gesture set that functions the same with both types of text and is not confused with script writing or graphics drawing. Mixing ASCII with script text in the same edit plane is not known to have been done before, although systems are known in which a script annotation plane allows users to overlay existing ASCII documents with script comments.

ASCII text editing systems have typically been character-based, using a cursor to control positioning. Script, by its nature, makes character-based editing very difficult. A cursor is not needed with script because of the direct referencing characteristics of a pen. A system that mixes both script and ASCII text must be able to handle the character nature of ASCII as well as the free-form nature of script.

Script is composed of strokes-pen movements captured as the stylus traces a character outline on a digitizing tablet. A script character can contain one or more strokes. Each stroke must be captured and its characteristics maintained in a stroke database. The typical method for this is called the time-order method. The time-order method has limitations, however. This method can lead to misinterpreted characters, depending on how the characters are created. Accordingly, a new approach is required which would eliminate the ordering of strokes merely by the point in time in which they are created.

Another drawback to current art for capturing pen-based stroke data input is the inability of current systems to wrap words and maintain predesignated spacing between words that have wrapped on to a subsequent line. This causes a loss of the user's writing characteristics, resulting in material that is less readable to the person who wrote it. Accordingly, a method is required to maintain predesignated space between words after word wrapping to successive lines occurs.

A system could determine the amount of space between script words by monitoring stroke data input in real time; analyzing the data using pattern recognition techniques, and accordingly developing a method for identifying word separation space. This, however, requires complex software and hardware capability beyond that of the typical pen-based technology commercially available. Accordingly, a method is required which reliably captures word spacing without complex computer analysis of stroke data.

Bit-mapped images, such as those produced by scanners or facsimiles, also create unique problems for pen-based computers. Current pattern recognition techniques convert the bit-mapped image into ASCII text. Once in the ASCII format, however, there is no practical method of incorporating script into the converted document. The ability to combine both ASCII and script in a bit-mapped image is highly desirable. For example, revisions could simply be made on a received FAX image and "FAXed" back to the originator of the FAX. This method would allow revisions to be made electronically to the FAX image without requiring a hardcopy of the FAX.

Accordingly, a need remains for a better way to enter, store, manage and edit handwritten script, or preferably script and binary-encoded text, in a pen-based computer system, and moreover a need remains for a way to combine script and bit-mapped documents.

SUMMARY OF THE INVENTION

One object of the invention is to provide an improved pen-based computer system and script editing process.

Another object is to recognize glyph character clusters or units that might represent words or embedded drawings.

A related object is to ascertain word boundaries in order to perform word editing functions such as word wrap while maintaining the user's word spacing.

Another object is to provide an intuitive interactive user interface for a pen-based computer.

A further object is to specify editing commands within freeform script/drawings such that the commands are not confused with the script/drawings and the user interface retains the look and feel of a piece of paper.

An additional object is to interpret the meaning of script/ASCII text positions within a document being written or a document that has been scanned/FAXed and provide editing features without destroying the subtle information inherent in the layout of a page of text.

Yet another object is to enable a user to continually enter data into a document, including into pre-existing script or text, without having to perform explicit actions to acquire additional open (blank) writing space.

A script/binary-encoded-character processor (or simply script/text processor) preferably includes a script/ASCII text editor, support for creating drawings, and optionally an outliner. The processor also has simple page layout capabilities implemented through vertical and horizontal margin settings.

The basic script or script/text processing method can be implemented in a variety of software forms suited to different operating systems such as PenPoint from GO Corp. of Foster City, Calif., and PenWindows from Microsoft Corp. of Bellevue, Wash., or without an operating system but with similar program features for accessing and controlling hardware components. The processor can provide character/word translation into ASCII text using, e.g., GO Corp. software. A wide range of hardware configurations can be used to implement the processor of the invention.

Input to the script/text processor can take many forms: writing with a pen (stylus) on a digitizer connected to a computer; existing or stored documents; documents from character (keyboard) based word processors; FAX transmissions and scanned documents. A word processor specific program converts the character-based document to a form recognizable by the processor. The FAX contents are recognized by the script/text processor and converted to the processor document format. The same algorithm that recognizes FAX contents will recognize the contents of scanned images.

Output from the processor can likewise take many forms including: script/text documents; ASCII files; printed images; FAX transmissions.

Input/Output to the processor can be from/to a storage medium (e.g., a disk) or some sort of network connection (e.g., a LAN or telephone lines). The processor software can be implemented in a concurrent version that allows multiple computer users to interactively edit the same document.

One aspect of the invention is that an efficient stroke compression algorithm is provided, so that documents can contain many pages of untranslated script, as well as ASCII text. Since pen strokes can be captured at high resolutions (200+ dots per inch), the method of compressing strokes was devised so as to retain the information needed to perform translation of script into "ASCII" characters. A method for converting FAX or scanned documents into the script/text document format is also described. The compression method commences with the "root" of each stroke, which is defined relative to the line space to which the stroke is connected. Strokes are preferably rooted in the line space where the pen first touched when the stroke was made, but in an alternative embodiment of the invention a stroke "center of gravity" (or some similar type of algorithm) is dynamically used to determine in which line a stroke should be rooted. The method also allows ascenders and descenders (e.g., tail on "g") to cross over line boundaries while still remaining rooted in a home line.

Another aspect of the invention is that the script/text processor recognizes word boundaries within the script text and, preferably, can also recognize the implicit layout of text lines within a document. This aspect enables the processor to provide editing/word processing features that prior to this invention were not available for handwritten documents. It can also facilitate outlining. Additionally, because the script/text processor of the invention can manipulate words as images, script or text containing more than one language (shorthand could be considered a different language) can be edited (provided both languages use similar editing conventions, such as word wrapping forward from the right end of a line of text).

The method for managing word wrapping presents a novel solution to the current technical problems associated with determining word boundaries and managing word spacing. One aspect of the method provides a default word spacing value called a break point gap which can be assigned through a plurality of mechanisms at the outset of stroke data capture.

Another aspect of the method employs a comparative analysis of white space between points of stroke data with the default break point gap value. A third aspect employs a monitoring mechanism for maintaining word spacing regardless of whether word wrapping has occurred.

Another aspect of the invention is a method that enables the user to use a single gesture set to manipulate both script and ASCII text, and even drawings, all within a single document. Since word translation can occur in the background as the user writes, a document can contain both script and ASCII text. Or an ASCII document can be imported and edited, e.g., by addition of script.

Other pen-based systems are known to use a set of stylus gestures for editing functions. Rather than limiting gestures to editing only ASCII, or to gestures formed so as not to be construed as script (which interferes with embedding drawings in a document), however, the present invention uses a two-step interactive approach to inputting and interpreting an editing gesture. The first step is to initiate a transitory gesture mode prompt. Once that mode is initiated (and, preferably, but not essentially, a gesture prompt is displayed), a second step is to accept a following stylus movement or gesture as a command. Upon completion of the gesture, the gesture mode automatically terminates. This approach is functional for editing both script and ASCII (any binary encoded text or data), and drawings as well.

Also, rather than using compound or unique gestures (e.g., a caret, a pigtail, etc.), straightline vertical and horizontal gestures are preferred. The gesture set used in the invention is selected to implement an intuitive relationship between the gestures and the respective functions to be performed.

The gesture set is also context-sensitive as between text and graphical editing, depending on whether the stylus is in a lined writing area or an open (unlined) drawing area of the document. Furthermore, different initial pen actions can be used to obtain different gesture mode prompts. In each case, subsequent gestures initiate different functions, depending on location/context and form of gesture prompt. This allows a simple set of gestures to be used easily to perform a variety of functions. The gesture set allows quick and easy corrections of mistakes by the algorithms that recognize word boundaries and text layout.

Another aspect of the invention enables the user to enter script continually without having to explicitly request additional blank space or move existing script that is in the path of script to be entered. Alternatively, the user can select a mode to enter script without having to shift arm position. In other words, the user can continually write on a single physical line of the input device while the software keeps track of and provides new (blank) logical line spaces.

The invention also enables the user to perform simple page layout operations in order to intersperse free-form drawing areas (non-ruled blocks of lines) with text areas (ruled blocks of lines) on a document page. The processor of the invention further allows graphics images to be drawn and interspersed within line spaces among script/ASCII text. These images can "word wrap" along with the text in which they are imbedded.

The script/text processor's feature set disclosed herein is tailored for the typical user. If an editing or script-entry error occurs, the user simply corrects it, using other editing functions. One can provide functionality desired by the less common user by adding self-teaching features to the algorithms. Typical users of the invention would be people who want to quickly jot down notes with/without drawings; people who need to make drawings along with descriptive text, e.g., engineers, lab workers, coaches; people who want to quickly record/revise ideas as discussions progress, e.g., students; writers that do not want to leave any trace of writing that has been revised, e.g., letter writers, confidential communications; and people who desire to represent their views of the world in a hierarchical manner through the use of an outline. The information being represented hierarchically can be script, text and/or drawings, including structured diagrams.

Another class of user is the writer who does not compose documents at the keyboard (e.g., doctors on rounds, shop-floor supervisors, executives, people who cannot or prefer not to type). Documents will typically be composed in script and handed off to a secretary for translation/typing into ASCII text. The secretary may then download the ASCII document into the script/text processor for a round of revision by the author. Downloaded documents can be read, annotated, and edited before being electronically returned to the secretary or publisher.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 4I shows the preferred set of gestures used in editing and select modes of gesture control.

FIGS. 6A–6D are diagrams of the script bit-mapping and compression process.

FIGS. 12A–12D are diagrams illustrating the process of converting script input on a lineless screen to a machine editable format according to the present invention.

FIGS. 14A–14C are a top-level diagrams illustrating the process for dynamic targeting strokes as herein described.

FIGS. 19A–19B are diagrams of a typical bit-mapped document having both ASCII text and hand-written script displayed on a pen-based computer showing characteristics of the image determined by the invention necessary to convert the bit-mapped image into a machine-editable format.

APPENDICES A through E are combination pseudocode and structured English subroutines for implementing the Insert/Collapse Moving Space command.

DETAILED DESCRIPTION

The following description outlines various hardware and software environments in which the handwritten script and text (e.g., ASCII) processing software of the invention can be implemented. Next described in subsequent sections are script/text document and page attributes; the event-driven process used to implement the method word boundaries and wrapping; beginning-of-line designation; processing of ASCII text; interword space management including break point gap analysis; word wrapping and wrap-gap manipulation; gesture-based editing; conversion of strokes to internal stroke format using an efficient script compression technique and representation of ASCII text in internal stroke format, concluding with an example showing a series of editing processes in an operational pen-based system according to the invention.

Preferred Hardware Environment

Figure 1:
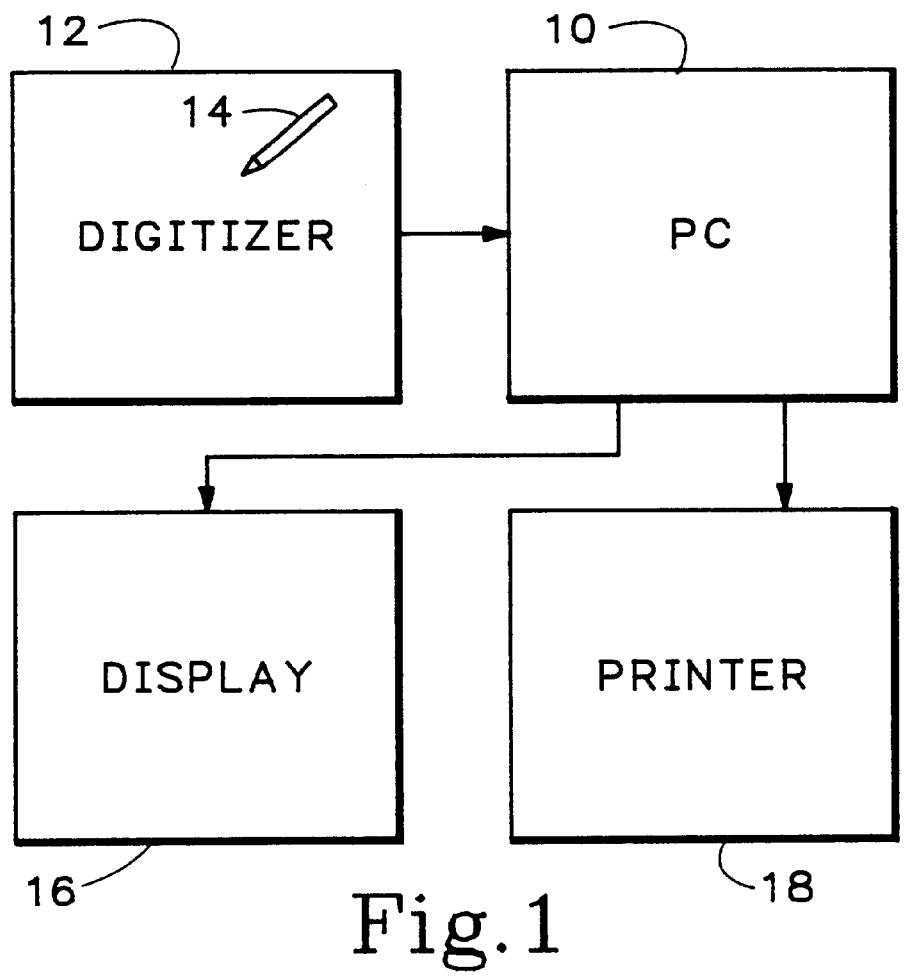
FIG. 1 is a block diagram of a PC with a pen-based script/text entry and editing system according to the invention.
Figure 7A:
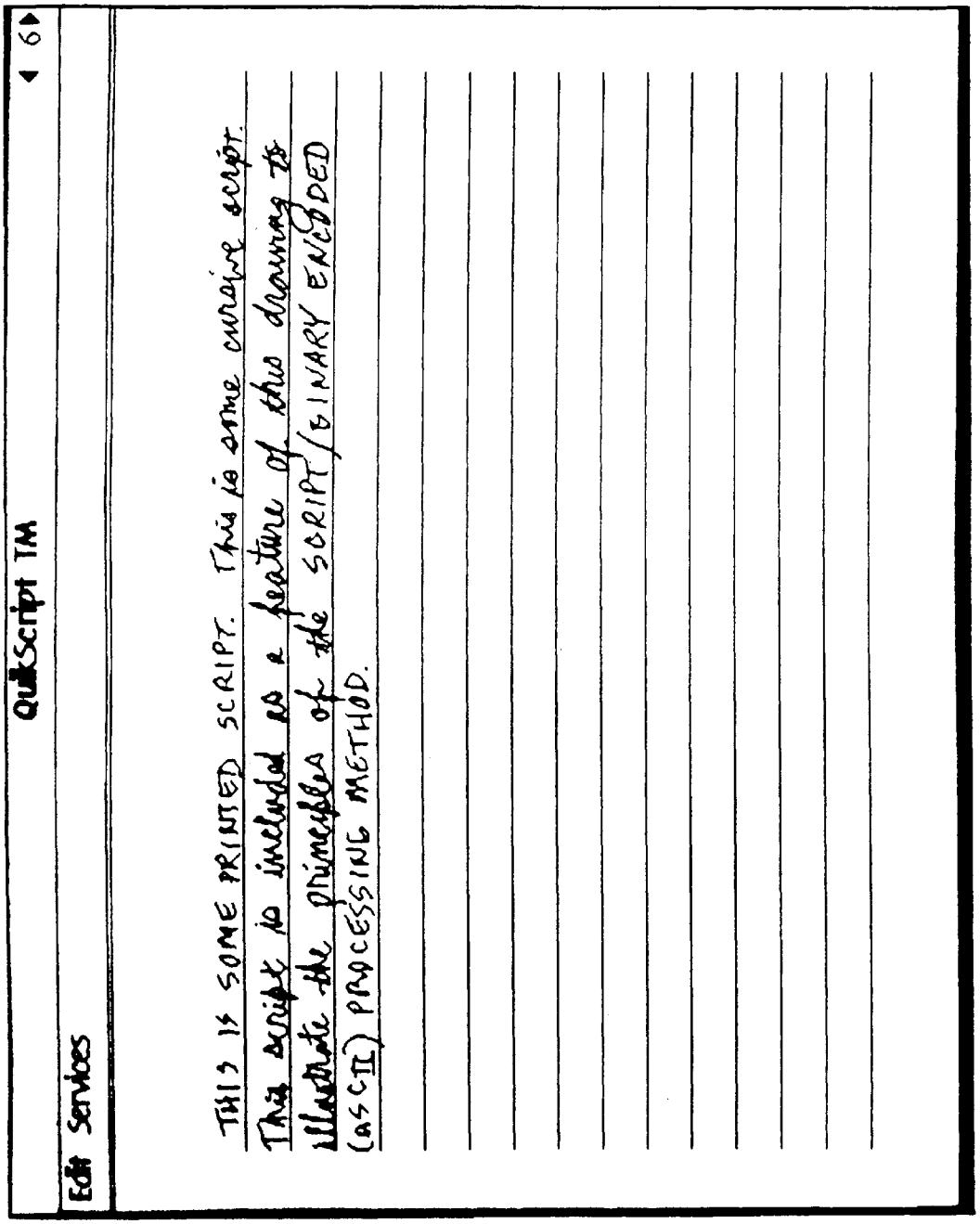
FIGS. 7A–7U are a sequential series of display screens showing a script/text document in the system of FIG. 1 as various editing functions are performed.
Figure 7B:
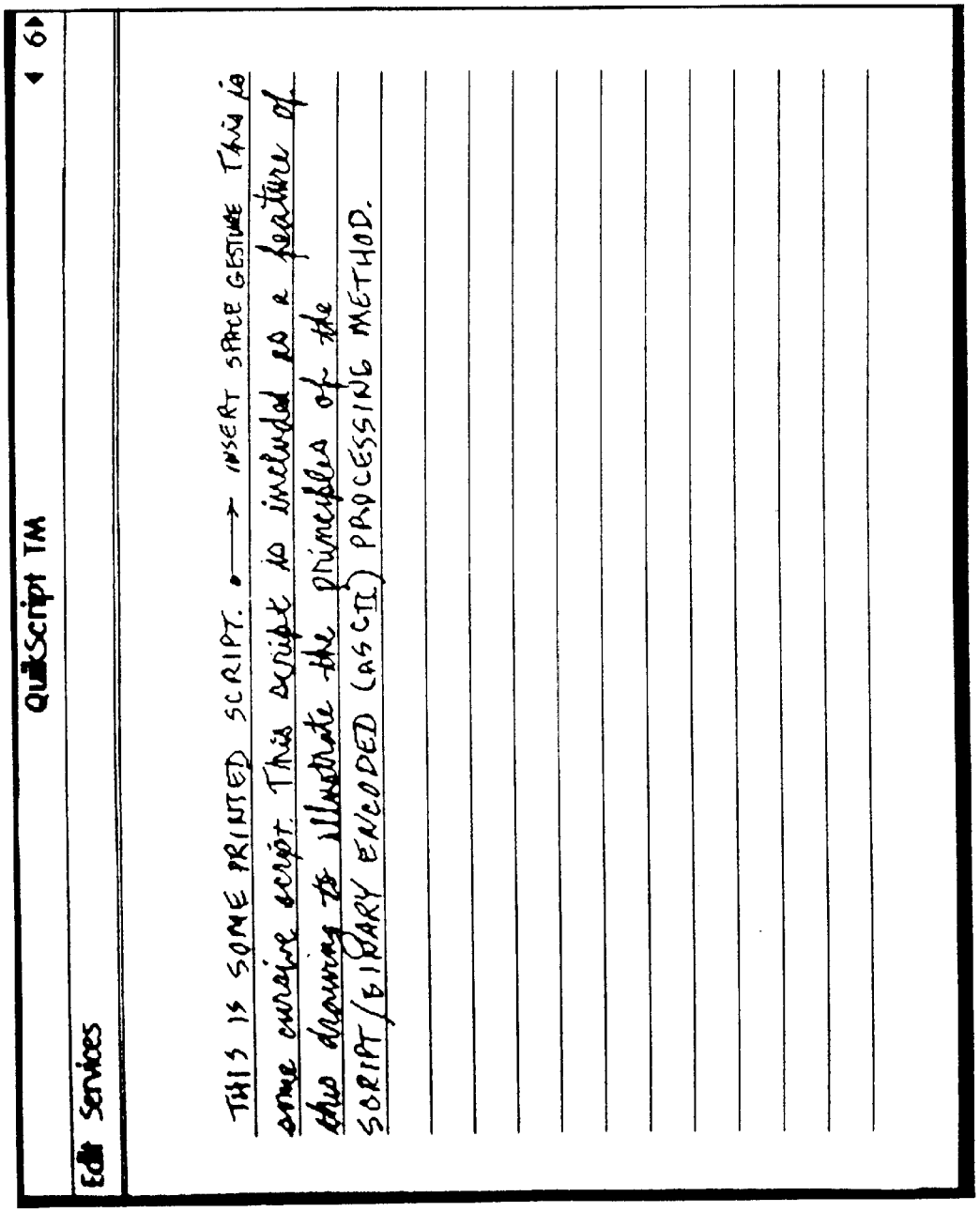
FIG. 7 is a diagram of a typical document display formatted, according to the invention
Figure 7C:
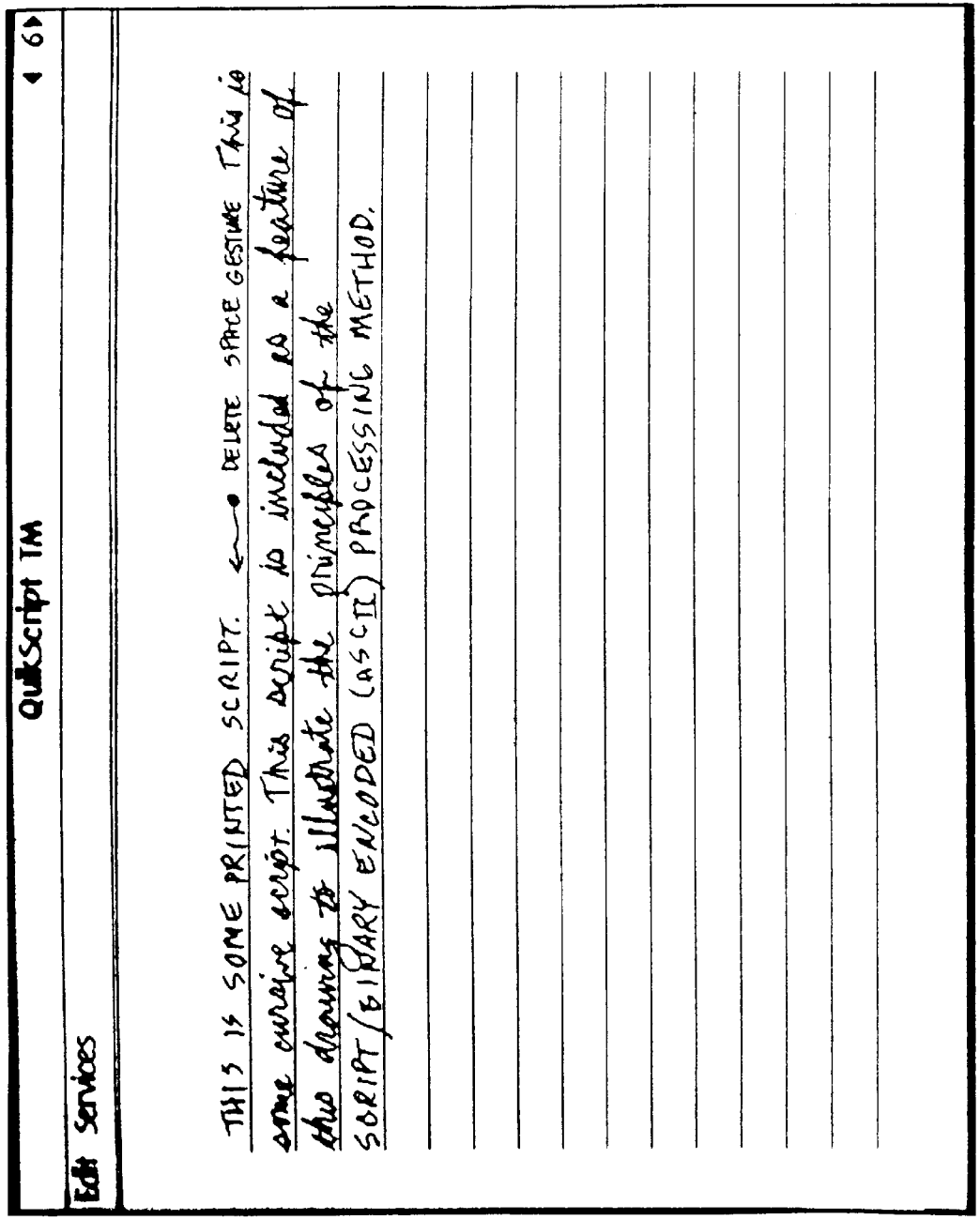

FIG. 1 shows a personal computer (PC) 10 having a graphics input device such as a digitizer 12 that is sensitive to a pen or stylus 14 that can be used to enter script and editing gestures in a document containing script and/or ASCII text. This computer has a document display screen 16 distinct from its pen sensitive digitizer and can include a printer 18 or other output device. FIGS. 7 and 7A–7U show document pages from such a screen as used in the invention. In addition, the PC includes a modem for receiving bit-mapped images. An optional scanner (not shown) could also be used to generate bit-mapped images as well.

The graphics input device is preferably but need not be capable of entering script. It can be merely a pointing device, e.g., a mouse, light pen, touch pad, keyboard cursor, etc., used to edit existing documents containing script/ASCII or to create and edit documents using a keyboard (not shown) for text entry. The presently preferred input device is a digitizer which is responsive both to stylus contact (pen down), position and stylus proximity (pen close—e.g., ½" or 1 cm.) such as the WACOM, 50-510C digitizer and stylus, U.S. Pat. No. 4,786,765. Alternatively, a digitizer and stylus that is contact, position and pressure sensitive could be used, such as made by Summagraphics Corp., U.S. Pat. No. 4,786,764. A further alternative input device is responsive to stylus angle as well as being contact, position and pressure sensitive. In a computer having a keyboard with cursor keys, key action can be mapped to the editing gesture control functions, allowing documents containing script and/or ASCII to be edited from the keyboard as well as the graphics input device. Documents can be created using the keyboard for text entry and edited in script form.

Figure 2:
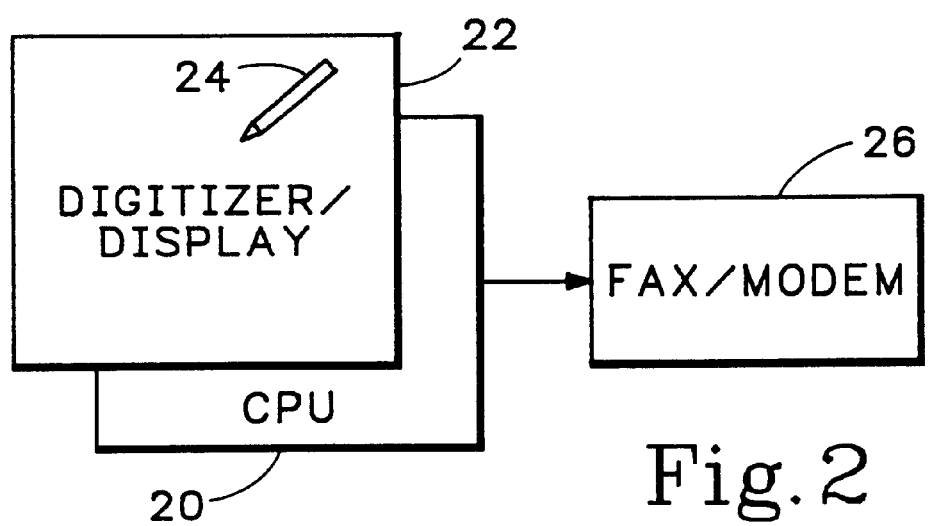
FIG. 2 is a block diagram of a free-standing pen-based computer system incorporating the present invention.

FIG. 2 shows a notebook sized computer 20 with integrated display and digitizer 22 that is responsive to a pen (stylus) 24, and an output device shown in this instance as a FAX/Modem 26.

Other hardware that can be used include:
- A FAX machine with integrated display and digitizer that is connected to a computer and responsive to a pen (stylus);
- A Whiteboard/Blackboard type of display having an integrated digitizer that is responsive to a pen (stylus) and connected to a computer; or
- A pen sensitive digitizer and light transmissive display panel (e.g., LCD) connected to a computer and positioned as an overlay on an overhead projector. A similar device is marketed that allows pen-type input but drives the overhead projector rather than being light transmissive; this too could employ the present invention.

Preferred Software Environment

Figure 3A:
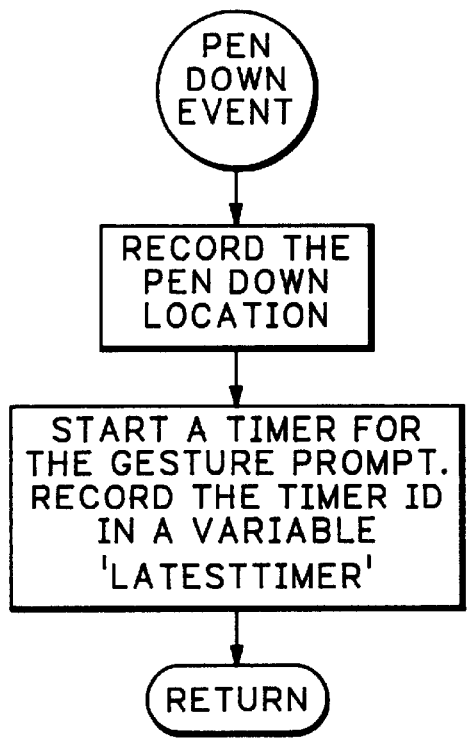
FIG. 3 is a state diagram of various events in the operation of the invention and FIGS. 3A–3F are flow charts of the process substeps responsive to each of the events of FIG. 3.
Figure 3B:
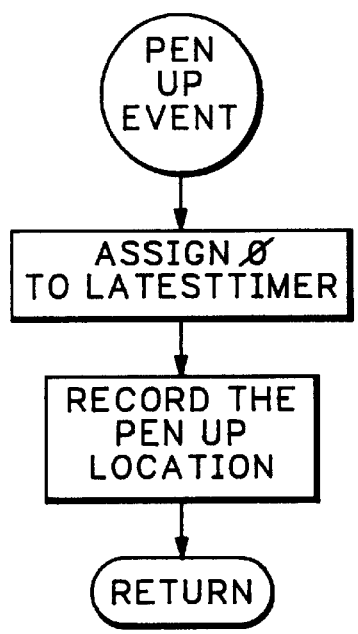
Figures 1, 3C:
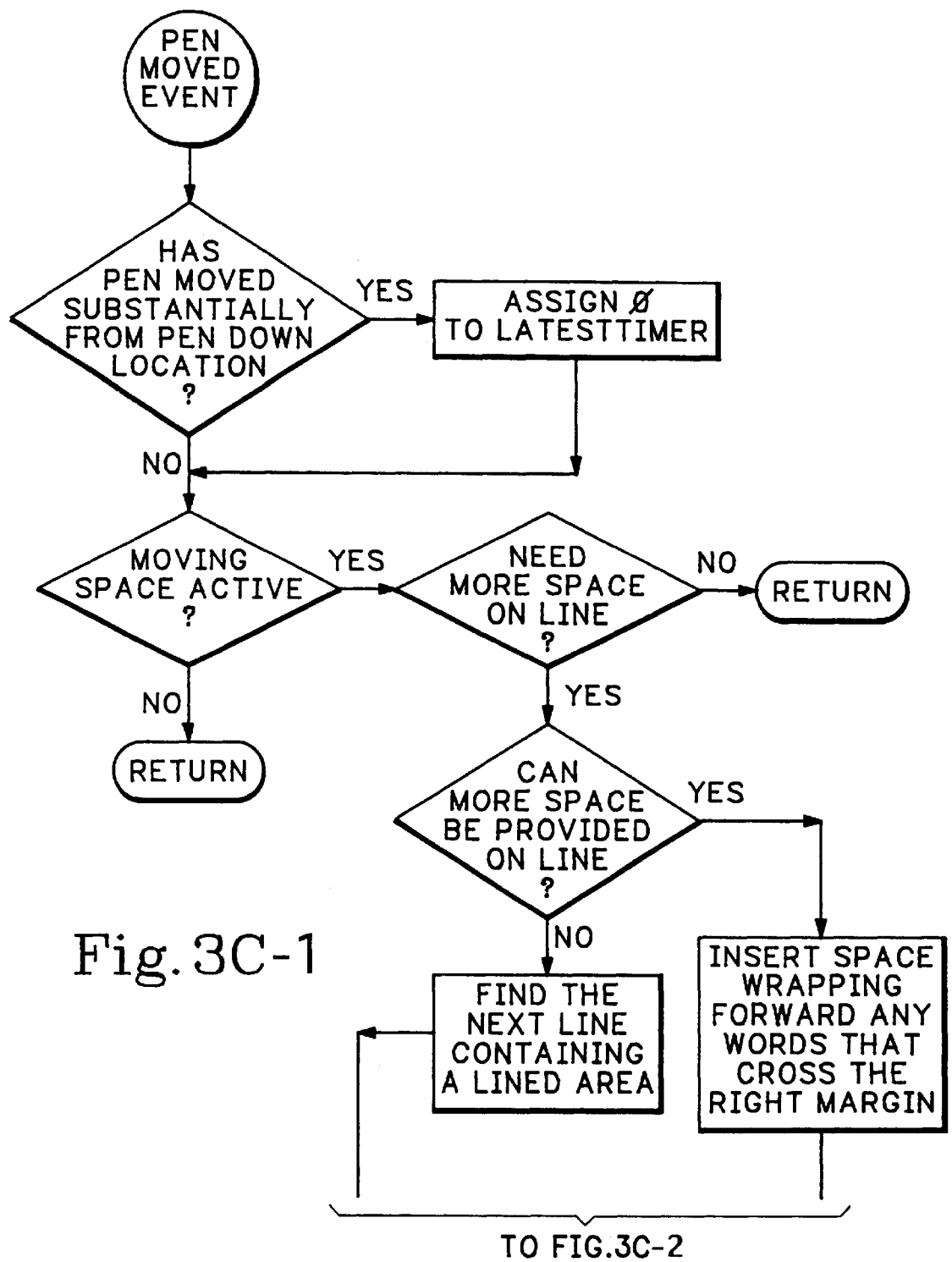
Figures 1, 3D:
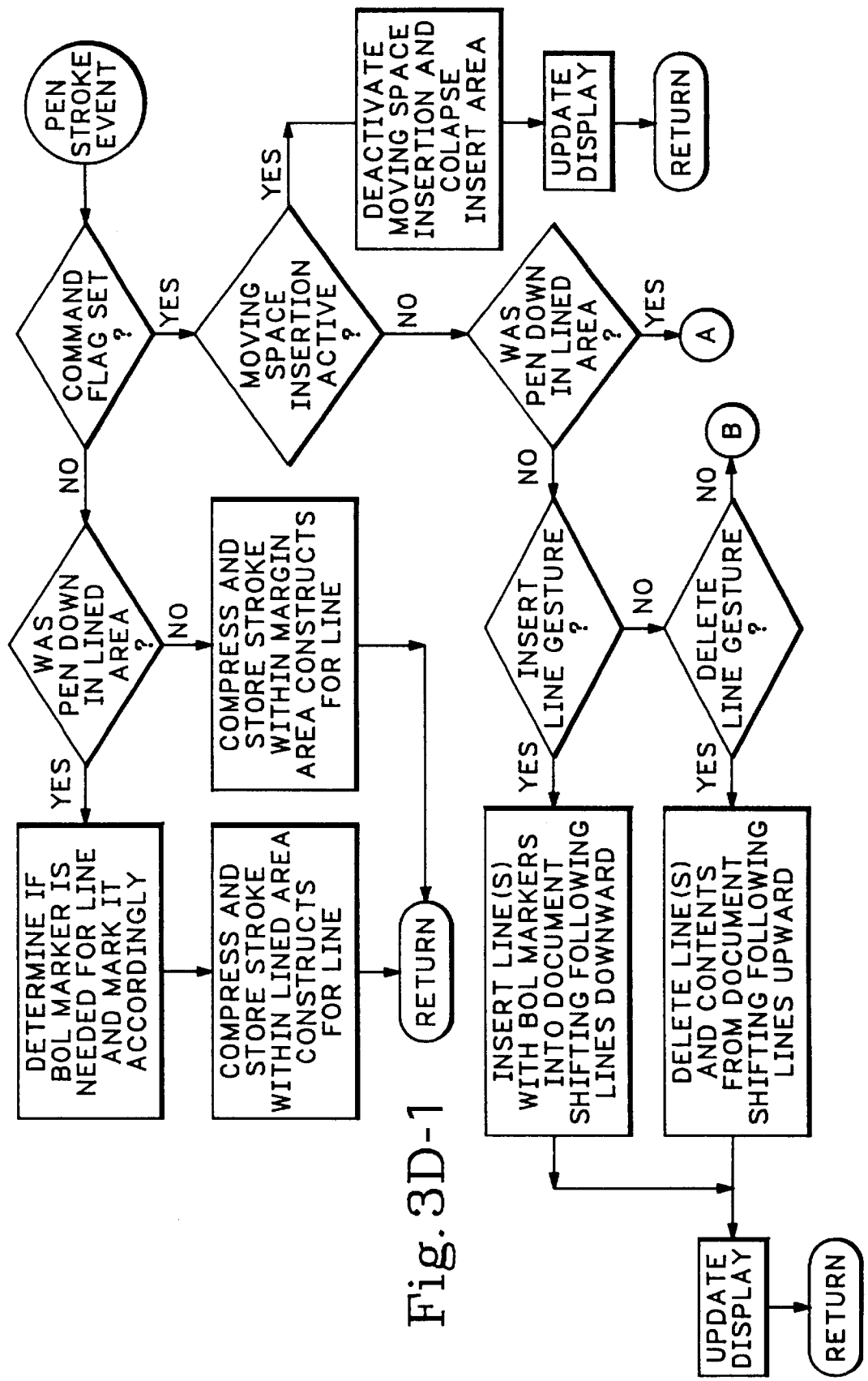
Figures 2, 3D:
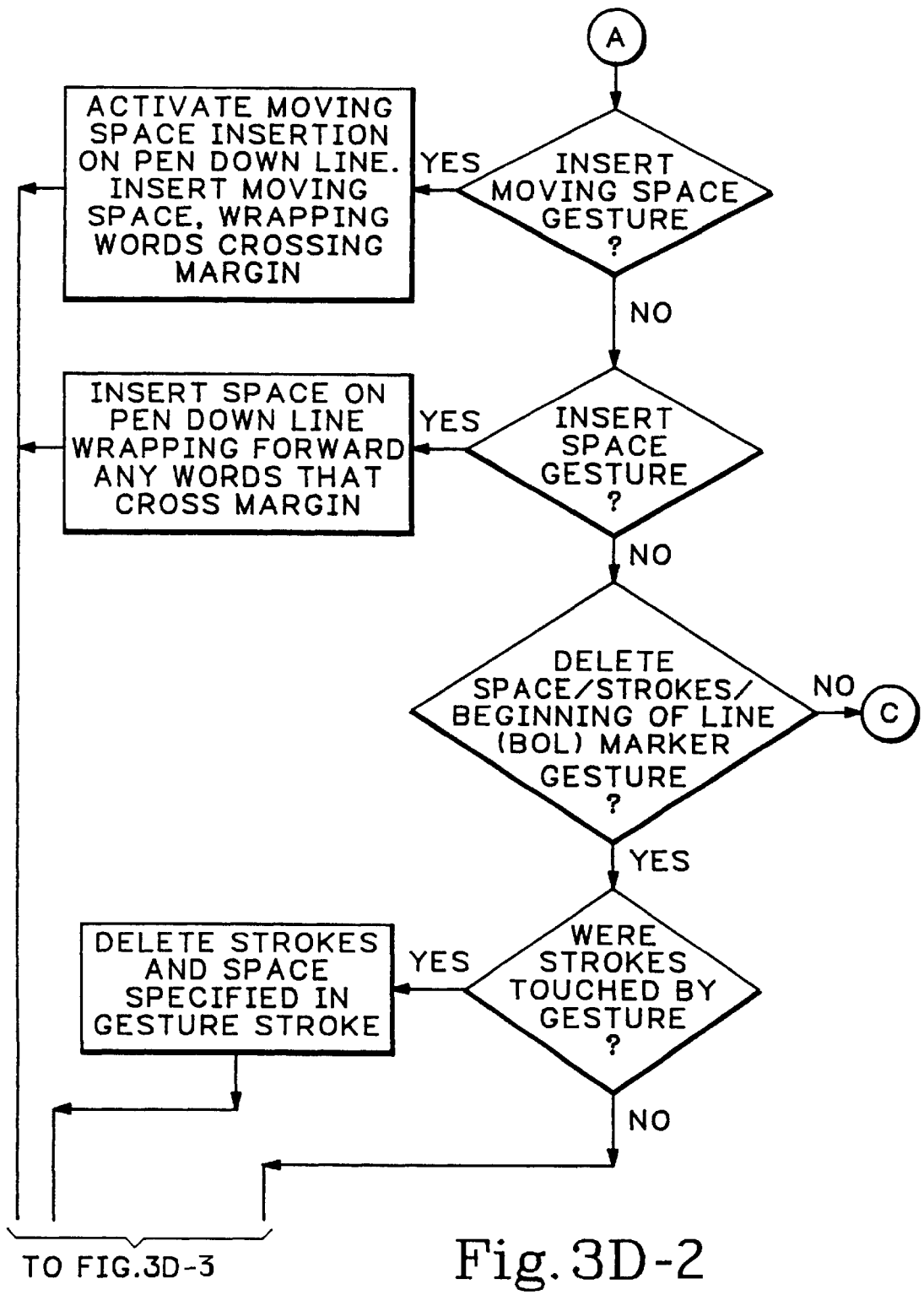
Figures 3, 3D:
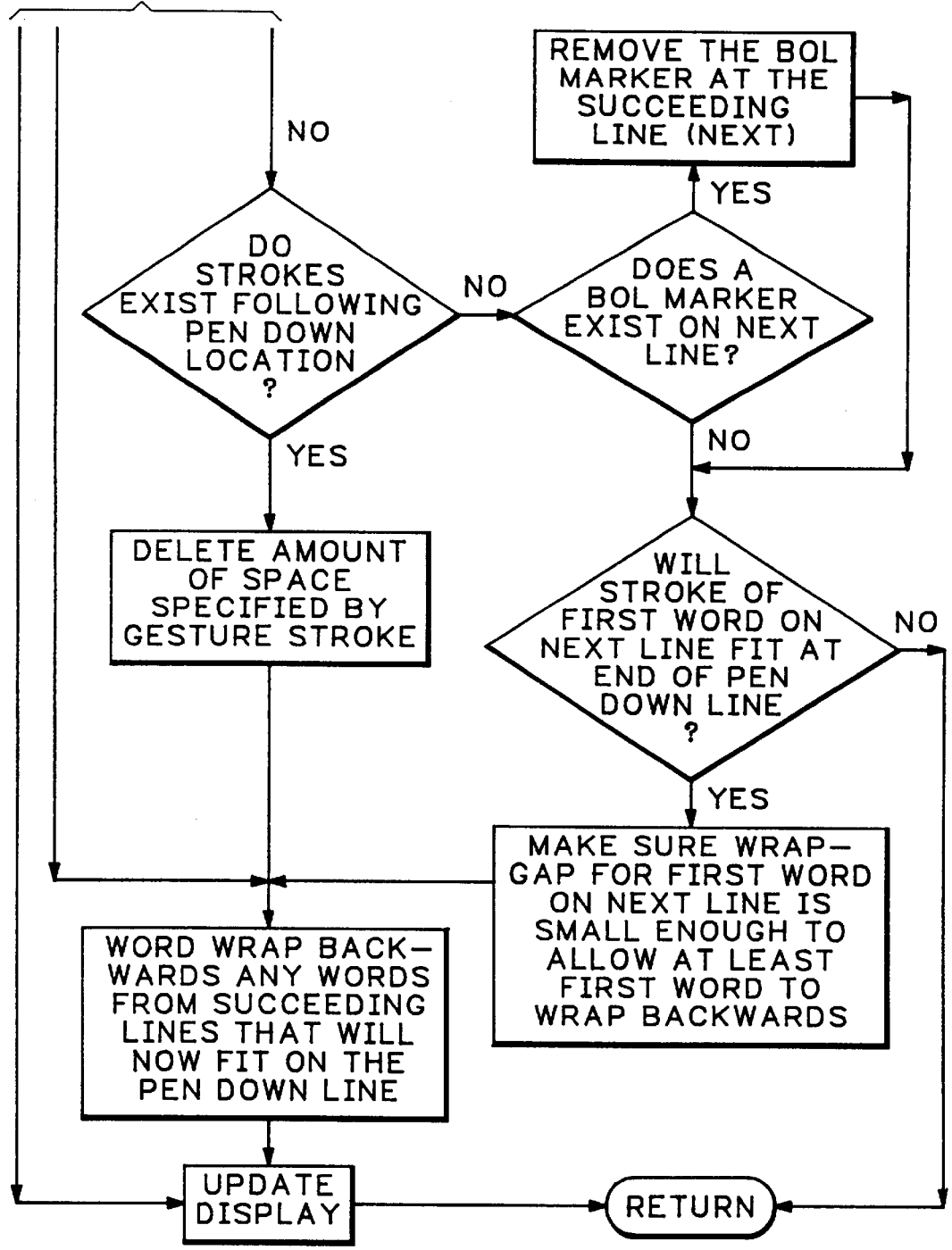
Figures 3, 3D, 4:
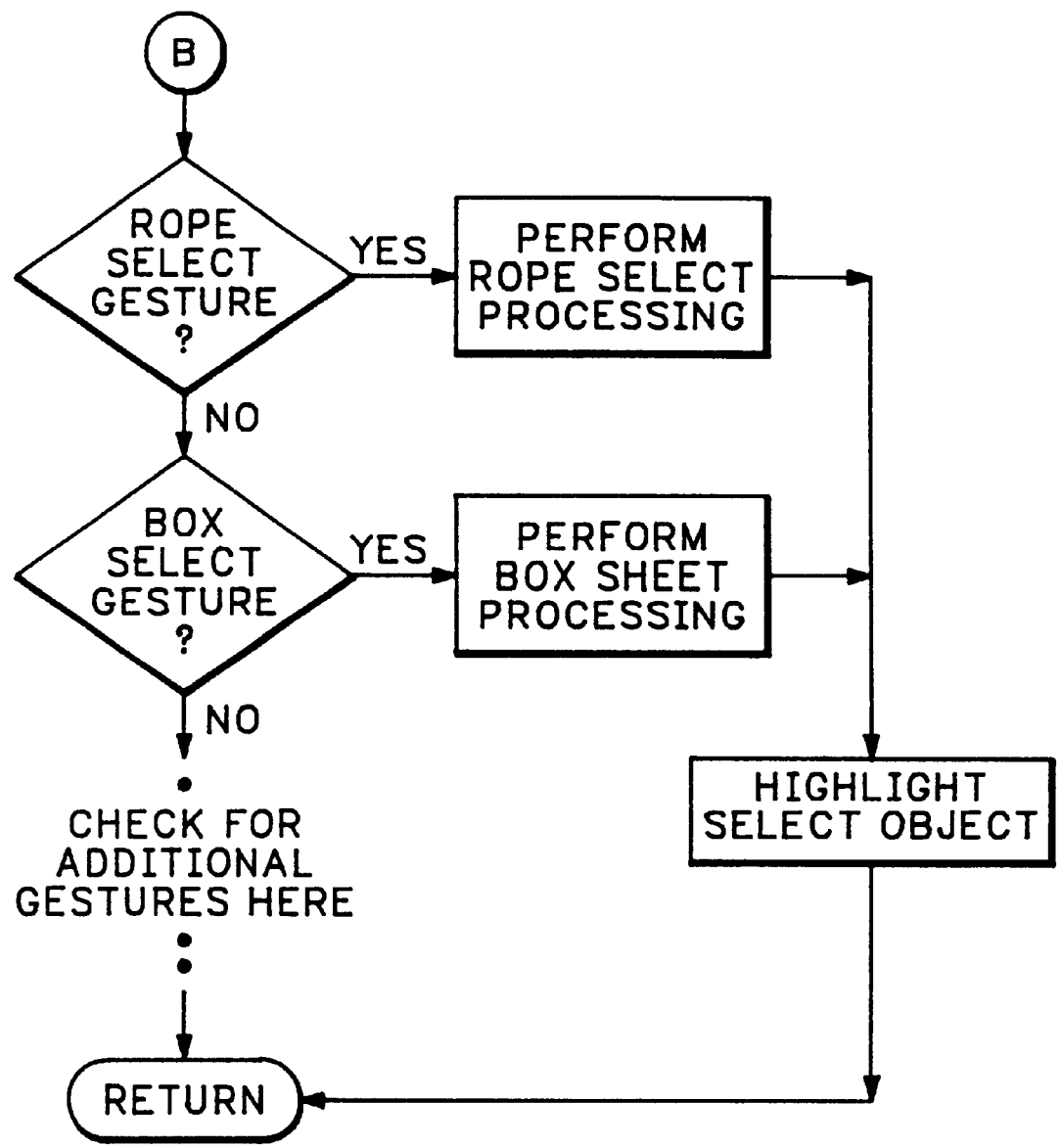
FIGS. 4 and 4A–4H are diagrams of gestures used in the invention for editing script and/or text in the editing mode of FIG. 3.
Figures 3, 3D, 4, 5:
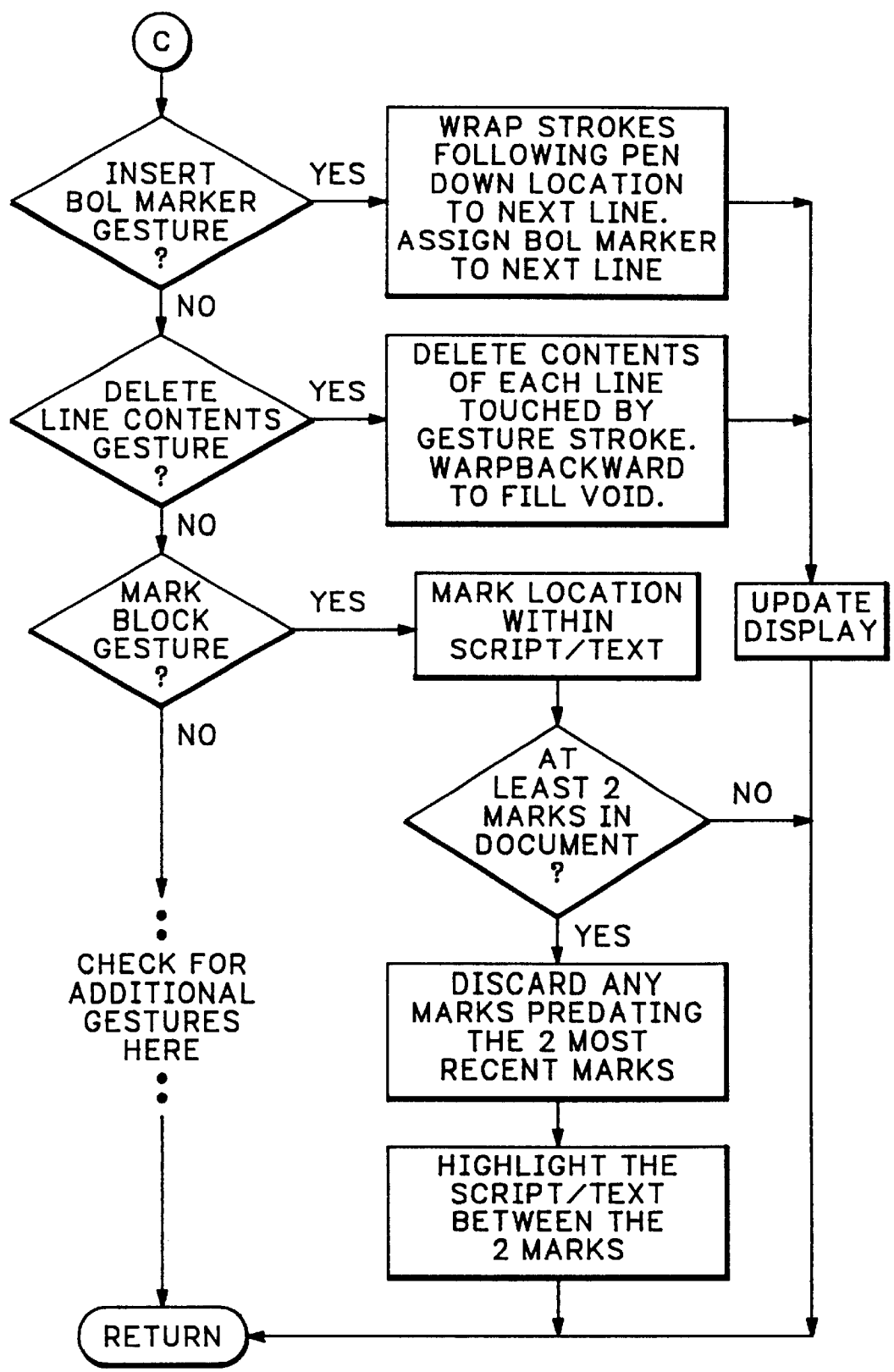
Figures 3E, 3F:
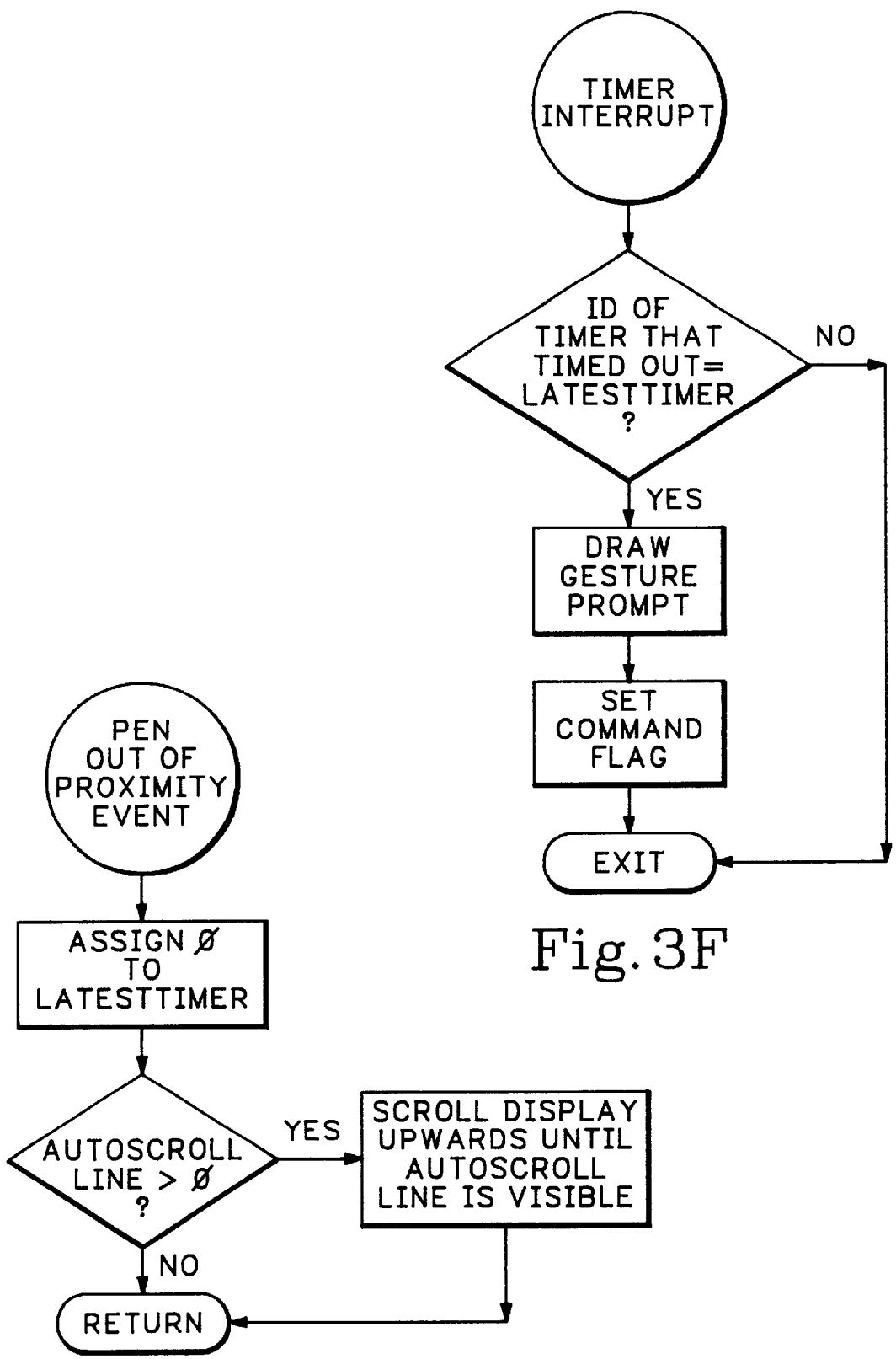

The presently preferred software for carrying out the method of the invention is shown in FIGS. 3–3F and further described below.

This software can be implemented in a number of alternative software environments. The invention has been implemented in C language on a 386-based personal computer running GO Corporation's PenPoint Operating System, and is transferrable to Microsoft's Pen Windows Operating System.

It can also be implemented on any other operating system that can provide information on pen (stylus) activity, including an operating system such as MSDOS or OS/2, that provides graphics input device and/or keyboard feedback. The invention can also be used in a computer that has no operating system but has the ability to access and control the hardware components attached to a computer system via software commands. This can include sensing stylus position on a digitizer, capturing keystrokes on a keyboard, or outputting graphic images onto a display.

Script/Text Document and Page Attributes

FIG. 7 shows a document display screen 30. A script/text document 32 in accordance with the invention comprises multiple pages for entry and editing of script/ASCII text with or without embedded drawings, as shown in FIGS. 7A–7U. The user is able to "screen" page, "paper" page or scroll through the document. The user can also write a page number within a translation area to directly reference that page. A "Find" menu option can search the document for a specific ASCII string (in the future "fuzzy fit" script string searches can also be provided).

A script/text document could also be a single page, with margin-less input or lined area comprising one or more lines. This "document" might serve as a component in a larger application.

As shown in FIG. 7, a page of document 32 typically contains a group of ruled lines 34 defining line spaces 39 that allow script/ASCII text entry and editing, above each line. The lines each have beginning and ending points 36,38 defining line length. The lines as a group define a lined area. Preferably visible to the user, the processor can include an option to hide the lines while retaining their attributes.

Portions of the page that are not ruled are considered to be margin or drawing areas, although it is permissible to imbed drawings within lines of text. The drawing areas include left and right margins 40, 42 and top and bottom margins 44, 46. The top and bottom margins as shown include two unruled line spaces each. The user can change the size and position of the text and drawing areas, including the number of lines spaces, if any, used as top and bottom margins.

Within the text (ruled) areas, word wrapping can occur. A user is free to write or draw anywhere on a page but should keep in mind that large drawings (i.e., drawings with a height of two or more lines) in the lined area might be broken up during word wrap, and text in a drawing area cannot word wrap. Pages are separated by non-hard page breaks 48 which allow word wrapping between adjoining pages.

The line spaces and their respective contents are maintained as units in a tree-type data structure that allows traversal to extract the units serially for presentation in the document display. Other data structures could be used but this one is advantageous for supporting outlining.

Automatic control code insertion allows the user to write on a script/text document as would normally be done on a piece of paper, with the processor taking care of the line-by-line formatting. This is accomplished by the processor watching where, when, and how the user places his strokes. For instance, if a user writes on a line, skips a line, and then writes on the following line, then it can be assumed that the user wants the blank (skipped) line to remain blank. Editing features such as word wrapping would not overwrite the blank line. This feature and its use with static (scanned/FAXED) images is described in more detail in the section entitled

Beginning of Line Designation

A menu or gesture-selectable script processing feature, position control, allows the user to continuously write within a certain area on the display without having to perform "explicit" actions (e.g., scrolling) to position the input area.

The input area will be positioned for the user by automatic scrolling. (Note that scrolling up (manual or automatic) at the end of the document causes blank lines to be appended to the document). Automatic scrolling will typically be triggered by pen out of proximity.

Some varieties of the feature are, once the boundaries of a user-specified screen area have been exceeded, pen out of proximity will cause the document to scroll so that the input area again resides within the screen area boundaries. Another version has pen out of proximity within the document causing scrolling equivalent to the number of lines used (blank lines written on) since the last pen out of proximity. An analogous gesture can also be provided that performs the same function as pen out of proximity, for use with graphic input devices that are not proximity-sensitive.

A preferred set of basic editing gestures and their functions are described in the section below entitled Gesture Based Editing and demonstrated in an operational processor in Example 3 and FIGS. 7A–7U. The next section describes the processor software diagrammed in FIGS. 3 and 3A through 3F.

Description of Event-Driven Process

FIG. 3 shows the main process of the present invention. The various pen or stylus digitizer events that drive the application are described as follows:

Pen Down: Event is generated when the stylus contacts the digitizing surface.

Pen Up: Event is genera ted when the stylus loses contact with the digitizing surface.

Pen Move: Event is generated when the stylus moves while in contact with the digitizing surface.

Pen Stroke: Event is generated when user completes a stroke with the stylus along the digitizing surface.

Pen Out of Proximity: Event generated when the stylus, already out of contact with the digitizing surface, leaves proximity (i.e., the sensing range of the digitizer. The stylus is in proximity when it is within a distance approximately one half inch of the digitizing surface. This distance can be varied.

Pen Double Tap: Event generated when the pen contacts the digitizing surface at approximately the same position twice within a fixed time period.

FIGS. 3A–3E flow chart the process substeps initiated by each event. At any time during the process of FIG. 3, the timer subprocess of FIG. 3F can assert an interrupt to initiate a gesture command sequence.

Referring to FIG. 3A, the Pen Down event causes recordal of the pen down location and starts a timer for detecting a gesture prompt. The timer identity is recorded and, referring to FIG. 3F, if this timer times out before another timer is set then the system generates a gesture prompt at the pen down location. Then the subprocess returns to the main process and awaits the next event.

In the case of a Pen Up event, the subprocess of FIG. 3B sets the latest timer to zero (which invalidates the gesture timing process of FIG. 3F), records the pen up location, and returns to the main process.

The Pen Moved event initiates the subprocess of FIG. 3C, to determine whether line space needs to be opened and, if so, to open space, wrap downstream line space contents to subsequent lines, update the display, and return to the main process. This subprocess is further described below in Detailed Description of Moving Space Processing. If the pen has moved by more than a predetermined amount (i.e., changed location), the latest timer is set to zero, which invalidates the gesture prompt timer of FIG. 3F.

The Pen Stroke event initiates the subprocess of FIG. 3D. This subprocess causes the pen stroke to be interpreted either as a writing stroke, in which case script strokes are processed and displayed (ink is dribbled), or as a gesture, which in turn is interpreted and a corresponding command function is executed, as described below. Each branch in the subprocess concludes by updating the display and returning to the main process.

The Pen Out of Proximity event causes the subprocess of FIG. 3E to reset the latest timer to zero and then initiates a scrolling function.

Further details of the software implementation will be understood and programmable by persons skilled in programming pen-based systems by reference to the procedures diagrammed in FIGS. 3A–3F. The basic editing gestures are shown in FIGS. 4A–4H and their respective functions are described below. It will also be appreciated that these procedures can be varied, for example, to add gestures (see FIGS. 3D–4 and 3D–5), or to substitute different forms of events suited to different kinds of pen-based input devices (e.g., Pen Vertical instead of Pen Out of Proximity).

Beginning of Line Designation

Text, script and script/text documents consist of words, physical lines (where words reside), and blank space. The script/text processor currently formats all documents using only Beginning Of Line (BOL) markers. BOL markers are inserted automatically whenever the user's script entry implies that a new line of script has been started.

What the BOL marker does is protect the text and/or script on the line where it resides from being shifted to a new horizontal position during word wrap reflow of the document. That is, words pushed from a preceding line will not wrap onto the beginning of the line containing a BOL marker. Instead, the entire latter line is pushed down and a whole new line is opened to receive the pushed-down words from the preceding line. In the case of blank lines, BOL markers are used to assure that the line will remain blank during word wrap reflow. Ordinarily, these markers are not visible but optionally may be displayed.

Figure 4:
Figure 4A:
Figure 4B:
Figure 4C:
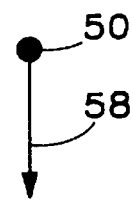

A user can also explicitly insert a BOL marker (see FIG. 4C and associated description). Unlike a carriage-return/line-feed symbol which the user must explicitly insert in conventional ASCII text processing, however, the BOL marker is ordinarily inferred from text position and is automatically input. This is important for a pen-based system so that the handwriting user need not insert control characters.

How words are arranged on lines and how lines of script are arranged on a page by a user has significant meaning. Without factoring in when and how the following words came to be in their current position, we can determine whether to insert a BOL marker at the be-inning of each line of text (or script) data in the following example document:Line

| 1 | This is an example document which as a |
| 2 | total of nine lines. |
| 3 | |
| 4 | A list can help one remember: |
| 5 | do this |
| 6 | then this |
| 7 | |
| 8 | Signed, |
| 9 | Signature |

Line 1: Insert BOL marker because this is the first line in the document.

Line 2: Do not insert BOL marker because no space was available at the end of the preceding line for the first word on this line.

Lines 3,7: Insert BOL marker because lines are blank and are followed by non-blank lines.

Line 4: Insert BOL marker because this is the first line following a blank line.

Lines 5,6: Insert BOL marker because preceding line does not contain text (has blank space) for a statistically significant distance prior to the right margin.

Lines 8,9: Insert BOL marker because text is substantially indented.

The example document could have been a scanned or FAXed document that was converted to script/text processor document format before being "statically" formatted by the processor. A method of converting the scanned or FAXed document, i.e., a bit-mapped image, into a script compatible format is described herein below in the section entitled "Converting a Bit-Mapped Image." It could have also been a document that was dynamically formatted as the user entered script and/or text. Situations like the following might then have occurred: Line 2, having been left blank while the text on the following lines was entered, had a BOL marker inserted. The user then decided to enter text on line 2. Having done so, line 2 would have its BOL marker removed for the same reason that a BOL marker was not inserted in the first example. Now if the user wanted a BOL marker to be inserted at the beginning of line 2, the insert BOL gesture could be used at the end of line 1 (see FIG. 4C). Because this would be an explicit insertion of the BOL marker, automatic line formatting would not remove the BOL marker—the user would have the option of removing it with the delete space/BOL marker gesture (see FIG. 4B).

Any time the user touches the pen to the document portion of the screen, ink will be available for writing/drawing. If a character/word translation process is enabled and the user writes in the text area, translation of script to ASCII text will occur in the background. The translated characters will replace the script and can be edited in the same way as the script. Editing features for script/ASCII text and drawings are available to the user through gestures, icons, and menu choices.

Text Processing in Script/Text Document

For illustration, let us assume that user wants to write a mixed script/ASCII document using the processor of the invention. Starting with a blank piece of "paper," as shown in FIG. 7, a user will typically construct a script/ASCII document by entering the script text (cursive or printed) and having it translated to ASCII in the background. Another way is if the user manually edits a pre-existing ASCII document by insertion of script. Edits can be made to either the script or ASCII text as further described below.

In order to be able to perform word-oriented editing operations on both script and ASCII text with a single gesture set, the script and ASCII portions of a document both need to be represented as a series of words. In both handwritten and printed ASCII documents, words are separated by a larger amount of space than that which separates the characters within a word. The larger amount of space between words is the basis upon which the processor decides where a word begins.

The script/text processor could decide how much space to look for between script words by watching how the user spaces words as writing occurs, basically learning what type of spacing to expect, but a simpler approach is used effectively in the present invention.

The present method provides the user with a default word spacing value which can be determined by watching the user write a line (e.g., the first line) of text.) This value specifies a default break point gap (BPG) or spacing which defines a space between words of script, and thereby defines "words," per se. Unlike the space in typed text (e.g., produced by an ASCII space-bar character) the break point gap is defined by the physical word spacing in script, which is variable in length. The processor enables the user to adjust the word spacing value (i.e., the processor's BPG) to his personal script word spacing (i.e., to the user's own BPG).

The processor orders strokes/ASCII character images within a line by their left-most point (pixel) position. Accordingly, the word spacing value (BPG) specifies the amount of space that must exist between the left-most point (pixel) of a stroke or ASCII character image and the right-most point of all the preceding strokes and/or ASCII character images on the line in order for the stroke/ASCII character being examined to be recognized as the first stroke/ASCII character of a word (see example in FIG. 5A).

The user can increase this value if it is found that partial words are being recognized as words. Or the user can decrease this value if it is found that multiple words are being recognized as a single word. This approach has been found to be highly reliable once the user finds a good personal word spacing value. Keep in mind that the word spacing value is used for recognizing where a word begins (and thus where the preceding word must have ended). The spacing that the user gives words while writing is maintained although inter-word space compaction or expansion could be applied to position words on a line.

Word spacing within ASCII text is far more consistent than within script. The word spacing is usually different from that of script, depending upon differences in the relative size of the script and ASCII text. The processor maintains a separate word spacing value for ASCII text. This value is essentially determined by looking at the ASCII character size values resulting from the font+point size selection. The use of multiple font+point sizes in a document will require that a word spacing value exist for each font plus point size combination. Within a string of text of a particular font plus point size, only the appropriate word spacing value will be used to determine word boundaries. As script is translated into ASCII, the processor assigns a word spacing that is appropriate for the font plus point size. This does not restrict the user from inserting additional space between words by using the space insertion gesture, nor does it restrict the user from removing space between words by using the space deletion (erasure) gesture. Space inserted between script or ASCII words can only help the word recognition process, whereas space deletion can hinder the process.

When an ASCII document is downloaded into the processor, it must be converted to the processor's internal document format in order for it to be manipulated using the edit gestures. Paragraph boundaries are easily determined in ASCII documents because they are typically demarcated by explicitly-used carriage-return line-feed characters. Word boundaries are also easily determined in ASCII documents because the ASCII space character is used to separate words.

When a scanned or FAX document is downloaded into the processor, it must also be converted to the processor's internal document format, as described below. The techniques used to determine word boundaries described above are also used to determine word boundaries once line boundaries have been recognized within the input document.

EXAMPLE 1

Figure 5A:
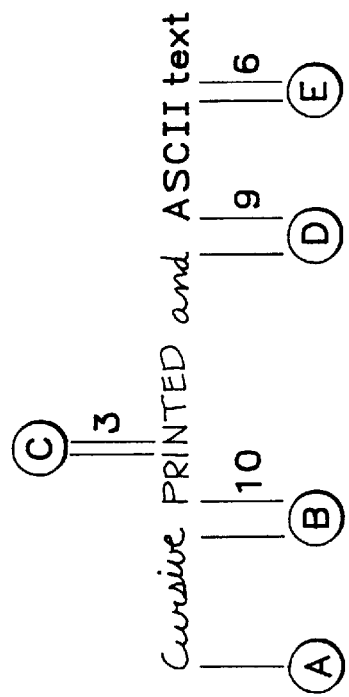
FIG. 5A is a diagram illustrating word-separation concepts used in word wrapping and FIG. 5B is a diagram showing wrap-gap management in the invention.

Assuming the following BPG values: script word spacing value: 9 units; ASCII word spacing value: 6 units. FIG. 5A shows a line of cursive and printed script and ASCII text created by the user in which the processor recognizes word boundaries using the following criteria:

(A) First stroke/ASCII character image is always recognized as the beginning of a word.
(B) 10 units exist between left-most point of "P" and right-most point of all preceding strokes/ASCII character images on the line. Since 10 is greater than or equal to the script word spacing value, "P" is recognized as the beginning of a word.
(C) Not enough blank space for "N" to be recognized as the first letter in a word.
(D) Whether script or ASCII word spacing value is used for comparison depends on the ratio of the ASCII character image dimensions when compared to the script dimensions.
(E) 6 units exist between left-most point of the ASCII character image "t" and the right-most point of all preceding strokes/ASCII character images on the line. Since 6 is greater than or equal to the ASCII word spacing value, "t" is recognized as the beginning of a word. Note: Proportionally spaced ASCII characters would require a word spacing value specific to each adjacent ASCII character pair.

The next three sections describe a preferred implementation of this aspect of the invention in further detail.

Gesture-Based Editing

A context-sensitive gesture set is provided for editing text and drawings. The user is free to write or draw anywhere on a page, but should keep in mind that large drawings in a text (ruled) area might be broken up during word wrap and text in a drawing area cannot word wrap.

Gestures are pen movements used to tell the processor control program to do something. This invention uses a two-part gesture. The first part initiates gesture control; the second part is the gesture itself. The processor allows the user to perform a pen action within the document to indicate that a control gesture is going to be made that should not be interpreted as an additional text/drawing stroke. The pen action stimulates feedback by causing display of a gesture prompt. The three primary ways (although there are many more) to get a gesture prompt are: (1) touch the tip of the pen (stylus) to the digitizer surface and hold it in this position for a split second; (2) tap the digitizer surface with the tip of the pen and then touch the tip of the pen to the digitizer surface at approximately the same position as the tap; or (3) in a system in which pen angle is sensed, a particular pen position (e.g., vertical) can be used to initiate a gesture prompt. Note that a specific pen action need not be tied to a specific gesture prompt. The user can be provided with a way of mapping pen actions to gesture prompts (and thus gesture classes). This would, for instance, allow the user to use the most efficient and/or comfortable pen actions to perform the gesturing tasks currently at hand. The user could then remap the pen actions to a different gesture class and proceed to use those same pen actions to efficiently and/or comfortably do something else.

When one of the above actions occurs, a visible gesture prompt symbol will be presented to the user. The gesture prompt symbol can take a form associated with the class of gestures that it represents. For action (1) above, the preferred prompt is a filled circle 50 at the pen down location as shown in FIGS. 4–4I. Action (2) can be used to get a selection gesture prompt in the form of a vertical bar 52 (FIG. 4I). So, in addition to being context sensitive, gestures are "prompt sensitive." The particular shape of the prompt displayed to the user can be varied (see FIG. 4I) and it is not essential to display a prompt symbol although very much preferred.

After seeing the prompt, the user moves the pen in a selected direction 51 (FIG. 4) to invoke a desired function. For the prompts and associated gestures described within this patent application, the tip of the pen is held to the digitizer surface beginning with the prompt and continuing through the gesture. For other prompts and gesture classes, the pen may not need to remain in contact with the digitizer surface. For instance, an "object drawing" prompt could be followed by the entry of multiple line segments, with the gesture recognition algorithm examining each line segment until a particular geometric shape (e.g., square, triangle, circle, etc.) was recognized. At that point in time, the user would be presented with a high quality representation of the recognized shape and the gesture would be complete (unless the object drawing prompt was used to enter a mode (drawing mode) that must be explicitly exited using another gesture).

For many gestures, gesture recognition can occur before the gesture is completely drawn. The gestures described in this application were chosen for many reasons, one being that they can be recognized as they are being made. This allows gesture feedback to be provided to the user at the earliest possible time. When the user makes a gesture, immediate feedback that corresponds to the type of gesture being made will be provided.

Figure 7D:
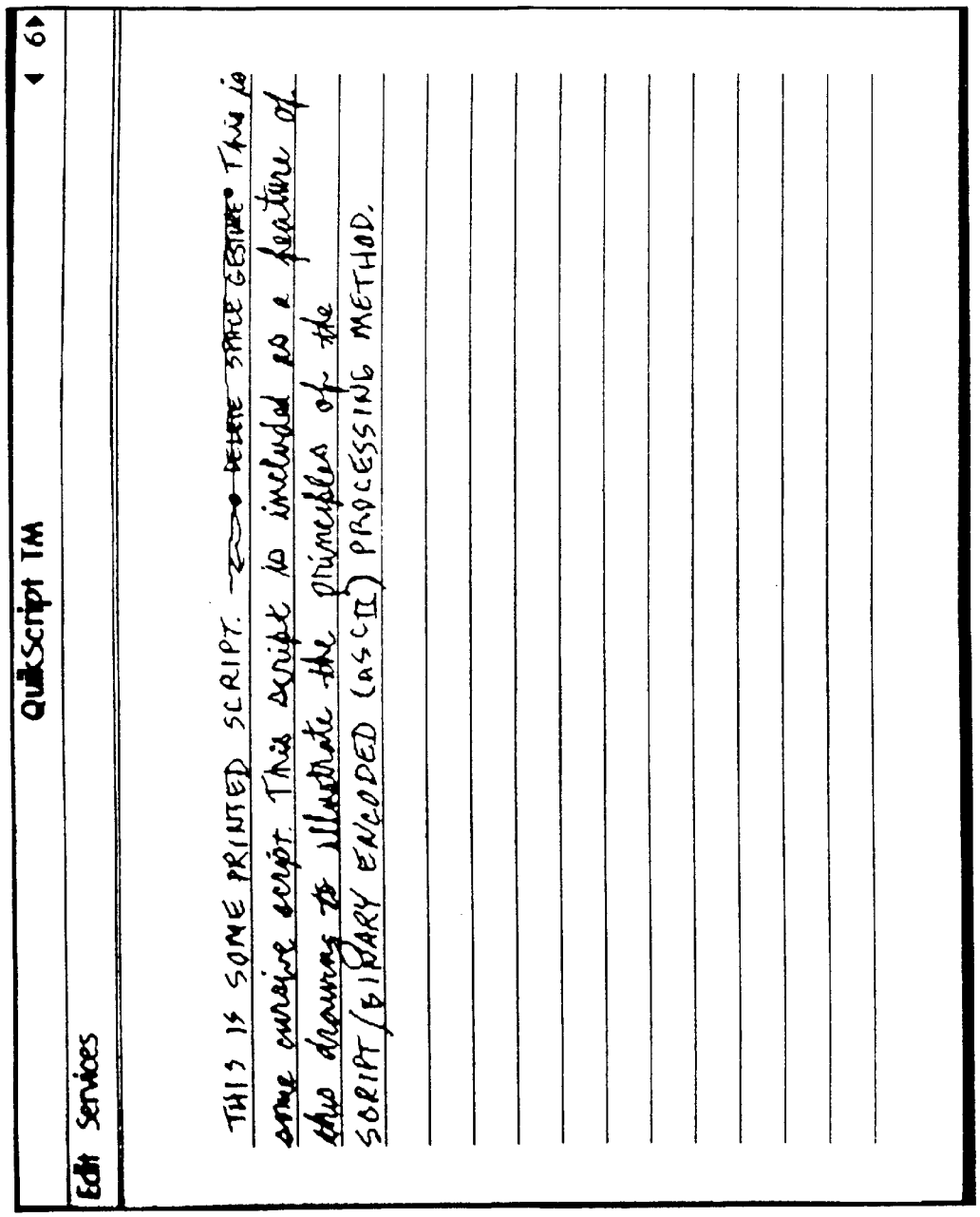
Figure 7E:
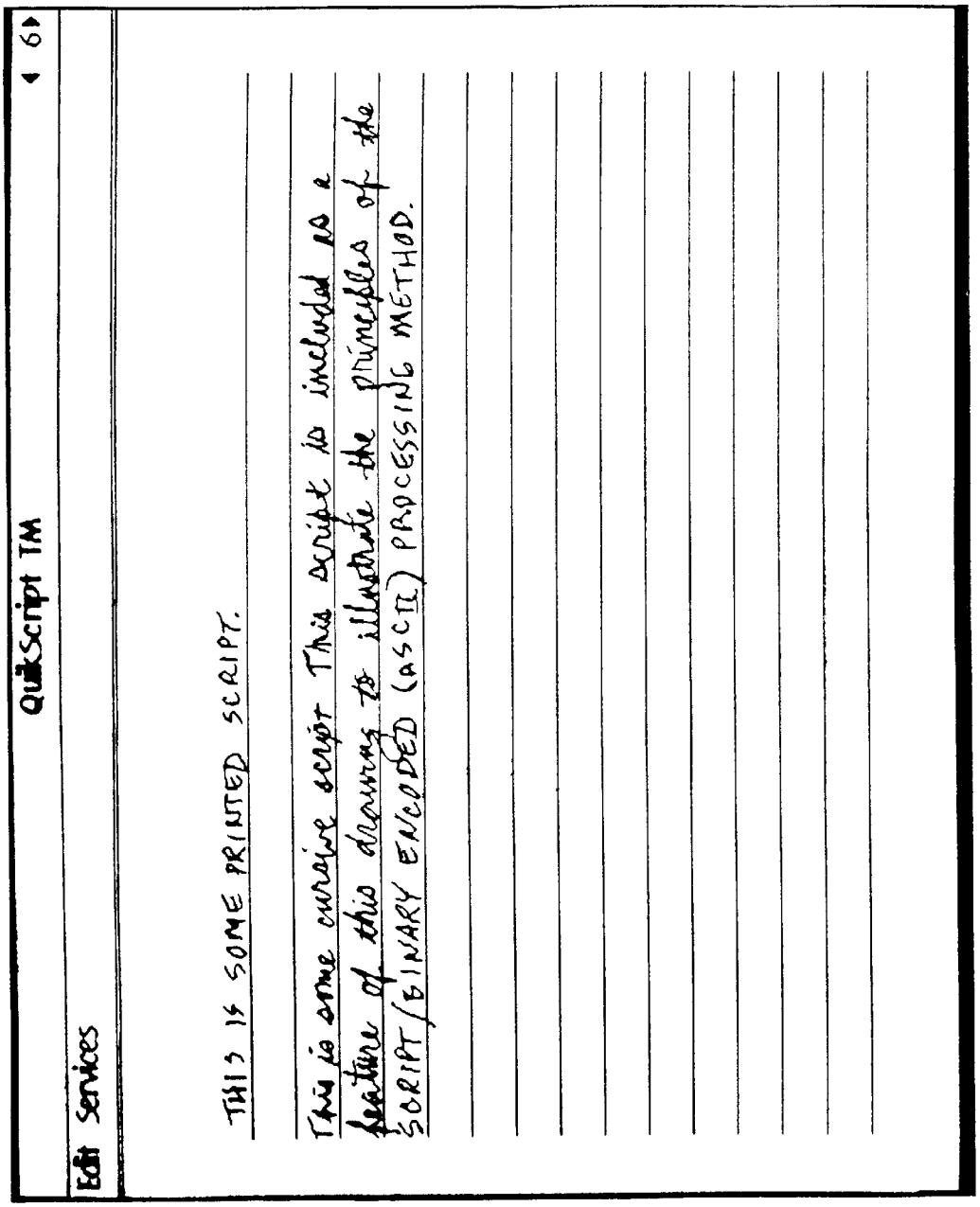
Figure 7F:
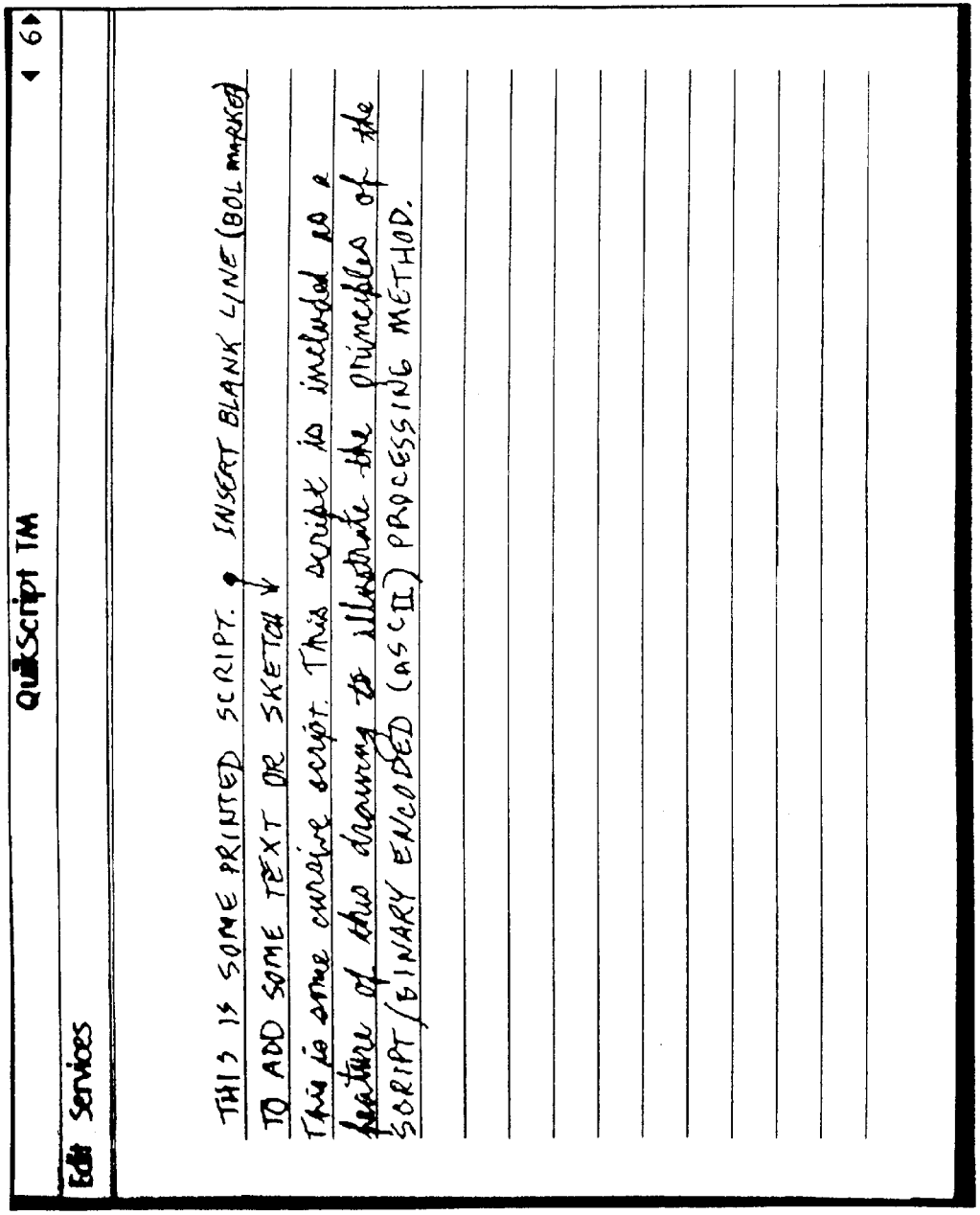
Figure 7G:
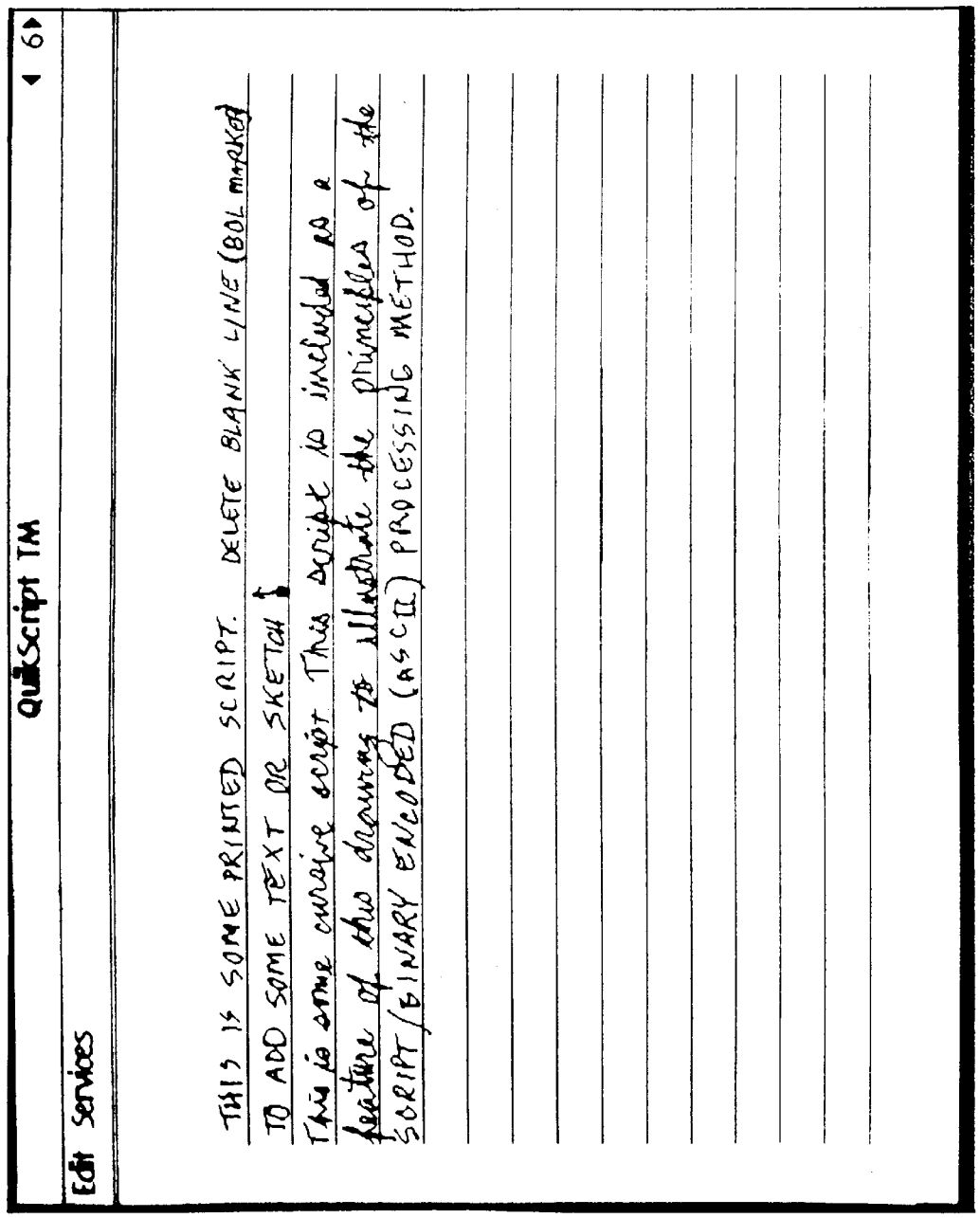
Figure 7H:
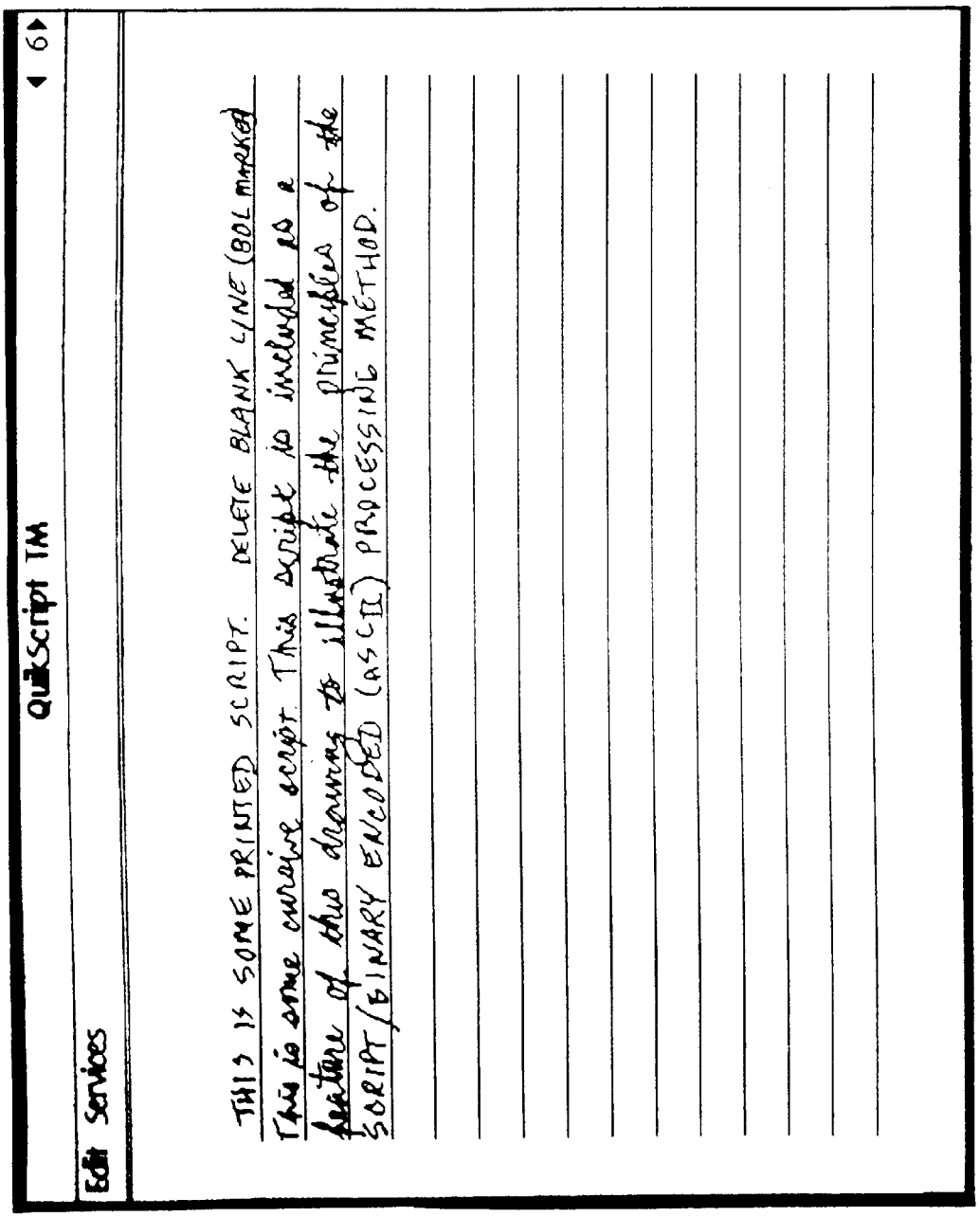
Figure 7I:
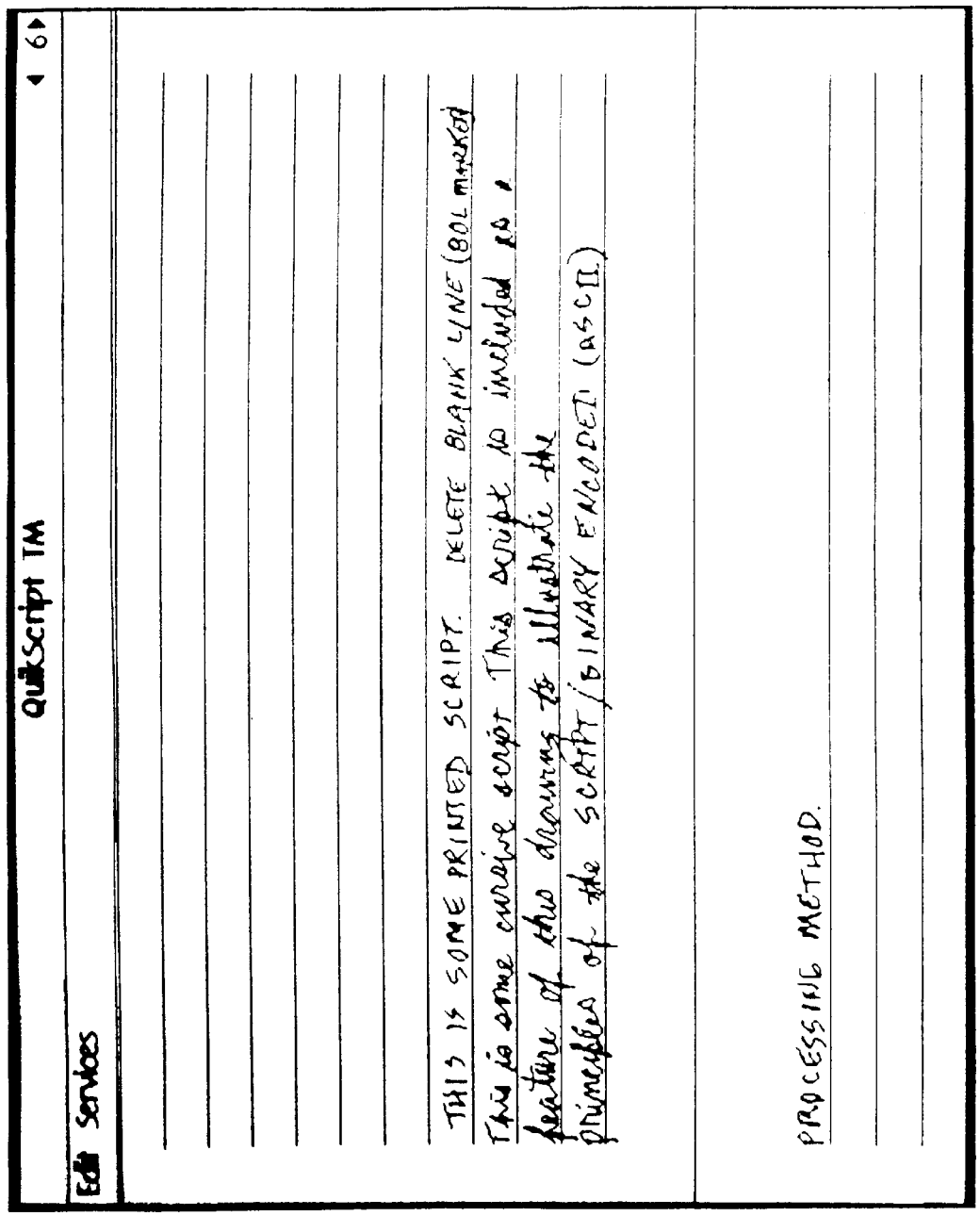
Figure 7J:
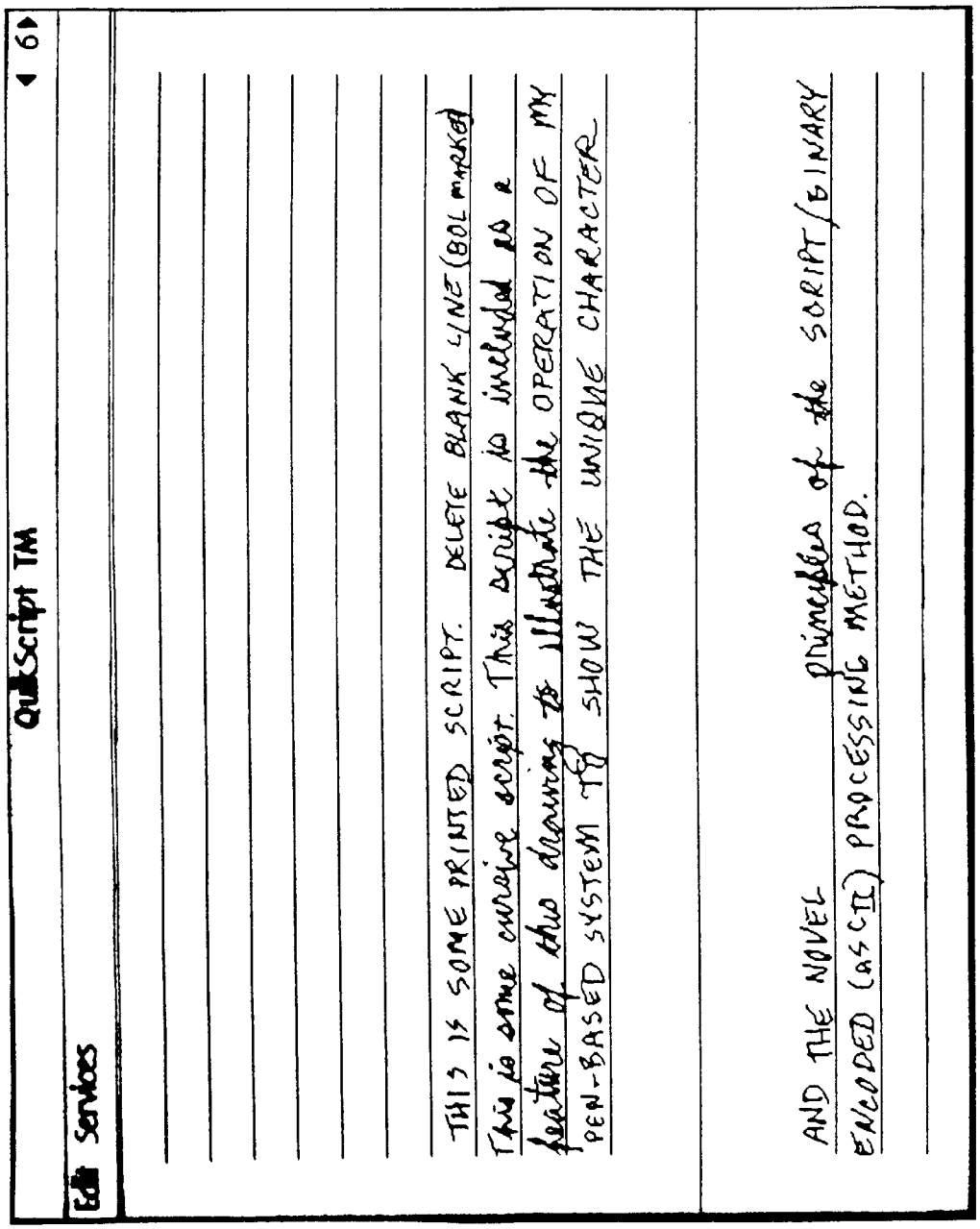
Figure 7K:
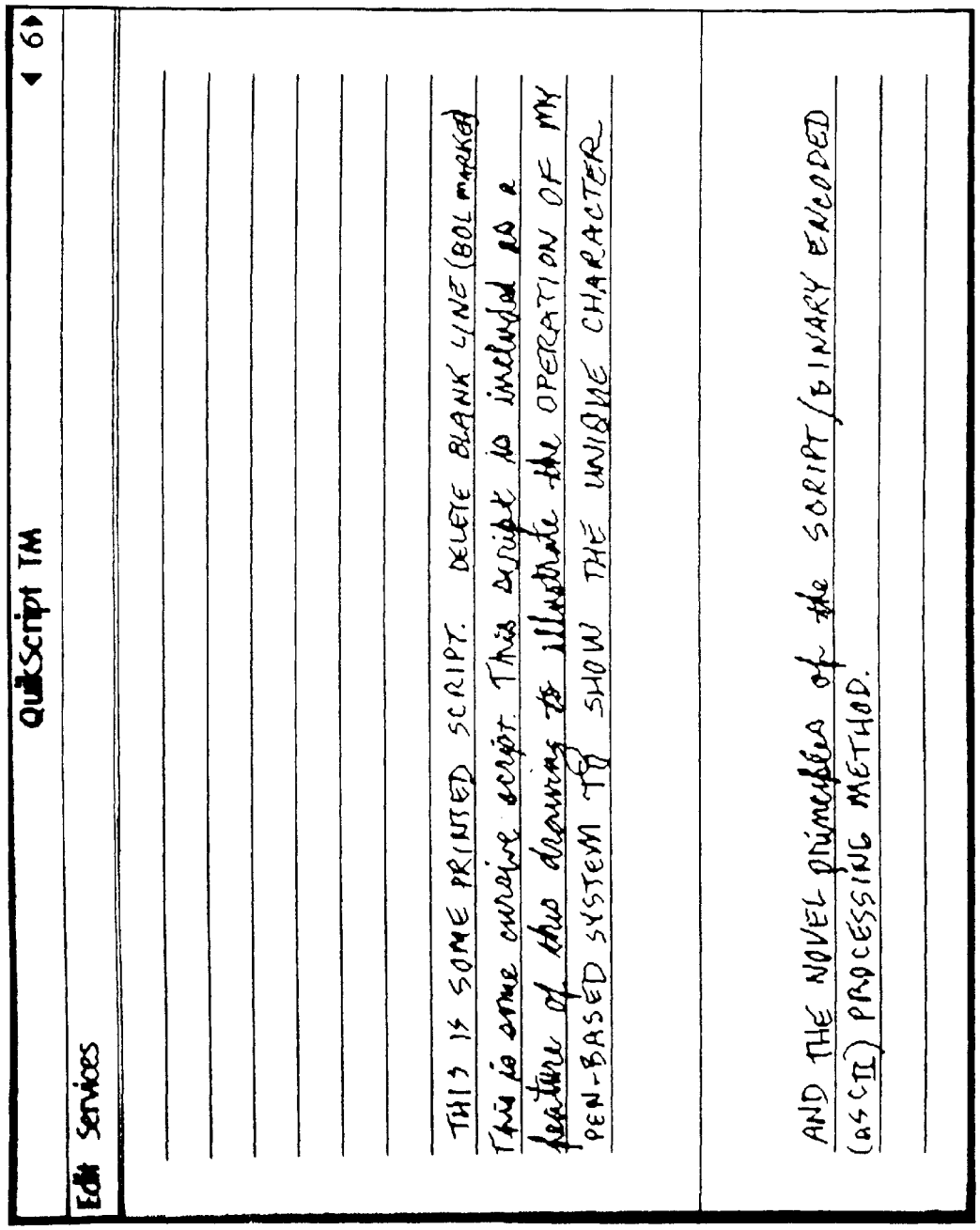
Figure 7L:
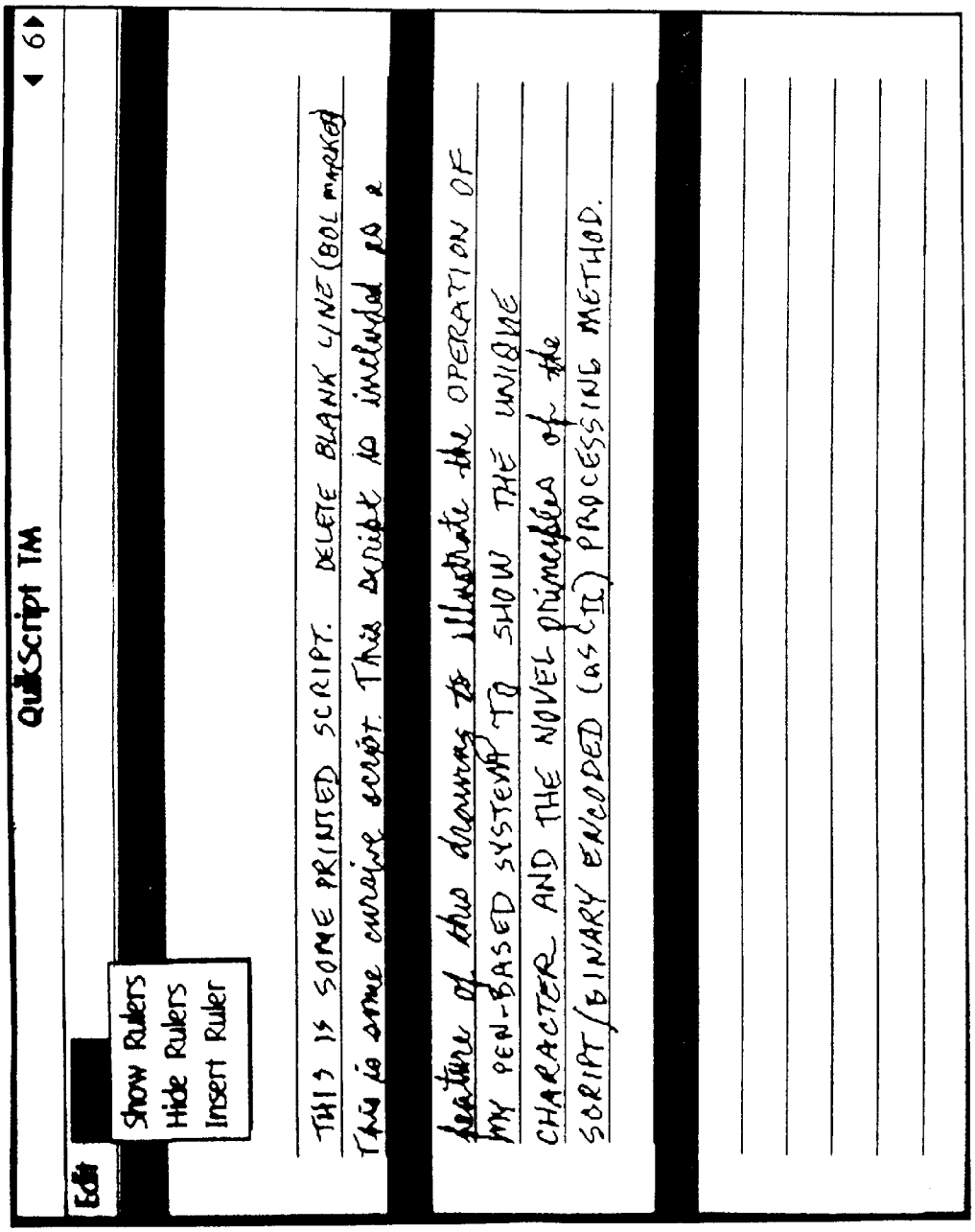
Figure 7M:
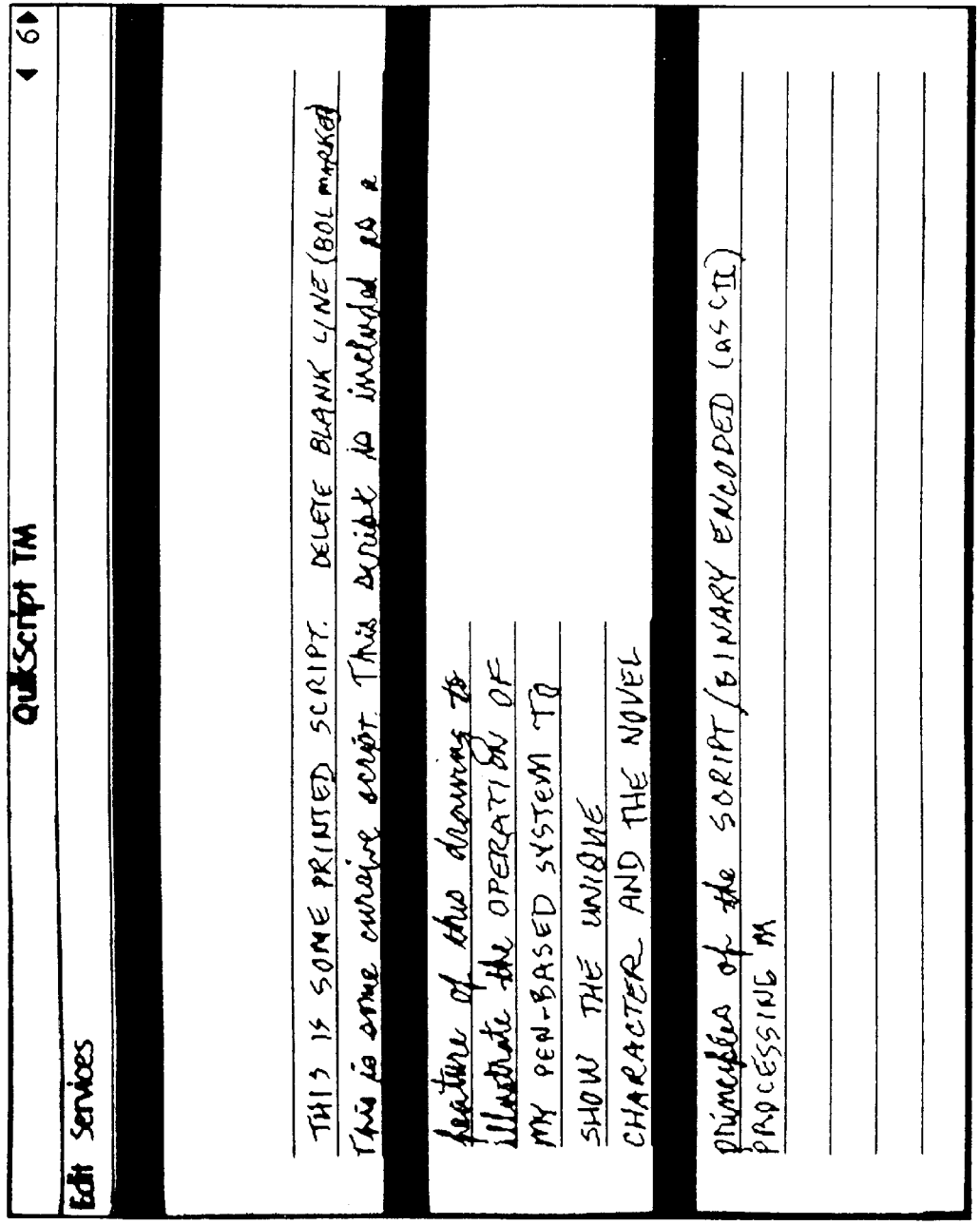
Figure 7N:
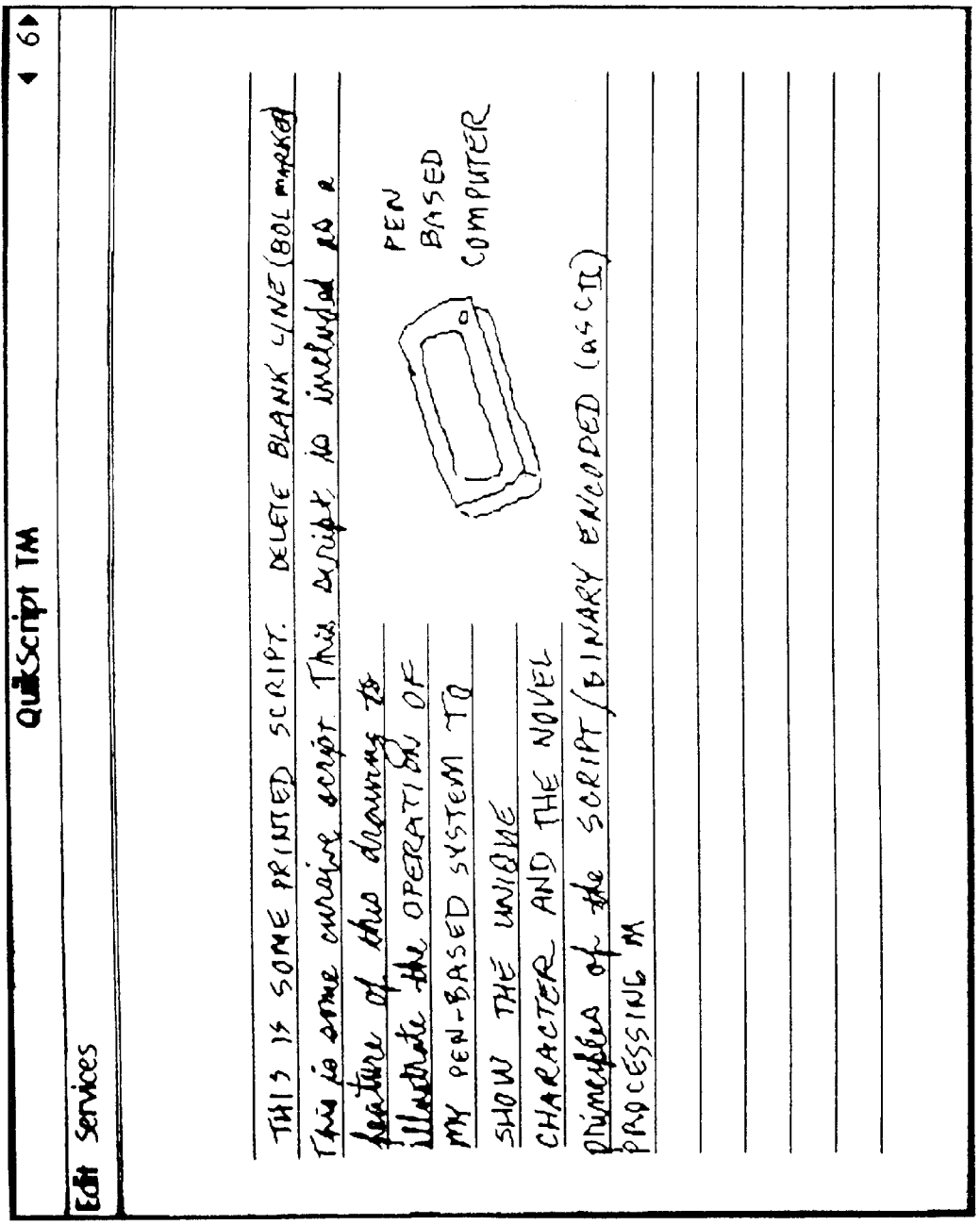
Figure 7P:
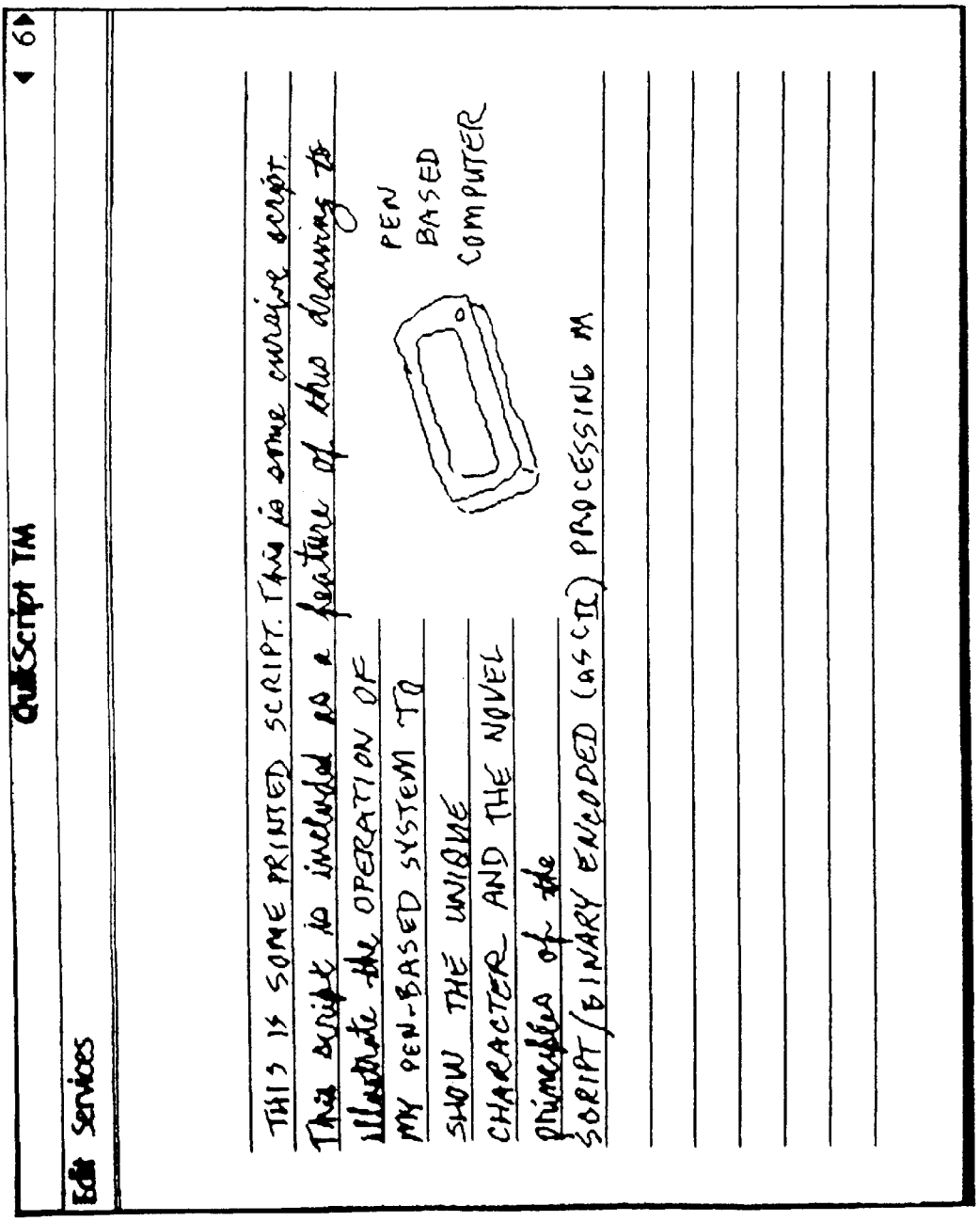

For example, a selection gesture can cause the selected line space and strokes/words to be highlighted in some way, such as by drawing a transitory line that follows the gesture as shown in FIG. 7D, or by inverse video or bolding the selected line space and script or text. With sufficient computing speed, the selected command function can be executed as the gesture is being made. For instance, a line insertion gesture could cause blank lines to be inserted and displayed as the user makes the gesture. This sort of feedback is highly desired by the user.

Following is a description of the preferred gesture set as shown in FIGS. 4A–4H and the control and edit functions for each gesture.

Insert Space Gesture 54 (FIG. 4A)

This gesture inserts (opens up) an amount of space on the gesture line equivalent to the length of the gesture stroke. Words pushed off the end of the line wrap to the next line.

Delete Space Gesture 56 (FIG. 4B)

This gesture deletes (collapse) space/strokes underneath the gesture stroke. Words from following lines may wrap back to the gesture line if it is permissible to remove words from the following lines (i.e., no intervening BOL marker). If this gesture follows all strokes on a line, words will be allowed to wrap back to the gesture line from the following line even if they previously were disabled from doing so by a Beginning of Line marker.

Insert Beginning of Line (BOL)

Marker Gesture 58 (FIG. 4C)

All strokes (words) following this gesture are wrapped forward to the next line. No words from preceding lines will be allowed to wrap onto this "protected" line unless the Beginning of Line marker is removed. The number of markers inserted depends on the distance of the gesture stroke. Multiple BOL markers will appear to the user as blank lines.

Figure 4D:
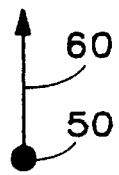

Delete Line Contents Gesture 60 (FIG. 4D)

This gesture deletes the text (ruled) area contents of each line touched by the gesture stroke.

Figure 4E:

Mark Block Gesture 62 (FIG. 4E)

Two separate gestures are required after the gesture prompt to mark a block of text. The first gesture marks the beginning/end of the block and the second gesture marks the end/beginning of the block. The mark block gesture line must stay within the confines of the ruled line lest it be recognized as an Insert BOL marker gesture. Ink dribbling, paging, scrolling, etc. can occur between the beginning and end mark gestures.

Figure 4F:
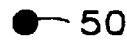

Insert/Collapse Moving Space Gesture (FIG. 4F)

The insert moving space gesture consists of lifting the pen out of contact with the digitizer surface without moving it laterally, after the gesture prompt. This gesture is used to open up an indefinite or moving amount of space within a line of script or text so the user can insert additional script or text. About 1.5 inches (6 cm.) of space will be opened immediately to the right of the pen down position initially upon recognition of the gesture. After the space opens, the user lowers the pen and begins writing. As the user writes, additional space will automatically be provided in order to accommodate continuing strokes. This method can be called "auto-insertion." Any words pushed off the end of the initial pen-down line by the auto-insertion will be wrapped to the following line. Repeating this gesture (i.e., prompt plus lift pen) collapses the moving space.

Note that actions resulting from the foregoing gestures, when located in the lined area of the document display, will in no way affect drawings in the unlined drawing areas surrounding or adjoining the gesture-modified text. The gesture set is context-sensitive, however, so that the same gesture can be used in the unlined areas to perform either different editing functions or similar functions only in the drawing area, i.e., without affecting contents of adjoining lined area.

Figure 7Q:
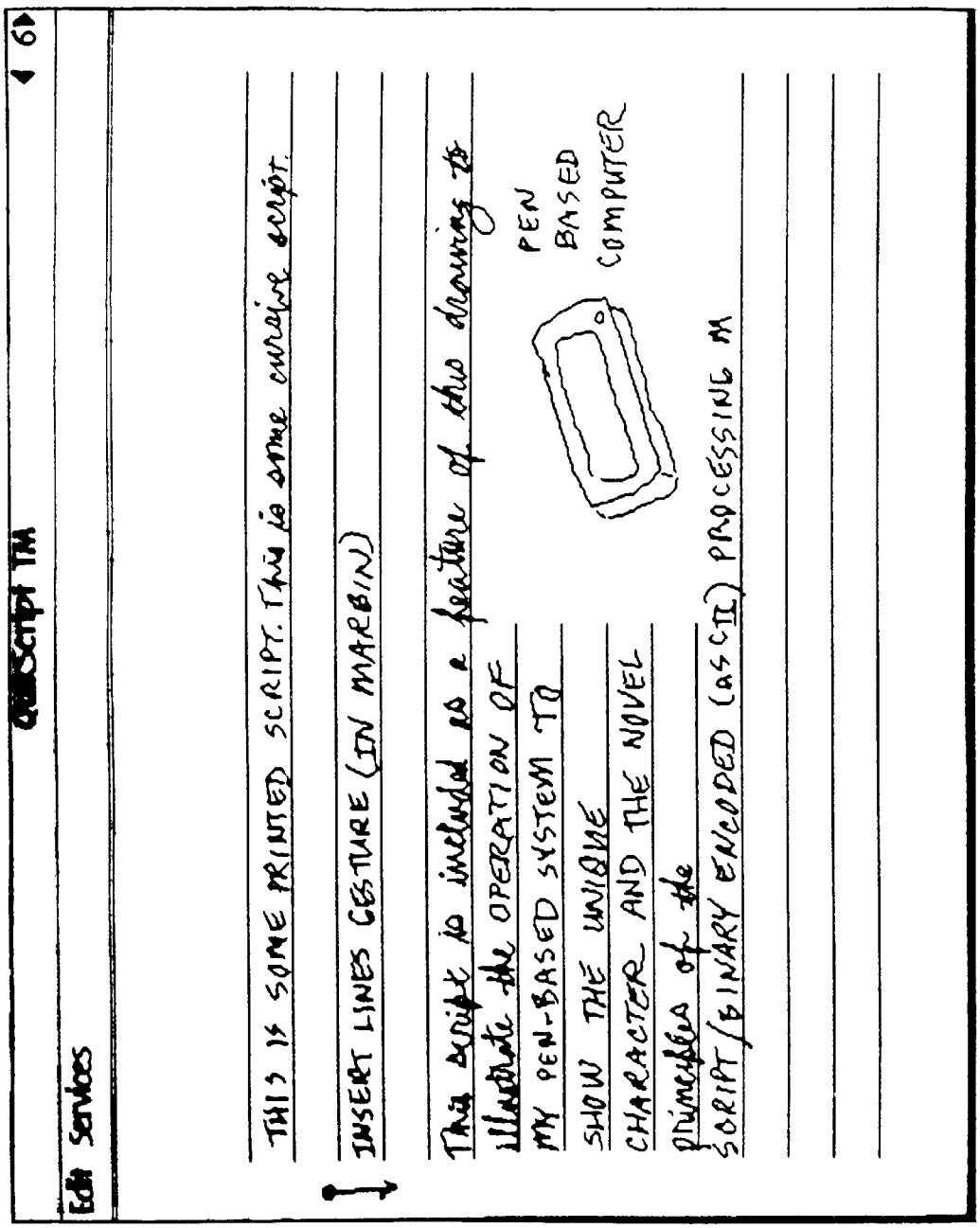
Figure 7R:
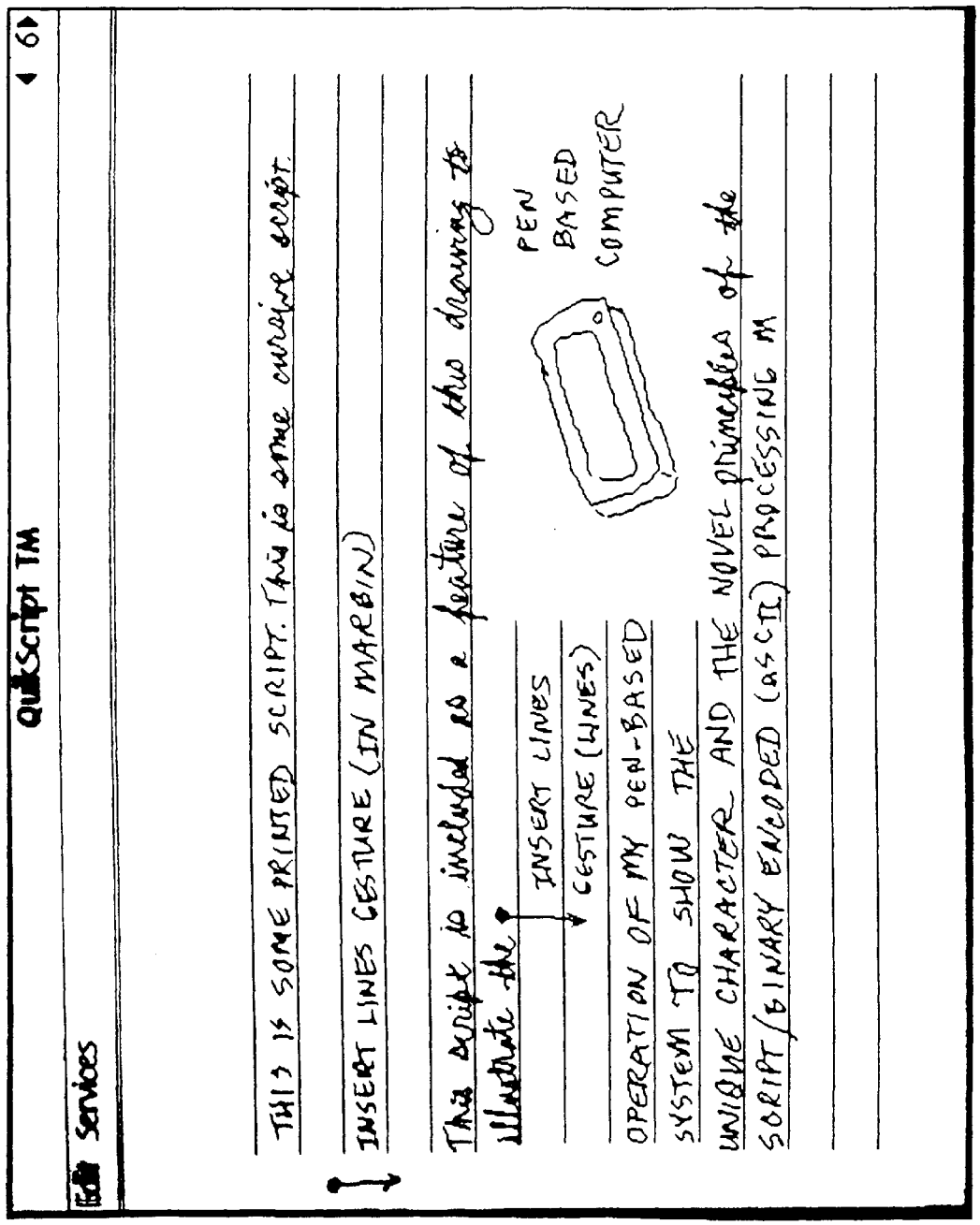

Line Insertion Gesture (see FIG. 7Q)

The Line Insertion Gesture is like the Insert BOL gesture 58 (FIG. 4C) but is located in the unlined margin alongside a line. A whole line (text area+drawing area) or multiple lines will be inserted in the lined area laterally adjoining the gesture location shifting all lines below it downward within the document. This will cause the last line on each affected document page to be shifted over the bottom and top margins (if any) to the first line of the next document page. The inserted line takes on the. characteristics (ruled area margins, etc.) of the line/ruler that precedes it. Multiple lines can be inserted by extending the distance that the gesture covers.

Figure 7S:
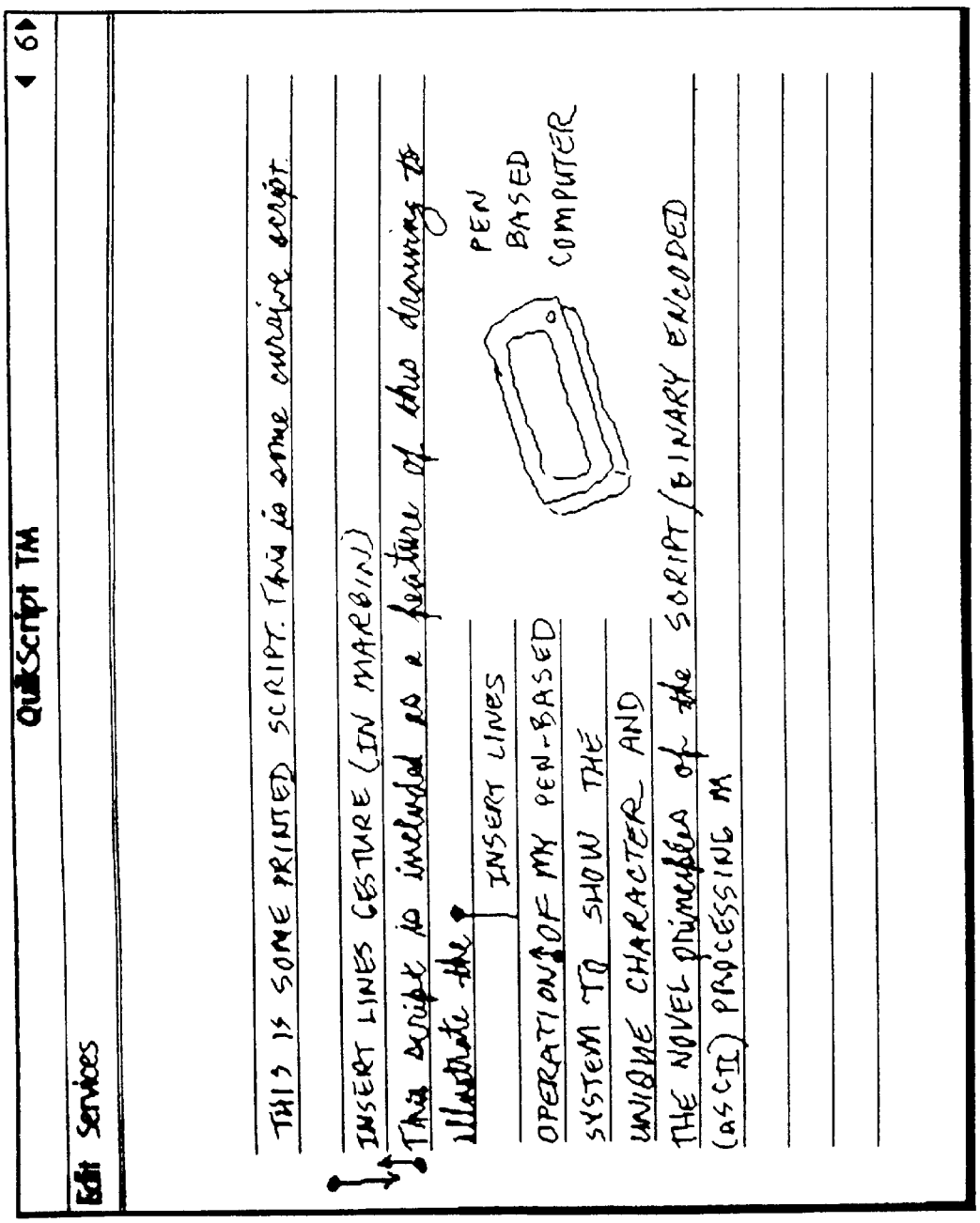

Line Deletion Gesture (see FIG. 7S)

This gesture is like gesture 60 (FIG. 4D) but performed in the margin. A whole line will be deleted from the document, shifting all lines below it upward within the document. This will cause the first line on each succeeding document page to be shifted up over the top and bottom margins (if any) to the last line on the preceding document page. Multiple lines can be deleted by extending the distance that the gesture stroke covers. This gesture can also be used to delete the contents of a top/bottom margin line, although the margin line itself will not be deleted. The gesture can be used to delete a ruler, causing the lines following the deleted ruler to be formatted according to the ruler preceding the deleted ruler.

Figure 4G:

Stretching Box Gesture 64 (FIG. 4G)

The Stretching Box Select gesture (which might also or alternatively be represented by an icon) selects all drawing area strokes touched/enclosed by the rectangular area.

Figure 4H:

Rope Select Gesture 66 (FIG. 4H)

The Rope Select gesture (might also be represented by icon) selects all drawing area strokes touched/enclosed by roped area.

Prompt-Specific Gesture Sets

Multiple unique gesture prompts allow for the classification of gestures. Each specific gesture motion can be associated with one or more prompts (pen actions). In FIG. 41, two unique prompt images are shown, each with a set of gesture pen motions. Note that the first five gestures in each set is unique in function although the gestures are identical motions. The last three gestures in each set are similar in both motion and function.

Another interesting aspect of the gesture set shown in FIG. 41 is that, with the exception of Pen Up and Mark Block, all of the gesture motions can be recognized as specific gestures (given the context in which they are currently supported) even before the gesture is completed. This allows dynamic feedback to be provided to the user as the user performs the gesture (e.g., showing increasing amounts of whitespace and word wrapping as the user inserts space). The current implementation of the software waits for the user to complete gestures before acting upon them. Future versions will utilize multi-tasking to provide dynamic feedback that is highly responsive to the pen.

Selected Strokes

A variety of functions can be applied to selected strokes in text or drawing area. These functions are available through menu selection: delete, cut, copy, paste, highlight (bold, outline, etc.), translate (from script into ASCII), evaluate (math expressions), etc. In addition, selected strokes can be dragged by touching the pen to the selected strokes and dragging. Strokes can be selected by invoking the I-beam gesture prompt 52 (FIG. 1) and dragging it through the stroke(s) to be selected.

Figure 8:
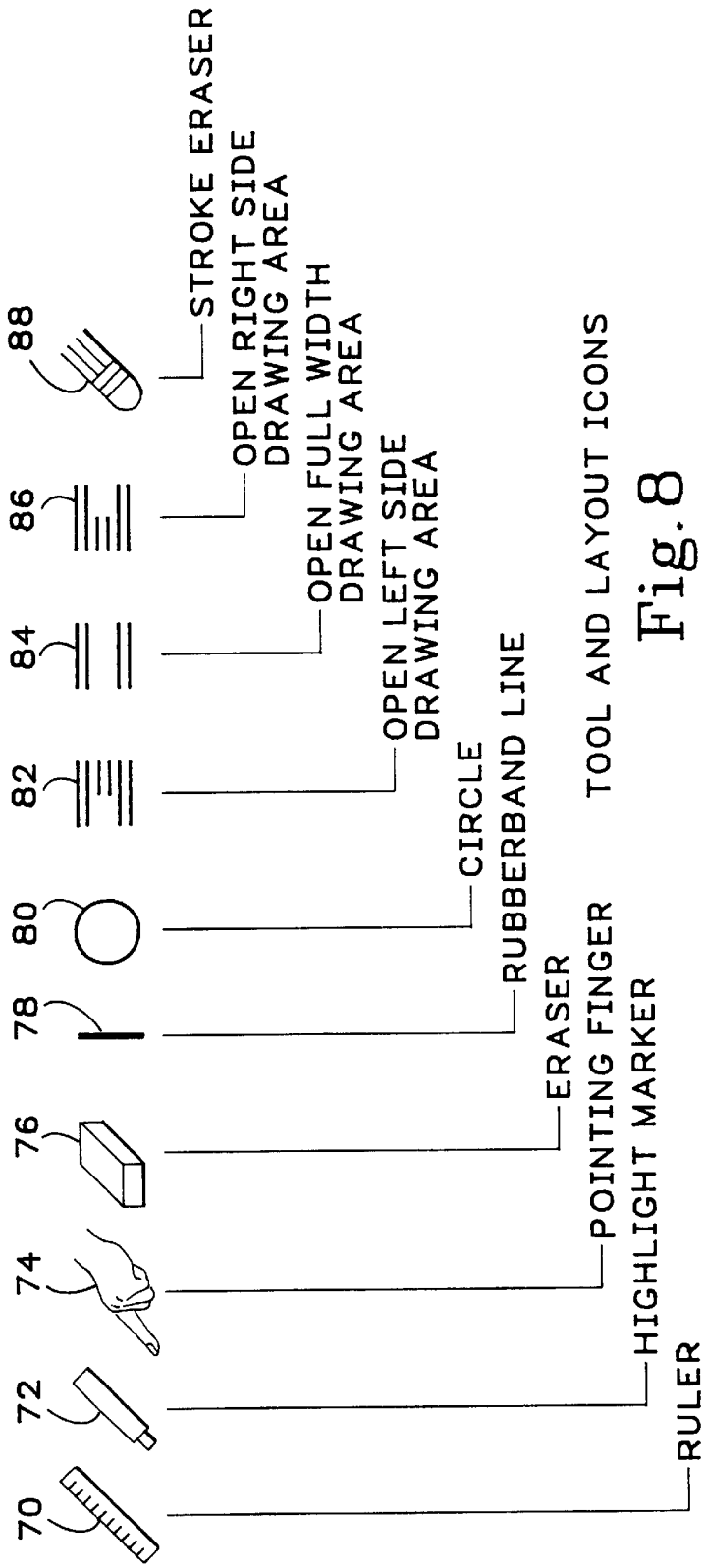
FIG. 8 is a preferred set of command icons and corresponding functions used in the present invention.

Additional editing tools can be provided and represented by suitable icons. All tools are picked up, used one or more times, and then returned to their original places. A preferred set of tools and examples of corresponding icons are shown in FIG. 8.

Ruler 70

The user picks up the ruler icon in order to insert a ruler. A ruler will be inserted at the pen down position within the document.

Highlight 72

The highlight marker is used to highlight strokes. The highlight remains on the strokes until it is explicitly removed by the user through repeat (inverse) highlighting or SELECT, choose new highlight. Multiple highlight markers or a single "multicolored" highlight marker may exist to accommodate different highlighting needs.

Pointing Finger 74

The pointing finger is used to select text. It can be used in place of the drag select gesture if desired. It is different from the drag select gesture in that it allows the user to select more than one piece of text.

Eraser 76

The eraser erases pixels within text or drawing areas without collapsing blank space. The eraser can come in different sizes to erase pixel swaths of different widths.

Rubberband line 78

The rubberband line is provided so that the user can draw straight lines within the text or drawing area without the use of a template or straightedge.

Circle

The circle allows the user to draw variable sized circles within the text or drawing area without the use of a template.

Open Drawing Space Left 82, Full-Width 84 and Right 86

These icons are invoked to change line lengths to increase the available unlined drawing space in an adjoining margin, or to extend the drawing space all the way across the page.

Stroke Eraser 88

The stroke eraser will erase only the pixels of strokes, not affecting any ASCII text. This is quite useful when annotating documents that exist primarily in an ASCII text form.

Conversion of strokes to Internal Stroke Format

Following is a description, with reference to FIGS. 6A–6D, of how strokes go from being input glyphs to residing within the software system as meaningful data in accordance with another aspect.

Figure 6A:
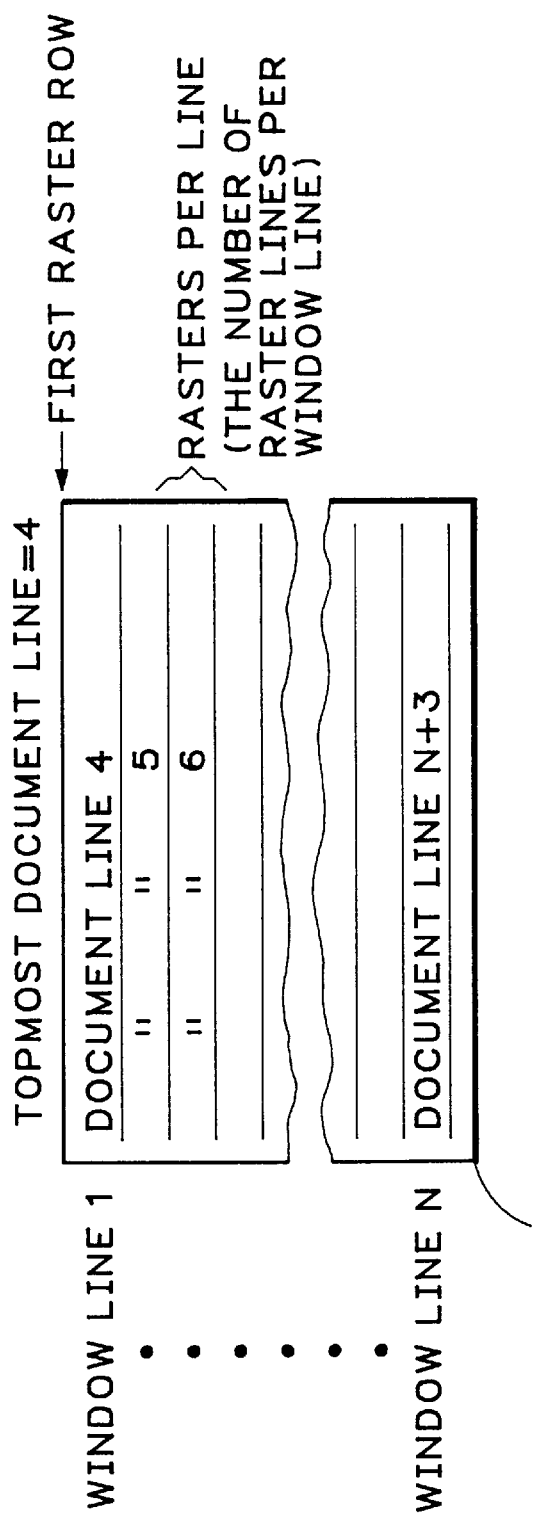

For simplicity, the following description assumes that lines are stored at screen (raster) resolution. As shown in FIG. 6A, the document exists in a window (a bit-mapped display area having its origin in the lower left corner) having a series of logical lines, the first line being numbered 1 and succeeding lines having increasing line numbers (through line N). The document is displayed with lower document line numbers (e.g., lines 4, 5, 6) appearing at the top of the window and document line numbers increasing as document lines are displayed toward the bottom of the window (e.g., line N+3). At any point in time the window represents a viewport onto a certain number of document lines. The exact location of the viewport onto the document is maintained by keeping track of the first (topmost) document line (e.g., line 4) that will be viewable in the window.

When a stroke is stored into the document, the document line into which the stroke will be rooted must be determined. A number of methods exist for mapping a stroke to a certain window line. The two discussed below are "pen-down targeting" and "dynamic targeting." The preferred of the two is a function of the user's writing style.

Pen-Down Targeting

The first method "roots" the stroke in the line where the pen tip is first touched down. This method is simple and generally effective. The corresponding window line is then determined using the following equation:

$$WLN = ((FRR - PDYV)/RRPL) + 1$$

in which:
- WLN = Window Line Number;
- FRR = First Raster Row;
- PDYV = Pen Down Y Value; and
- RRPL = Raster Rows Per Line.

Now that the window line number has been determined, the document line that the stroke belongs to can be determined by the following equation:

$$DL = (TDL + WL) - 1$$

in which:
- DL = Document Line;
- TDL = Topmost Document Line; and
- WL = Window Line Once the document line is determined, the document line needs to be retrieved from the document line database.

Dynamic Targeting

Pen down position rooting or "targeting" works very well as long as the user begins each stroke in the line where the text being written resides. Unfortunately pen down targeting is too restrictive for most writers. "Dynamic targeting" allows writers to be more sloppy about where their strokes begin. If the user started a stroke in the line preceding or following the intended line, the stroke should still be rooted in the intended line.

The method is labeled "dynamic" because it determines where strokes are rooted as soon as enough information about the stroke is available. Dynamic targeting does not wait for the user to perform a specific action, e.g., changing the input context or lifting the pen out of proximity, before rooting the stroke.

Dynamic targeting initially roots long strokes in a line space in which the vertical 'center of gravity' position, i.e., a y coordinate, resides. Short strokes, however, such as a comma, are initially rooted in their pen down line. This initial rooting of strokes occurs until a current input line is determined using a predetermined number of strokes or by an insertion of a moving space, as described below. Once the current input line is determined, the predetermined number of strokes that were used to determine the current input line are moved to the current input line. Dynamic targeting can, therefore, uproot strokes from their initial line space and reroot the strokes in the current input line, if the current input line differs from the initial rooting line space.

A current input line can be established in two ways. First, a current input line is always established when a moving space is opened. In this case, the moving space is the current input line. In addition, if a current input line has not been determined, but a moving space is open, the moving space is assigned the current input line if a stroke enters the moving space. Second, during the initial rooting, if a predetermined number (N) strokes are proximately located, a current input line is established according to the positions of the N strokes, as described further below.

Figure 13:
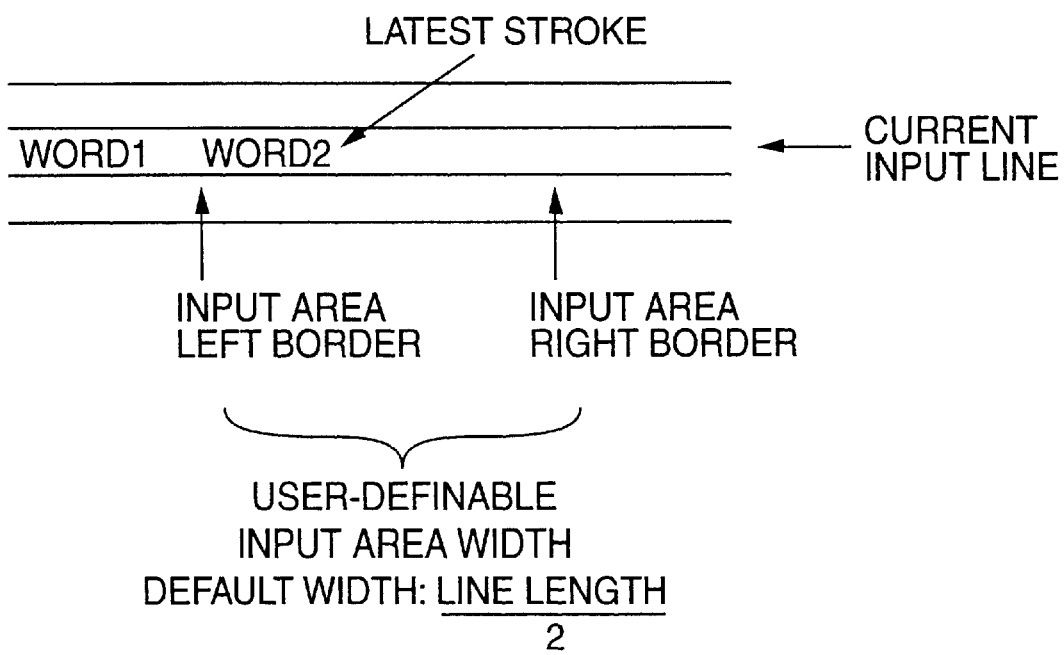
FIG. 13 is a diagram showing a pen-based computer display using dynamic targeting.

Referring to FIG. 13, a portion of the display including three lines is shown. In a middle line, which is defined as a current input line, two words are shown: "word1" and "word2". The current input line contains a user-definable input area beginning at a input area left border and spanning to an input area right border, as shown by a bracket in FIG. 13. The user-definable input area has a default width equal to the current input line length divided by two. The temporal order in which the strokes are entered is recorded in order to perform the dynamic targeting. In the example shown at FIG. 13 "word2" is entered after "word1" Further, the "2" in "word2" is the latest stroke entered in the current input line. The significance of the temporal order of the strokes will become apparent when the method is further described herein below.

Figure 14B:
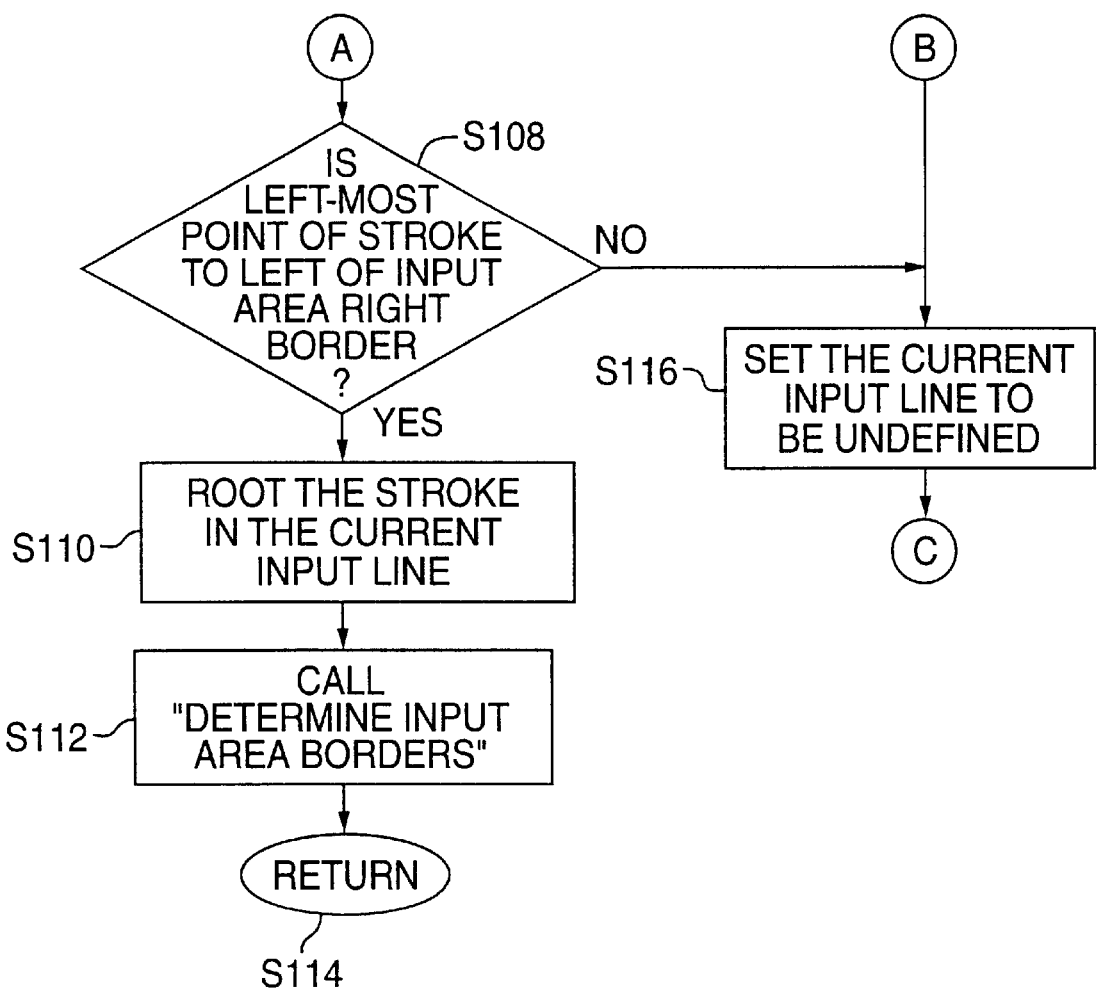

The dynamic targeting method begins by capturing the most recent stroke, as shown in FIG. 14A. In step S100, the method determines whether a current input line is defined or not. If a current input line is defined the method proceeds to step S102; otherwise the method proceeds to step S118 in FIG. 14C. If a current input line is defined, the method determines whether any portion of the current stroke touches the current input line. If so, the method transitions to step S104. If not, the method transitions to step S116 in FIG. 14B. If the current stroke touches a portion of the input line, step S104 determines whether a portion of the current stroke extends beyond the two lines adjacent to the current input line. As long as the stroke does not extend beyond the three line window defined by the current input line and the two adjacent lines, the method transitions to step S106. If the stroke exceeds the bounds of the three line window the method transitions to step S116. Next, in step S106, the method determines whether a right-most point of the current stroke is to the right of the input area left border. If so, the method then determines whether a left-most point of the stroke is to the left of the right border of the current input area in step S108 (FIG. 14B). If either of these two determinations are negative a method transitions to step S116, which sets the current input line to an undefined state. If the determinations in steps S106 and S108 are affirmative, the method roots the current stroke in the current input line in step S110. The dynamic targeting method then determines the new input area borders for the current input line in step S112, which is described further with respect to FIG. 16 below.

Figure 14C:
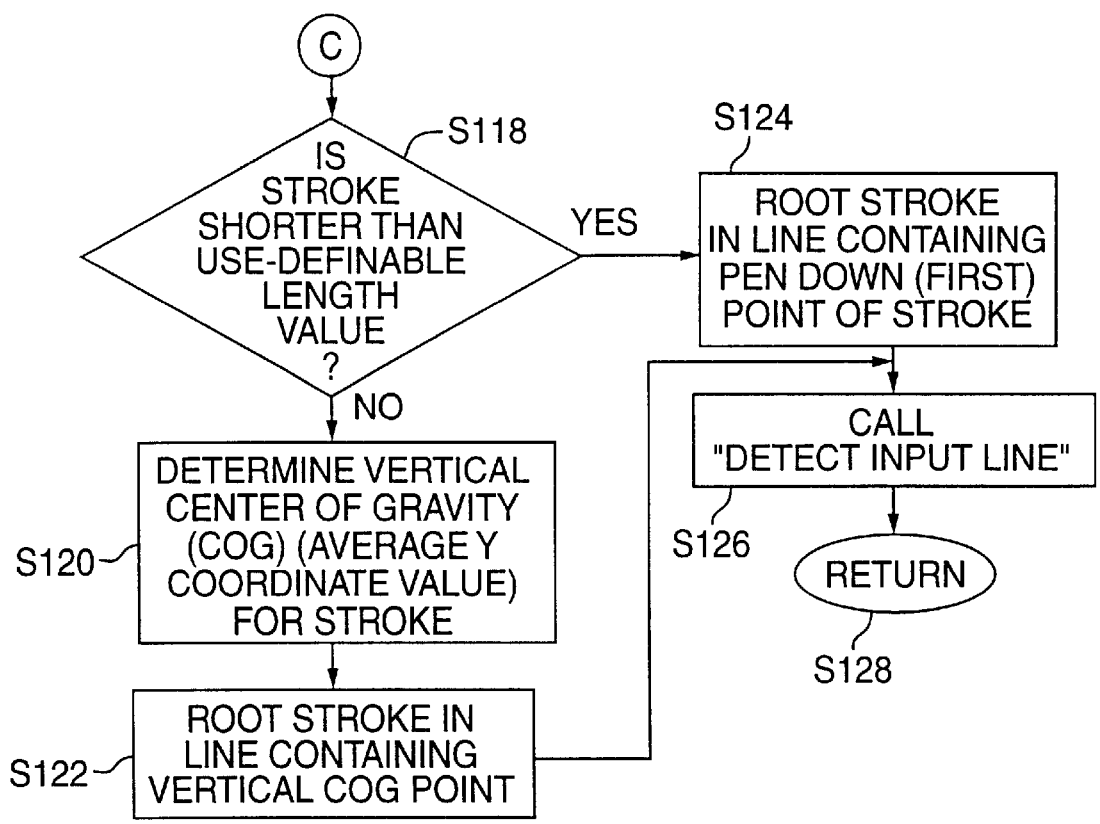

Referring now to FIG. 14C, if the current input line is undefined, the current stroke is compared to a user-definable length value in step S118. If the stroke is equal to or longer than the user-definable length the vertical center of gravity is determined for the stroke in step S120. The stroke is then rooted in a line in which the vertical center of gravity resides in step S122. The vertical center of gravity is equal, for example, to the average Y-coordinate value for the stroke.

If, however, the stroke is shorter than the user-definable value the stroke is rooted in the line in which the pen was first put down, i.e., the "pen down" position. In either case, the dynamic targeting method detects the input line in step S126.

Figure 15A:
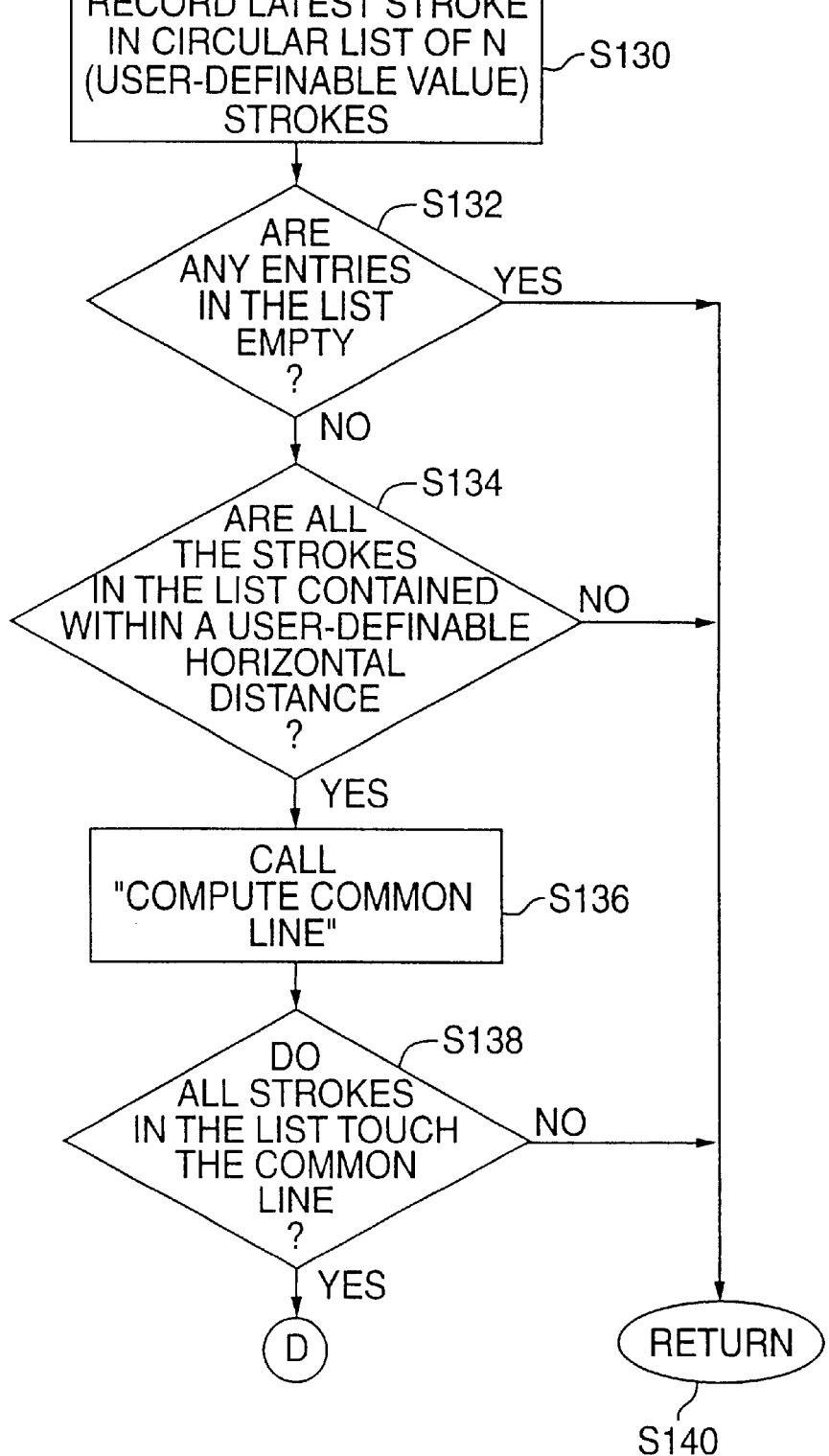
FIGS. 15A–15B are diagrams illustrating the process for determining a current input line as required in the diagram shown in FIG. 14.
Figure 15B:
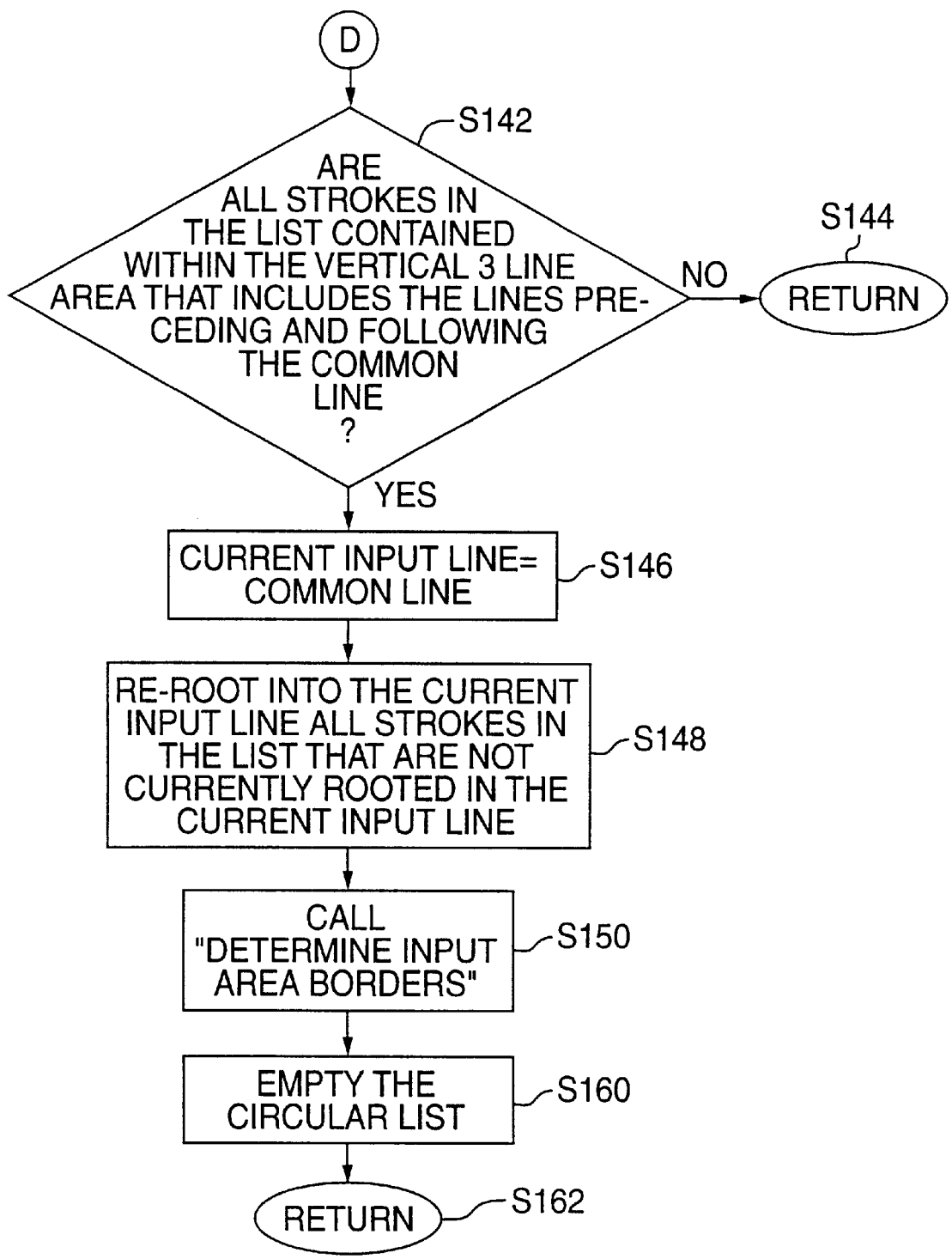

Referring now to FIG. 15A, the detect input line method is shown. The detect input line method begins in step S130 by recording the latest stroke in a circular list of N (user-definable) strokes. The circular list is a data structure known in the art of computer programming. The circular list typically consists of a linked list having a tail pointing back to a head of the list. If there are remaining entries in the list, i.e., N strokes have not been entered, the method returns in step S140. If N strokes have been detected, step S134 determines whether the N strokes are within a user-definable horizontal distance. If so, a compute common line function is called in step S136. Otherwise, the method returns in step S140. Following the compute common line step, described below, step S138 determines whether all N strokes touch the common line computed in step S136. If so, referring now to FIG. 15B, the method that determines whether all N strokes are contained within the vertical three line area in step S142 is performed. Otherwise, the return step S144 is performed.

If all of the strokes are contained within the vertical three line area the current input line is set to the common line calculated in step S136. Once the current input line is determined, the N strokes which are not rooted in the current input line are rerouted into the current input line in step S148. Next, the input area borders of the current input line are determined in step S150. The circular list is then emptied in step S160 and the detect input line procedure is complete.

Figure 16:
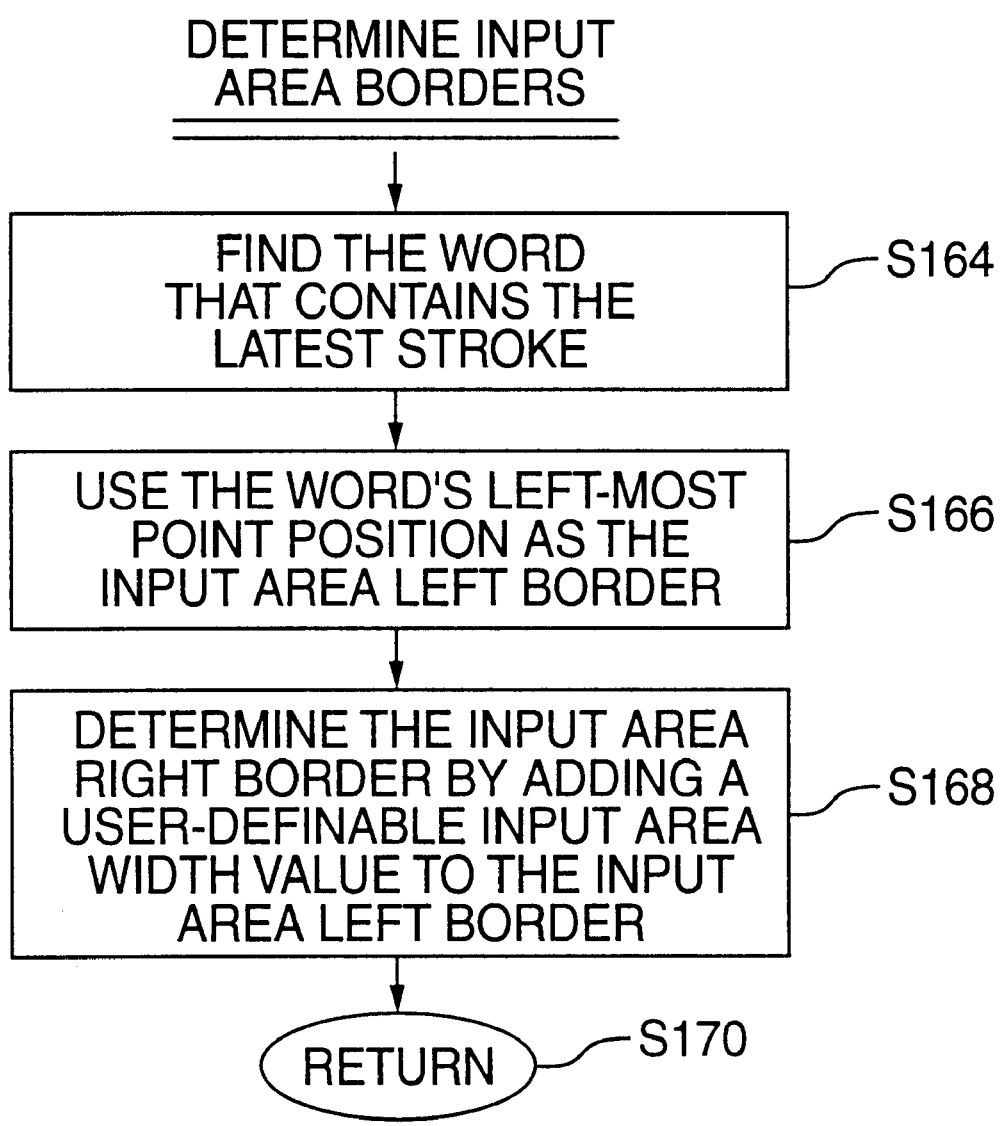
FIG. 16 is a diagram illustrating the process for determining a input area border for the input line as required in the diagram shown in FIG. 15.

Referring now to FIG. 16, the determine input area borders method is shown. In step S164, the input area borders method first finds the word that contains the latest stroke. The left border of the input area is then set equal to the word's left-most point position in step S166. The right border of the input area is determined in step S168 by adding the user-definable input area width value to the input area left border determined in step S166.

Figure 17:
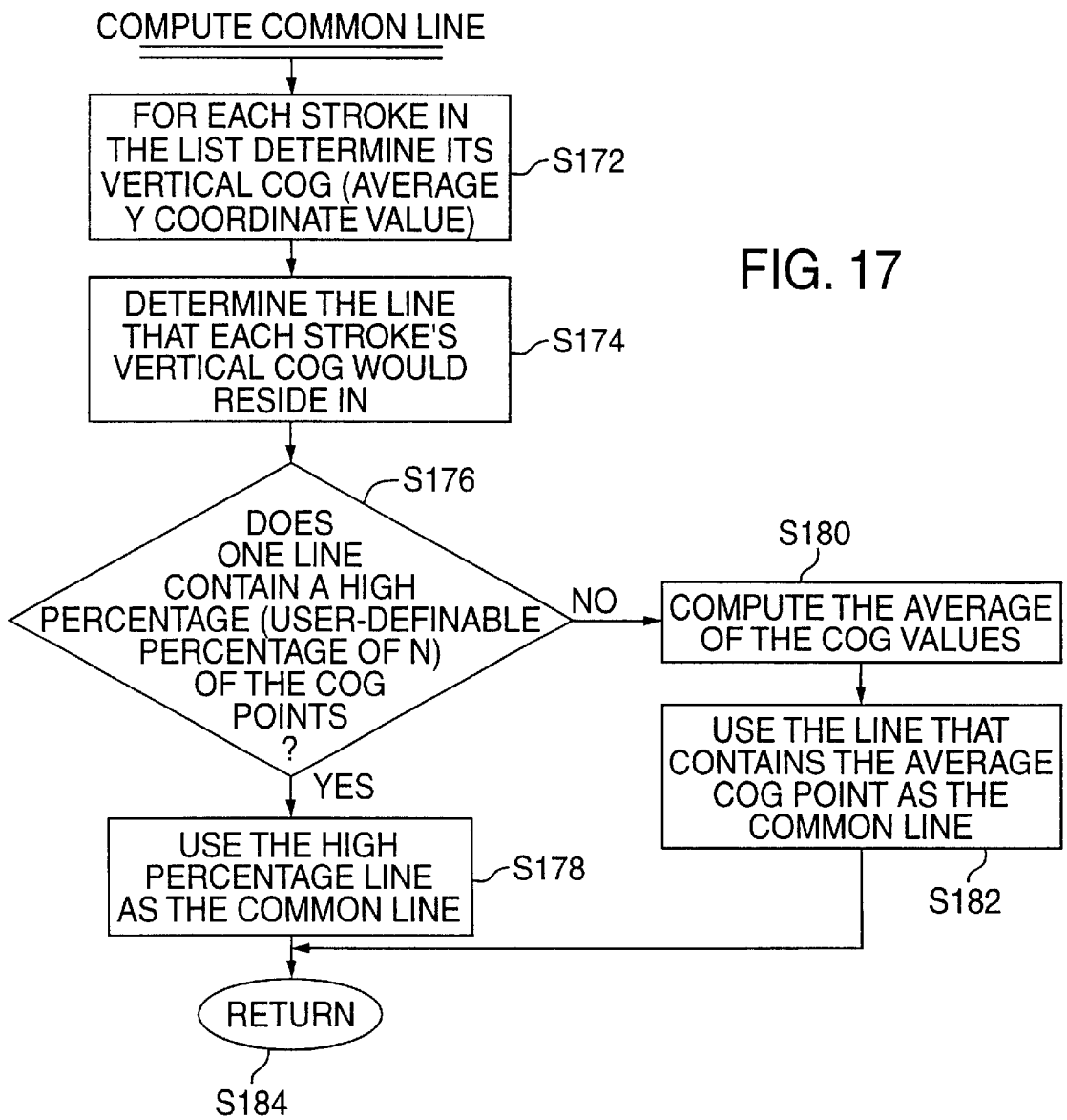
FIG. 17 is a diagram illustrating the process for determining a common line as required in the diagram shown in FIGS. 14–15.

Referring now to FIG. 17, the compute common line method is shown. First, a vertical center of gravity is determined for each stroke in the list. In the preferred embodiment, the vertical center of gravity corresponds to the average y-coordinate value for the stroke. In step S174, each vertical center of gravity is mapped to a line on the display wherein the center of gravity resides. If one of the lines in which the center of gravities reside has a high percentage of the center of gravity points, the common line is set equal to the line in which a high percentage of the center of gravity points resides. In the preferred embodiment, the "high-percentage" is a user-definable percentage. If there is no such line containing a high percentage of the center of gravity points, an average of the center of gravity values is computed in step S180. The average center of graivity value is mapped to a line in which the average center of gravity resides. The common line is then set equal to the line in which the average center of gravity resides in step S182.

The following example demonstrates the center of,gravity calculation in step S180. For example, assume N=3, as in the preferred embodiment. For strokes having center of gravities equal to 51, 55, 62, the average of these three values is 56. Therefore, the common line is the line space that contains the points having a y coordinate of 56.

Figure 18A:
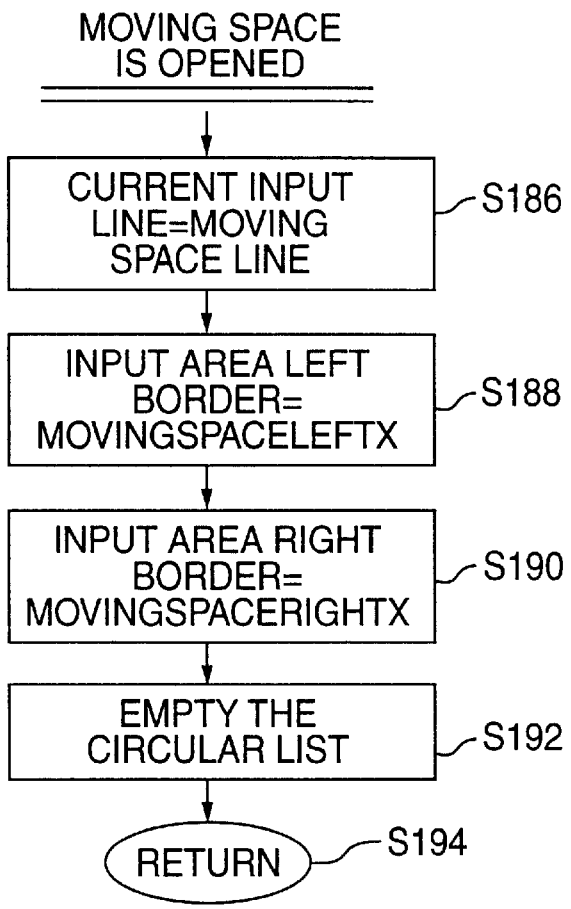
FIGS. 18A–18B are diagrams illustrating the dynamic targeting process using moving spaces.
Figure 18B:
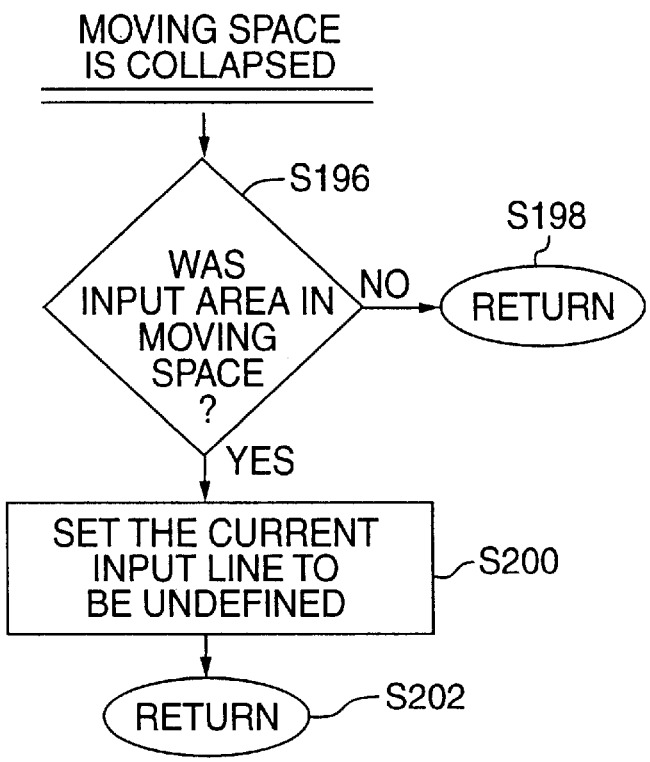

In addition to the method described above, when a moving space is opened the current input line is set equal to the line in which the moving space is open, as shown in FIG. 18A. If the current input line is set equal to the moving space line, the left border of the input area is set equal to the moving space left x variable in step S188 and the right border of the input area is set equal to the moving space right x variable in step S190. The circular list is then emptied in step S192 and the method is complete. Additional steps are required, however, when the moving space is collapsed, as shown in FIG. 18B. If the input area was equal to the moving space, the current input line is set to be undefined in step S200.

Once a current input line is established, subsequent strokes are examined to see if the current input line has changed. As long as subsequent strokes are contained at least partially in the current input line space and the horizontal positions of the strokes are at least partially within a predetermined horizontal area (the input area), the strokes will be rooted in the current input line. When a subsequent stroke does not touch the current input line or is not within a predetermined horizontal area, the current input line becomes undefined. Once the current input line becomes undefined, the dynamic targeting method resorts back to the initial rooting method.

With the document line established, the relative position of the stroke within the line must be determined. Due to the nature of the stroke compression method used to store strokes (it stores points within a stroke relative to the first point of the stroke), only the first point of a stroke needs to be assigned a position within the document line. The position will be relative to the line's left margin for the X-axis and relative to the bottom-most "raster" row owned by the document line for the Y-axis. This position can be identified by relative coordinates X' and Y'. The actual X and Y values used to anchor the stroke within a document line are determined using the following equations:

X:window X coordinate for first point in stroke

Y:window Y coordinate for first point in stroke

X'=X−left margin window X coordinate for the document line

Y'=Y−((FRR+1)−(WL*RRPL))

in which: FRR=First Raster Row;
    WL=Window Line; and
    RRPL=Raster Rows Per Line Now that the coordinates used to anchor a stroke within a document line have been determined, the next step is to compress the remaining points of the stroke. Any compression algorithm used must retain the point-to-point directional information inherent in strokes if those strokes are to be translated into ASCII text or used to characterize handwriting at some point in the future.

The basic assumption behind the processor compression algorithm is that strokes have momentum—a stroke is more likely to continue moving in a specific direction than it is likely to move in a dramatically different direction. This allows compression of a stroke by representing point increments within the stroke with predefined values that reveal any change in direction. For instance, the binary value 1 would mean: continue forward one point in the current direction. The binary value 00 would mean: move forward and to the left of the current direction by one point, causing the current direction to be redefined by the new direction. The binary value 01 would mean: move forward and to the right of the current direction by one point, causing the current direction to be redefined by the new direction. Visually it might look like FIG. 6B.

EXAMPLE 1

The arrows in FIG. 6B represent the current direction after the point at each arrow position has been encoded. The initial direction from starting point "x" is encoded per the binary values shown in FIG. 6C. The actual encoding of the circle shown would be a concatenation of the following binary directional data:

| | |
|---|---|
| 01011 | Point count in stroke less 1 (Note: This is the binary length of the stroke; it can be up to, e.g., 32 data points) |
| 000 | Direction from starting point "x" to point 2 (Note: the starting point is recorded as an X-Y coordinate. This is the "root" point of the stroke. This direction is the current direction at point 2.) |

-continued

| | |
|---|---|
| 01 | Direction change needed to get to point 3 (Note: 01 shows a change to the right; 00 would be to left.) |
| 1 | Continue in current direction to get to point 4 |
| 01 | Direction change needed to get to point 5 |
| 01 | Direction change needed to get to point 6 |
| 1 | Continue in current direction to get to point 7 |
| 01 | Direction change needed to get to point 8 |
| 01 | Direction change needed to get to point 9 |
| 1 | Continue in current direction to get to point 10 |
| 01 | Direction change needed to get to point 11 |
| 01 | Direction change needed to get to point 12 |
| 25 | bits |

This algorithm requires that all points in a stroke be adjacent. There can be no gaps or adjacent points having the same coordinates (duplicate points). In order to assure that there are no gaps, a line drawing algorithm is employed to fill any gaps in a stroke (typically due to moving the pen too fast) with a straight line before any attempt is made to compress the stroke. To remove duplicate points, which typically result from digitizing at high resolution and translating to a lower resolution, any duplicate points exceeding one are discarded at each position.

In order for this type of compression to be most efficient, the digitized strokes need to be smoothed. For instance, extraneous points, which result from digitizing at high resolution and translating to a lower resolution, need to be removed before the compression algorithm is applied. These extraneous points can be detected by searching through each stroke for formations that give the appearance of an "L" (two lines meeting at right angles. This search uses the matrix shown in FIG. 6D.

An "L" formation in FIG. 6D would be any series of points that fall into a 1, 2, 3 sequence. As a stroke is compressed, each point of the stroke (actually each point that is retained after the "L" formation lookahead) takes its turn in the "1" position. If the following 2 points make an "L" formation, then one of them must be discarded. The point to be discarded is determined by examining the position of a 3rd point following the point in the "1" position. This third point is not shown in FIG. 6D but could appear anywhere within the matrix (except in the "3" position because duplicate points have been removed) or a surrounding ring of points around the matrix. Of the points in the "2" and "3" positions, the one farthest from the third point (i.e., the point requiring the largest change in X and Y coordinate values to reach the third point) is discarded.

The compression algorithm as described requires that strokes exceeding 32 points (only 5 bits in point count) be broken into a series of "ministrokes." It also requires strokes having too radical a change of direction for direction change encoding to be broken into ministrokes, as in the case of a script "M." The resulting ministrokes are compression encoded as described above. Alternatively (or also), the stroke length could be set at 64 points (6 bits) or more for higher resolution digitizers. These encoded ministrokes are then concatenated to form the whole stroke, the last point of each ministroke being the 'start point' of a succeeding ministroke.

The main drawback of the original method is that it usually does not compress as well as the patented method. The extra bit used to indicate 'no change in direction' combined with the 2 bits used to indicate the end of the stroke will usually exceed the number of bits required to encode the stroke length required by the patented method. Another drawback is that the entire compressed stroke must be traversed in order to determine its length and thus its storage requirement. Its is easier to compress a stroke 'on the fly' using the original method because there is no need to backtrack and store a point count. If a fixed number of bits are allocated for the point count in the patented method, the original method might be able to encode as a single stroke as series of ministrokes that were encoded using the patented method. This would only occur if the ministrokes could not be represented as a single stroke because the point count overflowed.

A variation on this stroke compression method allows for compression of strokes having less momentum (i.e., many closely spaced direction changes). An expanded set of encoding values is employed:

EXAMPLE 2

| | |
|---|---|
| 1: | Move forward one point in the current direction |
| 000: | Move 1 point counterclockwise from the current direction and forward. The new direction becomes the current direction. |
| 001: | Move 2 points counterclockwise from the current direction and forward. The new direction becomes the current direction. |
| 010: | Move 1 point clockwise from the current direction and forward. The new direction become the current direction. |
| 011: | Move 2 points clockwise from the current direction and forward. The new direction becomes the current direction. |

After bridging gaps within a stroke, removing duplicate points and discarding extraneous "L" pattern points, the circle used in the first compression example would be compressed and encoded as follows:

| | |
|---|---|
| 01011 | Point count in stroke less 1 |
| 000 | Direction from starting point to point 2 |
| 010 | Change direction to right to get to point 3 |
| 1 | Continue in current direction to find point 4 |
| 010 | Change direction to right and down to get to point 5 |
| 010 | Change direction to down to get to point 6 |
| 1 | Continue in current direction to get to point 7 |
| 010 | Change direction left and down to get to point 8 |
| 010 | Change direction to left to get to point 9 |
| 1 | Continue in current direction to point 10 |
| 010 | Change direction to up and left to get to point 11 |
| 010 | Change direction to up to get to point 12 |
| 32 | bits |

As can be seen, the first compression method compresses the example stroke much more than the second compression method. This will not always be the case. Certain strokes will be compressed more using the second method rather than the first, for instance a stroke that varies more widely in direction than the example stroke. The point is that the program can analyze the stroke characteristics before applying a certain compression method to the entire stroke or a ministroke constituting a portion of the entire stroke.

What have been described are single pass methods for compressing strokes. A second compression pass can be applied to the compressed strokes, thus obtaining greater compression at the cost of additional compute time. In the examples shown, the repeating patterns of directional change can be compressed, using any of a variety of known pattern compression techniques. The program would determine whether any additional compression passes would be warranted. Returning to the original task of describing how strokes are processed and stored in the software system, let us review what has been covered:

Mapping a stroke on the screen to a document line;

Determining the line relative coordinates of the stroke within the document line; and Compressing the stroke.

What remains is a description of the approach used to store strokes within the document line data structure.

A document line consists of two distinct writing areas—the lined area and the unlined or margin areas. Within the margin areas, word wrapping is not supported; as such, strokes need merely be appended to a growing list of strokes associated with the document line. That is, the strokes are ordered by time.

Strokes within the lined area are stored differently due to the word wrapping nature of the lined area. See the discussion below on Break Point Gap Analysis: The Leftmost Positioning Method for details of the stroke ordering and storage.

Representation of ASCII Characters in a Format Compatible with Strokes

Binary encoded characters (e.g. ASCII characters) by definition are graphically defined elsewhere. There is no need for the processor to duplicate this information by storing it in a compressed stroke or bitmap format within the data structures comprising a line. The pieces of information that the processor needs in order for it to represent ASCII characters in a format compatible with strokes are:

The ASCII character code;

The position of the ASCII character within the document window;

Font and point size information.

The position of the ASCII character is determined by the processor using standard text spacing algorithms for downloaded ASCII text. For ASCII text that resulted from the translation of script, the processor replaces the script with ASCII text as the translation takes place. This typically results in a shrinkage of the script since the ASCII text characters will usually be smaller than the script characters and the user normally requests that consistent and standard spacing exist between characters within a word and between words within a sentence.

The position of the ASCII character, its font, and its point size are used to determine the character's starting point (origin), left-most point, and right-most point positions relative to the lined area beginning points along the left margin. This is the same sort of information that is maintained for strokes. Because strokes, ASCII characters and bit-mapped images are ordered by left-most point position, ASCII characters can be interleaved with strokes within the processor data structures, allowing for the consistent application of editing functions to the mixed data types. The processor must be aware of the distinction between data types when it must display the data. The stroke visual data will be derived from the compressed strokes and the ASCII character image will be extracted from a table addressed by ASCII character code.

Figure 9:
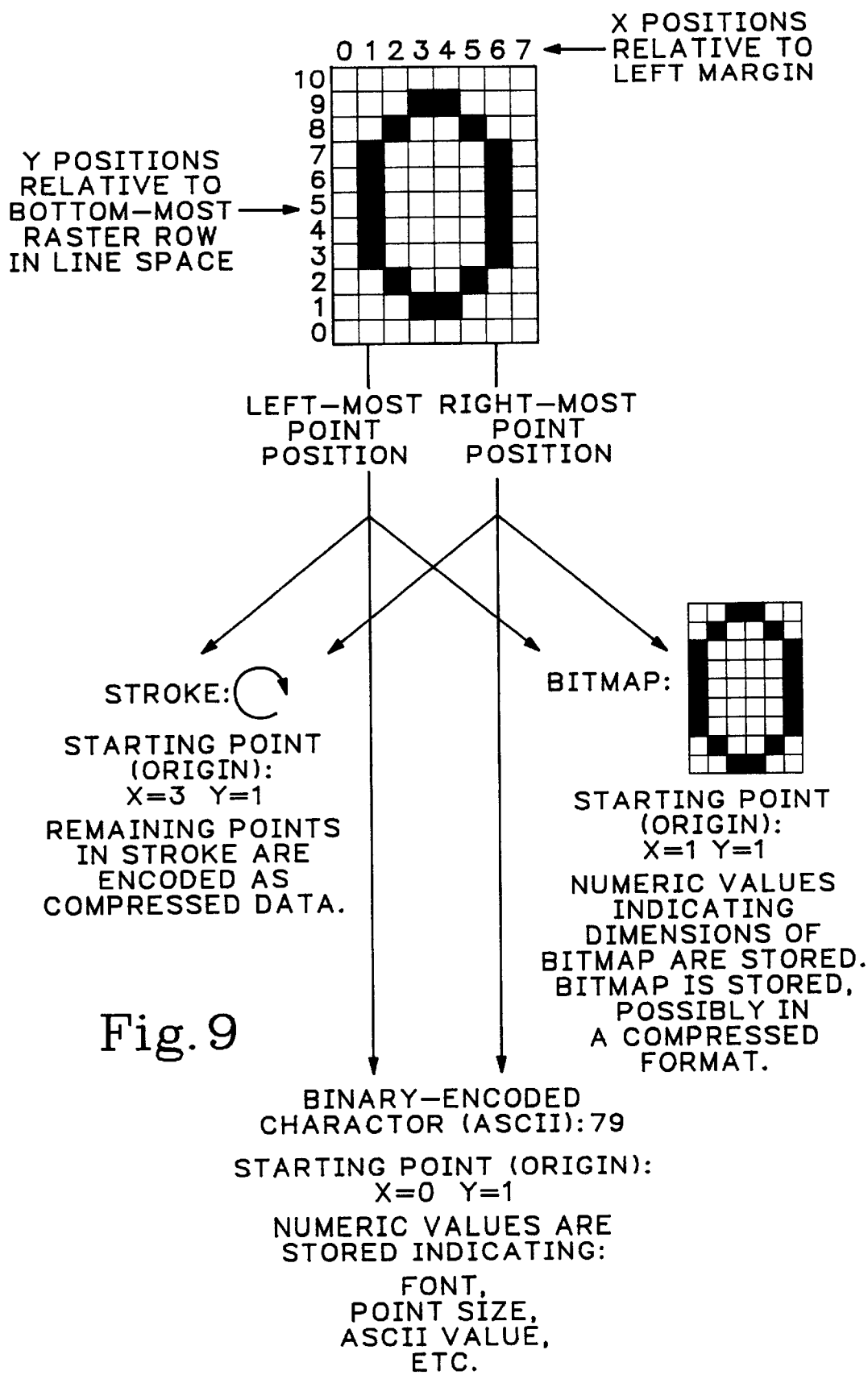
FIG. 9 is a diagram of a method for encoding script and ASCII text in internal document format according to the invention.

FIG. 9 shows that an "o" could exist in a pen-based system according to the invention as a stroke, an ASCII character, or a bitmap. At the simplest level, data within the system exists as a series of glyphs, each having a starting point (origin), a left-most point position, and a right-most point position. The starting point (origin) is used to position the glyph within the line space. Since the left-most and right-most point positions are encoded relative to the starting point position, they are automatically moved whenever the starting point position is moved, i.e., the stroke/character is shifted left/right. The left-most and right-most point positions are used to determine the breakpoints within a line (the word boundaries) as described above. The only time that the processor is (and needs to be) aware of the specific type of glyph (stroke, ASCII, or bitmap) is when it stores the glyph, when it determines word boundaries, and when it displays the glyph. At these times, glyph-specific data is required. Note in FIG. 9 that the starting point is not really glyph-specific even though it varies with glyph type. It still represents the anchor position for all glyphs and among all glyph types it is the point that moves.

In FIG. 9, all glyph types have the same left-most and right-most point positions (1 and 6 respectively). For purposes of determining word boundaries and word wrapping, these are the important variables.

Break Point Gap Analysis: The Left-most Positioning Method

In both hand printed and typed (or computer processed) documents, words are separated by a larger amount of space than that which separates characters within a word. The larger amount of spacing between words is the basis on which the invention determines word breaks, and accordingly, word wrap.

The invention employs a novel method for determining stroke-character word breaks. This method is referred to as the Left-most Positioning Method (LPM). LPM orders stroke images within a given line according to their left-most point position. Once a text line has been detected, LPM relies exclusively on a single axis for acquiring stroke positioning data. Therefore, strokes are ordered left to right in a stroke database. The time order of strokes entered can be maintained by time-stamping the strokes.

The Break Point Gap (BPG) value is predetermined at the outset of stroke position data capture. The BPG is calculated as a predetermined two dimensional area of points (a parallelogram such as a rectangle). For highly slanted text, a user-modifiable angle for the parallelogram can be determined from the user's writing.

As stroke data is captured, LPM relies on the BPG value for determining a word break. LPM performs a comparison between the (white space) value of the space between the right-most point position of the preceding stroke data, and the left-most point position of the current stroke data, with the BPG value. If the white space value is greater than or equal to the BPG value, then the LPM has detected a word break. Accordingly, LPM inserts a break point marker B (see FIG. 5B) at a location adjacent to the left-most point of the current stroke data.

If a user-modifiable slanted parallelogram is used, the LPM, the right-most and left-most point positions are determined according to the angle of the break point gap detection parallelogram. This implies that the left-most and right-most point positions maintained for each glyph will have to be recomputed if the detection parallelogram being used with the glyphs undergoes a change in slant.

Word Wrapping: Employing the Break Point Marker

Word wrapping is the process of filling lines of text and/or script and moving text/script that overflows the line space contents automatically to the succeeding line space. Word wrap is not mandatory until a text/script manipulation event occurs. When the system detects a text/script manipulation event, then word wrapping is invoked.

The word wrapping detection method involves "re-flowing" the text/script across line breaks. This is preferably done by comparing locations of break point markers (B in FIG. 5) with line delimiters (beginning and ending points 36, 38). If a stroke is detected as crossing the address of a line delimiter (or margin boundary), a word wrap is required. To wrap, the system parses backward searching for the last break point marker. Upon finding said marker, the system moves all text immediately following the marker to the succeeding line, and recursively applies the check for a margin boundary violation and again wraps the text/script until all text/script has been reflowed within the lines such that no strokes violate a margin boundary.

An alternative implementation would function as follows: Stroke data would continue to be added to the database, while the system compares the amount of data captured with the amount of line space allocated. As soon as stroke data is captured which, if placed on the current line, would exceed the margin boundary, a word wrap would be required. The actual wrapping would be triggered by some event or action that indicated the user had finished writing on the line. To wrap, the system would employ the recursive process described above.

WrapGap Analysis: The WrapGap Monitoring Method

Another of the many problems addressed by the invention involves maintenance of designated space between words. When editing script text, a means is required for adding and/or deleting white space to accommodate additional stroke data (more handscribed text).

To facilitate managing the white space between words, a variable called WrapGap is maintained that records the amount of white space between the left-most point of the first stroke of a word on a line and the right-most point of all strokes composing words on the preceding line, whenever the current line is viewed as an extension of the preceding line (i.e., no intervening BOL). By default, each line is assigned a WrapGap value that is equal to the BPG value. When word wrapping forward occurs, the WrapGap value shown graphically in FIG. 5B indicates the amount of space that must exist between the right-most point of the first word wrapping to a line and the left-most point of the first word currently on that line. The WrapGap must then be changed to reflect the spacing between the left-most point of the left-most wrapped word on a line and the right-most point of its former neighboring word on the preceding line. When the user deletes space or strokes, causing words to wrap backwards, the WrapGap value indicates the amount of space that must exist between the right-most point of the last word on the line where words will be wrapped back to and the left-most point of the first word that will wrap back to that line. The WrapGap must then be changed to reflect the amount of space between the right-most point of the last word wrapped back to a line, and the left-most point of the newly positioned first word on the succeeding line (where the words wrapped from originally).

Figure 5B:
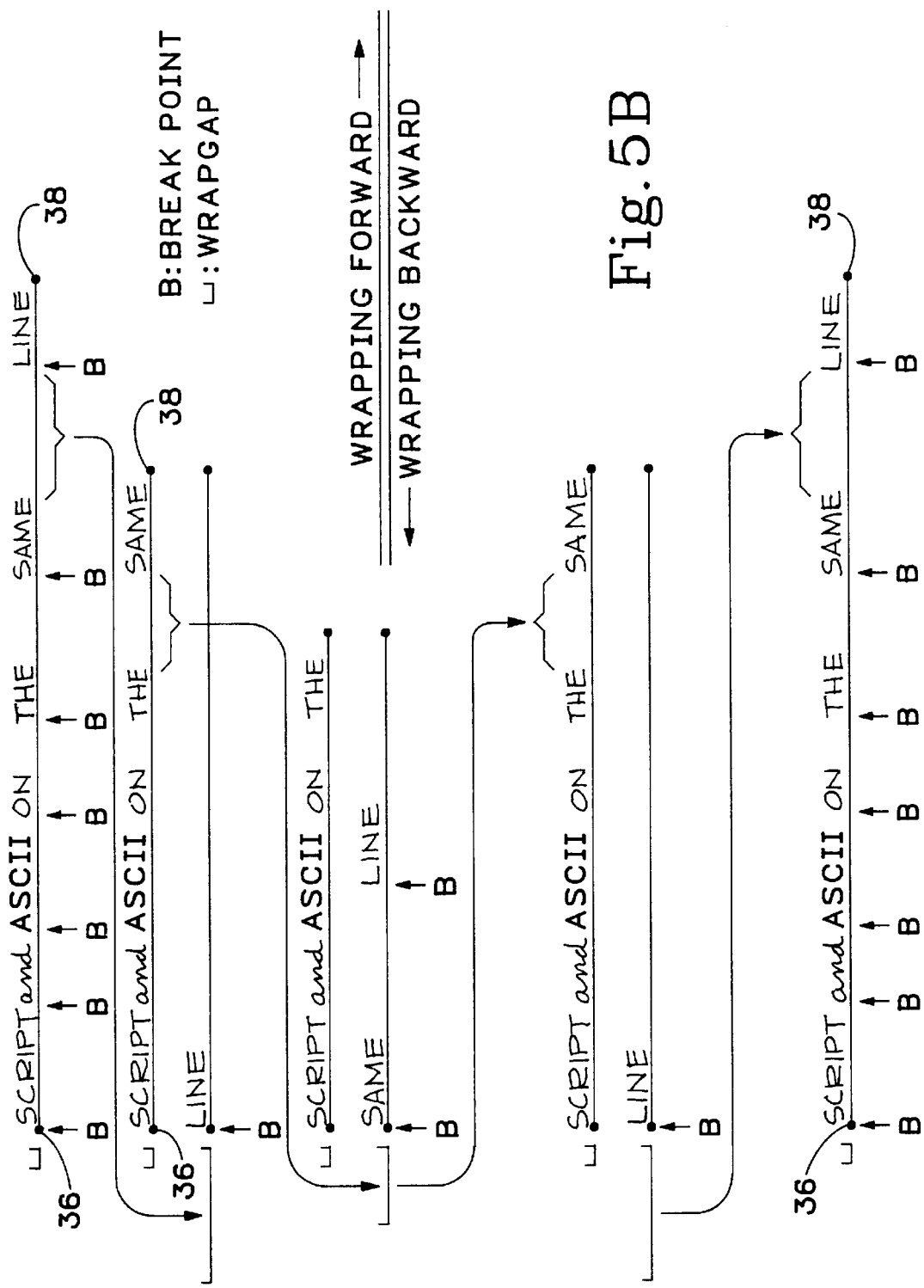

Another common case in which this feature is apparent is when changing line lengths (side margin widths). This case is shown in FIG. 5B, in which a line of script is shortened in successive steps and then returned to its original length. There are two additional cases where the WrapGap value can be modified.

Whenever a word wraps, a new WrapGap value for the line is computed. In the first case, a word may wrap because a significant amount of space is allocated preceding the word. Subsequently, a new word may be added on the preceding line within the previously allocated white space.

Therefore, the actual (desired) space or gap between the word beginning on the subsequent line and the word on the preceding line, has changed. This value is no longer the original value allocated between the last right-most point position of a preceding word and the left-most point position of the wrapped word. Rather, it should now be the value between the right-most point position of the added word and the left-most point position of the wrapped word. In this way, if a margin is subsequently increased, and/or some other editing function forces the wrapped word to return to the preceding line, or the added word to wrap onto the subsequent line, the actual space between the added word and the originally wrapped word will be properly maintained because the WrapGap value has been updated to reflect the modification. The user will have the option of disabling this WrapGap adjustment feature.

Another case for WrapGap value modification occurs when the user employs a "delete-space" gesture (refer to the discussion on "Gesture-Based Editing" below) following all strokes on a line space. With this gesture, the user causes words from the next line space to wrap back to the current line space. If there is a "Beginning of Line" (BOL) marker on the next line space, it will be removed. The system then determines whether the space consumed by the first word on the next line plus the break point gap (BPG) value represents an amount of space less than or equal to the open space available at the end of the line where the gesture was made. If so, then the system detects that at least one word can be wrapped-back and, therefore, proceeds to reduce the Wrap-Gap for that word only enough (if at all) to ensure that such word will wrap backwards (e.g., return to the preceding line space.)

A variation on this method would use the pen-up X-coordinate position of the Delete-Space gesture as the target position (or location) to which the left-most point of the first wrapped-back word should be "anchored." In such case, the WrapGap value for the first word to be wrapped back could be ignored. Only the space consumed by the strokes at the first word would be considered in determining whether the word can be wrapped back. If the word will fit within the space existing between the pen-up location and the right margin, the WrapGap value for the first word effectively becomes equivalent to the space existing between the right-most point of all strokes on the wrap-back line and the pen-up location.

EXAMPLE 3

FIGS. 7A through 7U show a series of screen displays for an operative example of the invention as implemented in a computer system arranged as in FIG. 1 with a stylus and contact and proximity-sensitive digitizer as the graphics input device. The document display is shown on a conventional graphics CRT monitor and the computer is a conventional Intel 386-based personal computer. The following figures show a basic subset of the operations that can be performed on a document display in accordance with the invention. This example shows the interactive manipulation of printed script, cursive script and small sketches within the lined area of the document display, and of drawings and script within the unlined or drawing areas and margins of the display. Although not shown in this example, ASCII text placed in the lined area will be handled and will behave during manipulation in essentially the same manner as script, and can be considered as represented in this example by the printed script.

FIG. 7A is a view of an initial screen display in which printed and cursive script have been manually entered by writing on the digitizer with a stylus. The document display 30 itself includes a top display margin, bounded by a pair of closely-spaced lines, containing title and command or menu lines. All actions in these areas are treated as commands and do not result in the entry of script. Besides, or instead of menu titles "edit" and "services," the command line can include icons (not shown). Below the double line is the display document itself, which is organized in pages.

As shown in FIG. 7 and 7A, the default structure of each page of the display has a series of parallel horizontal lines 34, each having vertically aligned beginning points 36 and end points 38. The lines themselves each define line spaces 39 of equal vertical width. The beginning and end points of the lines are spaced inward from the sides of the display to define the lengths of the lines (which can be varied) and width of left and right margins 40, 42 (which are likewise variable). The first line is spaced three line spaces below the top of the document display space defined by the double line. The spacing of the first line below the double line is sufficient to provide a single line space above the first line into which script or text can be entered and two additional line-space widths to serve as a top margin 44. A bottom margin 46 having a width of two line spaces is also provided. The top and bottom margins 44, 46 are treated as unlined space in the same manner as the left and right margins 40, 42. The top, bottom and left and right margins define an unlined drawing area which surrounds the lined script area. The margin areas can be slightly shaded to help distinguish them from the script lines.

Referring to FIG. 7B, the "insert space" gesture command has been performed in the first line of the script, immediately after the printed script. This was done by placing the cursor between the printed script and the first word of the cursive script, holding the stylus momentarily in one place in contact with the digitizer surface; then moving the stylus tip right-ward to an end point spaced inward from the ending point of the line, and lifting the stylus. This action has opened a length of line space defined by the length of the gesture in the first line. The computer document display has also responded to this action by pushing the script to the right of the insert point of the gesture toward the right in the first line, wrapping down into the second line and rightward in each successive line. After completion and execution of the insert space gesture, the user drew/wrote a large dot with a rightward-directed arrow, followed by the words "Insert Space Gesture" in printed script, into the space that had been opened by the gesture.

FIG. 7C shows editing of the text inserted in FIG. 7B. This is done by performing a "delete space" gesture, commencing after the word "insert" in FIG. 7B and extending leftward to the beginning of the arrow shown in FIG. 7B. This was followed by an "insert space" gesture to reopen space that the "delete space" gesture consumed. Then, a leftward-directed arrow was drawn in place of the rightward-directed arrow and the word "delete" was written where "insert" previously appeared.

Operation of the delete space gesture is further illustrated in FIG. 7D. When this gesture, or any gesture is performed, placing and momentarily holding the stylus in place on the digitizer causes the display to show a filled circle at the pen down location (after "gesture" in line 1). The filled circle serves as a "gesture prompt" to provide feedback to the user that the input device is now operative in the gesture mode. As soon as this gesture prompt is displayed, the user then drags the stylus leftward along the line space to be closed. The version of software operated in the present example actually draws a line through the space to be closed (and across the text to be deleted). This illustrates the principle of the two-part gesture prompt/gesture command structure, but display of the gesture is not essential. Alternatively, the command can be executed as the gesture is being made, as soon as the gesture's direction is determined. After executing the delete space gesture, the system closed the line space between the gesture prompt and the end point of the gesture, obliterating the text contained in the line space between such points. A variation on the Delete Space gesture has the strokes following the gesture on the line (if any) being left-justified at the pen up position for the gesture. Another variation has the strokes following the gesture on the line (if any) being left-justified at the left-most point position of any deleted strokes (i.e., the following strokes take the place of the deleted strokes). These variations enable easy maintenance of word spacing.

FIG. 7E shows the operation of the "insert BOL marker" gesture and its corresponding editing function. This editing gesture and function was performed after the word "script" in line 1. It has the effect of adding a beginning of line (BOL) marker at the insert location, that is, at the location where a gesture prompt appears upon commencement of the gesture, and then moving the affected text to the beginning (left margin, of the next line. Actually, all text on the line following the gesture prompt position is wrapped forward to the next line, that line then being prefixed with a beginning of line (BOL) marker. As the user continues to move the stylus downward across additional lines, the affected text moves with the stylus, leaving BOL-marked blank lines to fill the gap created by moving the text downward within the document. This can be seen by comparing FIGS. 7D and 7E.

FIG. 7F shows the same line, after doing a sketch of the gesture and a brief description of the gesture's function. FIG. 7G illustrates what will be done to close the added line. As the edited display of FIG. 7G states, the user executes a delete line contents gesture by placing the stylus on the point of the digitizer corresponding to a point on the second line of the display and, after receiving the gesture prompt, moves the stylus upward toward the first line.

FIG. 7H shows the screen display after execution of the delete line contents function. The third line of script is moved up into the second line, obliterating the script contents of the second line, and is followed by an upward shift of the contents of each subsequent line space. This editing function can be used on multiple lines of text.

As mentioned above, the document display preferably includes multiple pages. The pages are not isolated from one another, however, but permit script to be moved freely back and forth across page break boundaries. This is shown in FIG. 7I. To illustrate the point, the previously-entered script has been shifted downward (using the insert blank line function) to the bottom of the first page. Then, an insert moving space gesture was carried out in the third Sine of script immediately preceding the word "principles" to cause the last few words of script to word wrap off the end of the last line of the first page. In word wrapping, these words were pushed over the bottom margin, page break and top margin onto the first line of page 2 of the document display.

FIG. 7J shows the effect of entering additional script commencing at the point of the insert moving space gesture in the third line of script on page 1. The user has entered additional printed script, much as one would do in editing a document. Rather than filling a space of fixed length, however, using the insert moving space function causes space continually to be added to the lines ahead of the user's entry of script. Thus, the user has entered nearly two lines of script, extending over the page break onto the first line of page 2. Note that a length of open line space remains immediately preceding the word "principles," which space is the moving space defined by this function. Thus, the moving space as well as the text downstream from it is wrapped not only around ends of lines but across page breaks and margins. In doing so, the contents of the margins (none shown) are unaffected.

FIG. 7K shows closure or collapsing of the moving space, accomplished in the current implementation by attempting any gesture, including another insert moving space gesture.

When a moving space is collapsed, the spacing between the left-most point of the strokes following the moving space and the right-most point of the added strokes will be the space that existed between the initial strokes that were separated by the moving space. This means that if the space is opened within a word the open moving space will be collapsed to a smaller whitespace gap than if the space had been opened between words.

A variation on the moving space concept has the moving space sensitive to proximity. After moving space has been opened with the Insert Moving Space gesture, the moving space would collapse on pen-out-of-proximity and reopen on pen-in-proximity. This would allow the user to make multiple edits using moving space without having to explicitly open and close the moving space. When the moving space reopens, the position of the moving space within the text would reflect the position of the stylus in proximity. In this way the user could move the stylus around to preview various insert positions within words or lines. When pen down occurs, the moving space would shift according to the user's entered strokes. The Collapse Moving Space gesture (same as Insert Moving Space gesture) would end this process.

Another variation on the moving space gesture has the action of moving the pen to a vertical orientation causing a Moving Space Gesture prompt. The prompt would be an open space that would move with the pen (pen-in-proximity but not touching) as the user previewed moving space insertion positions within text. (The user need not hold the pen vertical once the prompt appears.) Pen-down would be the gesture that actually created a moving space. Until pen-down, insert positions would be previewed at varying degrees of resolution. Fast pen movement would preview insert positions between words and slow pen movement (over words) would preview insert positions within words. Returning the pen to the vertical position (after having been not vertical) would cause the moving space to be collapsed. If the pen tip had not been within (over) the moving space when the pen was positioned vertically then a new moving space would preview at the pen position.

As mentioned above, drawings can also be included in unlined areas of the document display and are not affected by editing functions performed on the contents of the lined area. To illustrate this point, FIG. 7L shows the previously-entered script moved back to the top of page 1. The "services" menu item has been invoked, followed by selection of the "insert ruler" command. FIG. 7L shows use of this command to cause two rulers to be drawn across the document display at about mid-screen. The rulers are shown as black horizontal bands across the document display. The final version of the product will have rulers containing graphics depicting the current margin settings. The top ruler is always present (although it may be hidden) and contains margin settings which can be set by the user wider or narrower than the default margins. The lower two rulers are placed by the user at locations designated by contacting the stylus to the digitizer at user-selected points.

Next, referring to FIG. 7M, using the stylus, the user selects a new line length within the area defined vertically between the lower two rulers. In the present software version, the user affirmatively selects the line length by drawing a gesture on the ruler from the left or beginning point of the line to a desired end point of the line. This procedure could be reversed, to define the margin or drawing area width between the rulers. Alternatively, an icon representative of this function could be provided which the user selects and simply draws a line vertically from top to bottom at a desired location along the lines to define the height and width of the lined space (or conversely the unlined space). This approach would automatically insert and position rulers where the user starts and stops the vertical line.

Reinvoking the "services" menu and selecting "hide rulers," leaves the document display of FIG. 7N. To illustrate subsequent points, the user has drawn a diagram of a pen-based computer in the unlined drawing area and has labeled the diagram "pen-based computer."

FIG. 7O shows the document display of FIG. 7N as the user makes a delete space gesture across some of the script in the second line of the display.

FIG. 7P shows the display after execution of the delete space function. This causes the contents of subsequent lines to word wrap or reflow upward to fill in the space occupied by the deleted line space contents. Note that reflow of the line contents has no effect at all on the drawing and script labeling within the unlined drawing area. As mentioned above, the gesture commands are context sensitive, dependent on where they are located, and will cause different things to happen if located in the unlined area than if located in the lined area.

FIG. 7Q shows an "insert lines" gesture performed in the left margin, and its effect which was to add three lines following line 2 of the document of FIG. 7P. Comparing FIG. 7Q with FIG. 7P, it should be noted that this command actually added more lines between the previously existing lines, rather than merely shifting the contents of lines 3, 4 and 5 downward. The result of this function was to shift the contents of both the lined area and unlined area below line 2 downward as a unit.

FIG. 7R contrasts the two functions performed by the insert lines gesture dependent upon where such gesture is performed. In FIG. 7R, the user has performed the insert lines (actually "insert BOL marker") gesture within the script in one of the lines alongside the drawing. The function corresponding to this gesture command is, as described above, to push the line space contents downstream of the pen down location of the gesture onto subsequent lines without moving or otherwise affecting the drawing. Note also that, during word wrapping, the software compares the length of words to the amount of space available in each line to determine whether there is sufficient space for the word. Thus, the word "character" in FIG. 7Q was too long to fit on the preceding line containing the word "unique." Similarly, in FIG. 7R, the word "unique" was too long to fit in the remaining space of the preceding line.

FIG. 7S shows the context sensitive nature of the delete lines gesture. This gesture was performed in both the lined area on the line preceding the word "operation" as indicated by the sketched arrow at that location, and in the unlined left margin at the location indicated by the upward-directed arrow in the margin. The delete lines gesture performed in the lined area shifted the script contents upward by one line, obliterating the words "gesture (lines)" and the downstream script or line contents reflowed upward to fill in the space left by the obliterated line contents. The delete lines gesture performed in the margin shifted all of the lines and the unlined drawing area upward by one line without any reflow of the document. If there had been any contents in the deleted line, these would have been deleted.

Figure 7T:
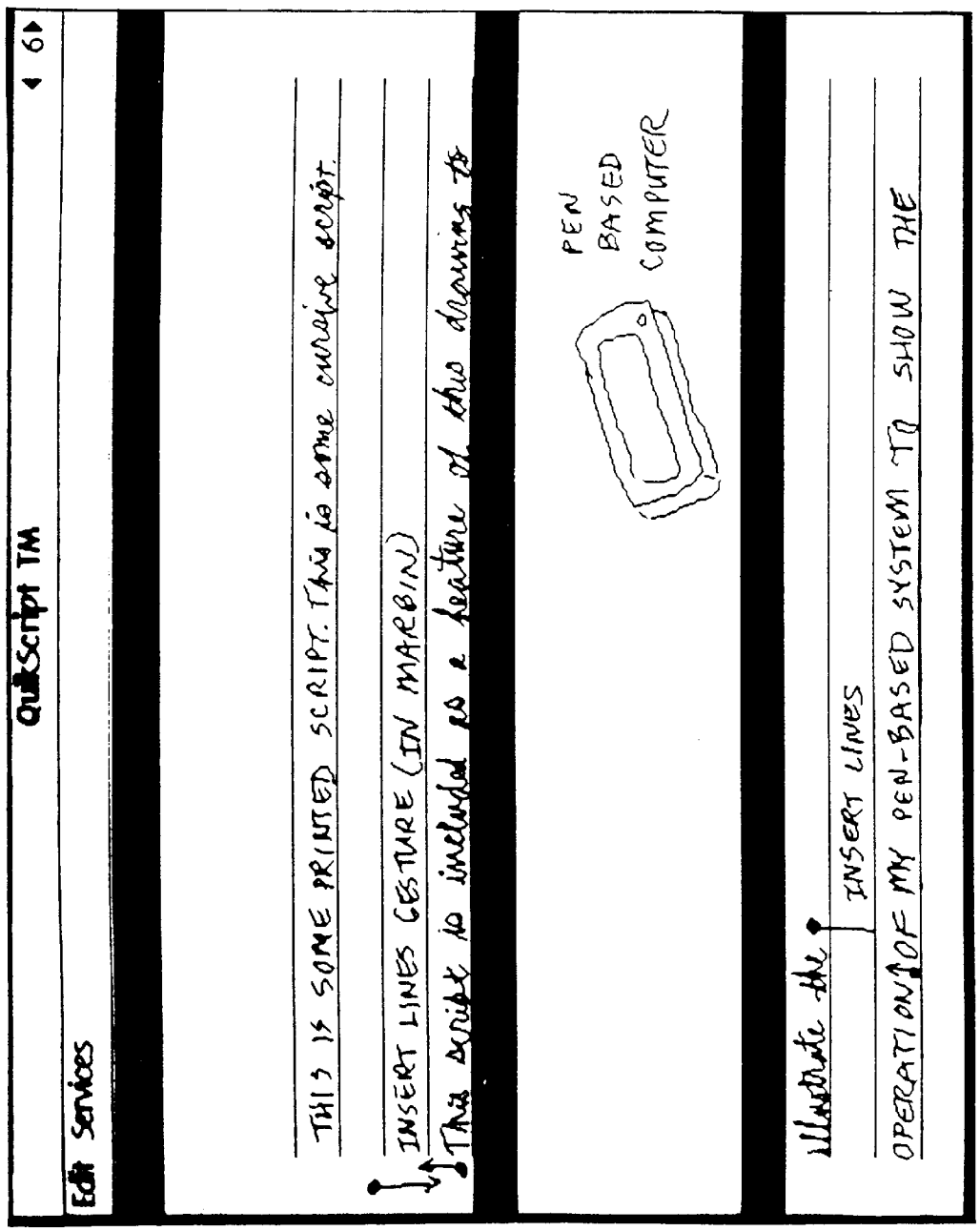
Figure 7U:
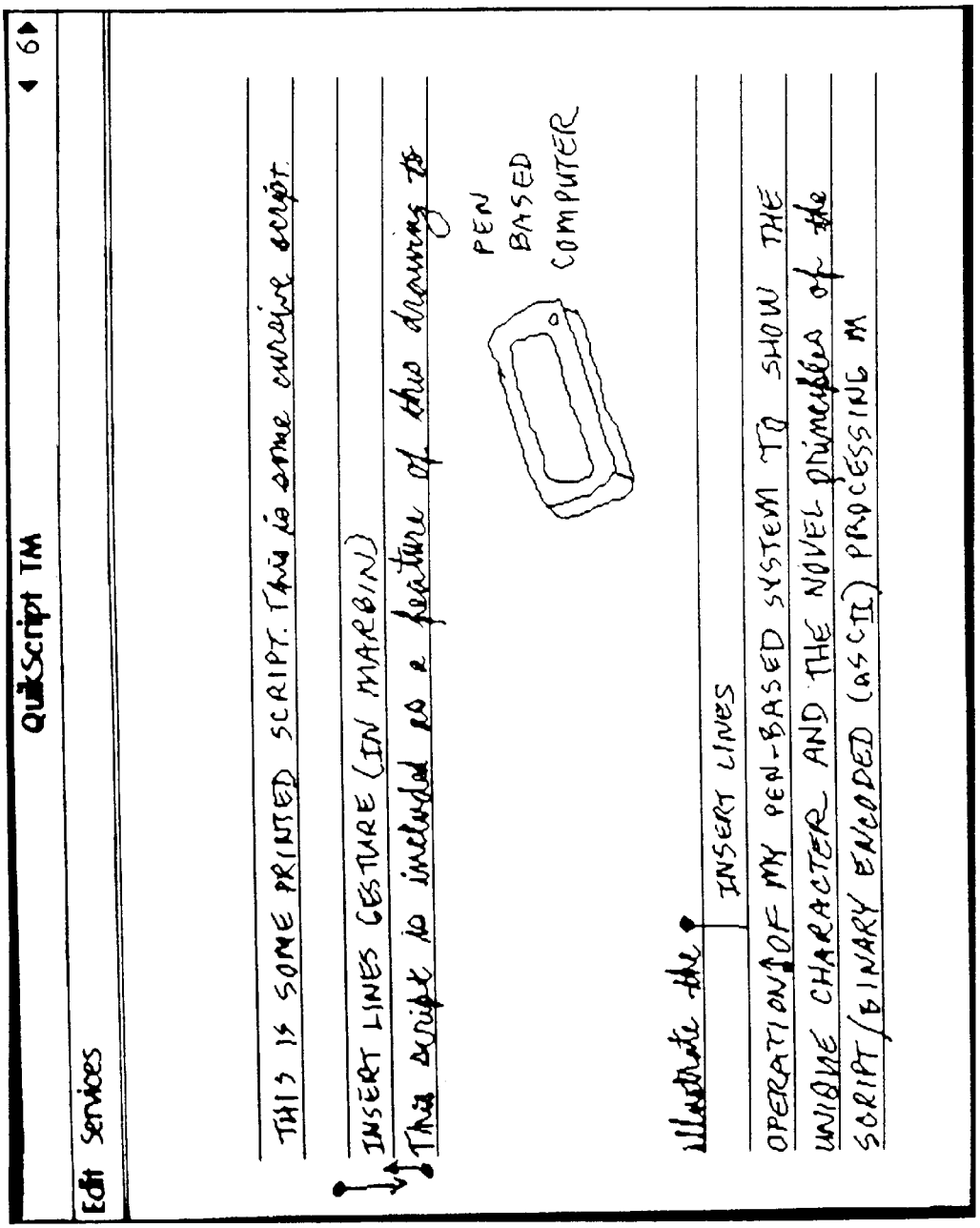

FIG. 7T shows the display after reinvoking the services menu, showing the rulers where they had previously been placed and collapsing the lines alongside the drawing area (that had previously been designated) to a length essentially equal to zero (actually one pixel in length with the beginning and end points of each line set equal). This function could also be incorporated into an icon. Upon removal of the rulers, the document appears as shown in FIG. 7U. Note that when the lines alongside the unlined drawing area were shortened, the contents of the line spaces wrapped downward to the first and subsequent lines below the drawing space. If space or script were added to the lines immediately preceding the drawing, for example, by using an insert moving space gesture, words from these lines would wrap across the drawing area to the lines below.

The foregoing summarizes the principal features of the gesture sets and their corresponding editing functions. As demonstrated above, these gestures can be used in various combinations to achieve different editing results. Other gestures and their corresponding functions are likewise operative in a consistent manner although not demonstrated in the foregoing example.

Fast Data Entry Using a Pen

The following describes how to provide pen-based computers with a method for fast and accurate text entry. Currently, pen-based computers allow the user to print characters and words which are then recognized by the computer. Some pen-based systems allow the user to hunt for characters on the image of a keyboard displayed on the screen. Neither of these methods is particularly fast or accurate—a printed character can be mis-recognized or a word can, be misspelled. The method next described can be used with any computer that employs a pointing device. The pointing device is used to choose among a set of characters presented to the user.

Figure 10:
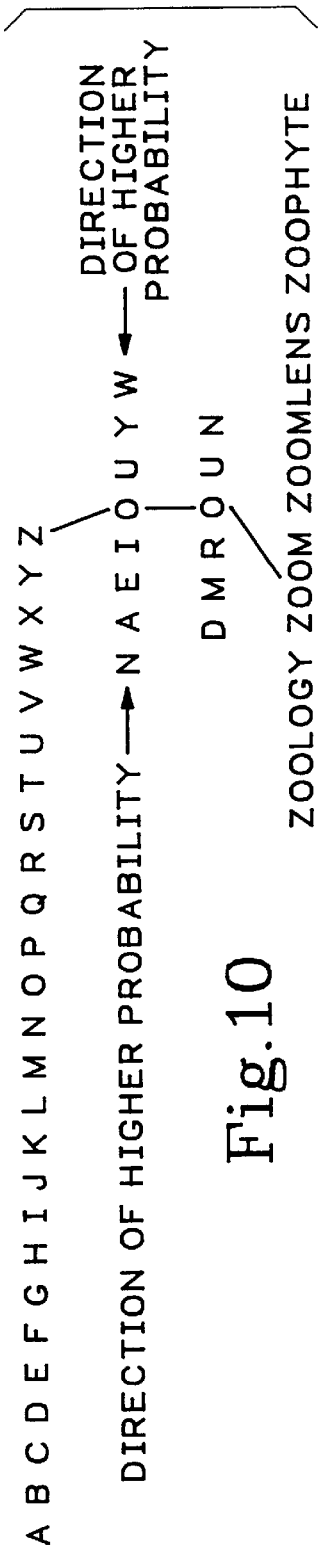
FIG. 10 is a diagram showing a method of text entry in a pen-based computer system.

The basic idea revolves around the fact that as each letter of a word is specified, the possible range of succeeding letters is narrowed in a manner determined probabilistically in the user's language (e.g., written English). Following an initial letter selection by the user, the most probable next character is presented to the user at a position closer to the pointing device than other characters available for constructing words. This allows the user to move the pointing device the shortest distance in order to specify the characters of a word. It also assures that the user ends up with a correctly spelled word because only those character sequences that spell words are presented to the user. An example is shown in FIG. 10. The initial range of characters is presented to the user in alphabetical order.

The user wants to spell "zoom" so "z" is touched with the pen, at which time the characters "n a e i o u y w" were presented, representing the most probable letters following an initial "z" in English words. These characters are arranged so that the most probable choices are closest to the initial "z." The user then touches the letter "o," at which time the characters "d m r o u n" are presented. Again these characters are arranged so that the most probable choices are closest to the last choice, "o." The user then touches the letter "o" in the latest set of characters and is presented with "zoology zoom zoomlens zoophyte." Rather than another set of characters, the user is provided with the entire set of words that exist containing the character sequence that has been specified so far. The user has already specified the word "zoo" by touching characters, but since the word "zoom" was desired, the user completes the word by touching the word "zoom." Since the pen has been touching the "paper" for the entire duration of the word specification, the user merely lifts the pen in order for the word to be appended to the line of text that he is creating. The user can now repeat the process to find (get) another word. If, during the word specification process, the user finds that he made a mistake (was heading in the wrong direction due to a bad preceding character selection), he can backtrack with the pen to undo preceding character selections.

The set of words available to the user when using this data entry approach can vary. For instance, the set of words could be restricted to chemical names in certain applications. Additionally, the positioning of characters following the initial character selection could change as the system learned the user's preferences for certain words. A simple implementation of this learning might be to switch the position of each character selection with its higher probability neighbor. Then, the more often a certain character is used, the closer it is positioned to the preceding character selection. If the user wants to enter a word that is not in the current dictionary (set) of words, that word could be spelled by tapping in the proper sequence of the word's characters on the initial alphabet line.

Detailed Description of Moving Space Processing

In the following description 'glyphs' should be interpreted as meaning strokes and/or ASCII characters and/or bitmaps.

Moving Space is an open (blank) area for data entry that shifts forward along a line as the user enters data. When all remaining space on a line is clear for data entry, a new moving space is opened at the beginning of the next line. This process can be used to open added writing space between words, within words, and even within blank lines. Once commenced, this process continues until the user performs some explicit action (e.g. Collapse Moving Space Gesture), or another gesture that reformats the text, at which time the moving space is collapsed. This process is described more fully below with reference to FIGS. 11A–11E.

Figure 11A:
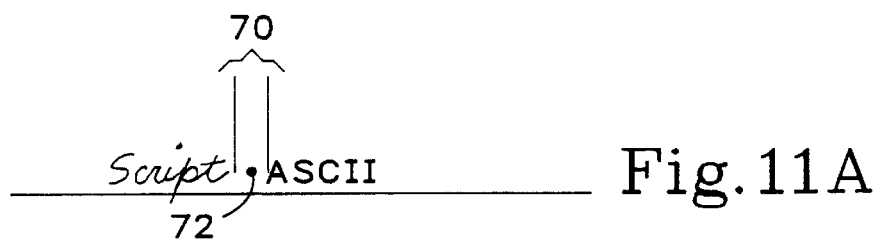
FIGS. 11A–11E are diagrams illustrating the opening, use and closing of moving space.

FIG. 11A shows an initial glyph spacing 70 existing before the Insert Moving Space Gesture is used. The user makes this gesture at a user-selected location in a line of glyphs to specify the starting position 72 for the moving space and initiate the Insert Moving Space function.

Figure 11B:
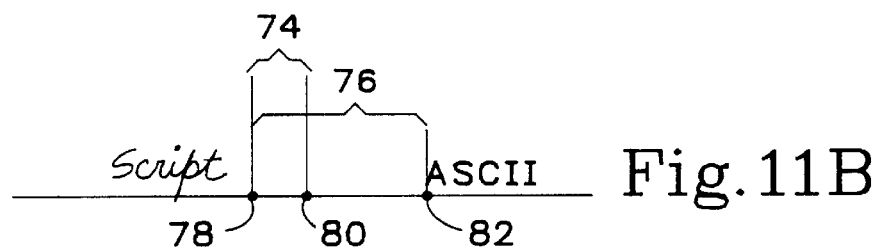

FIG. 11B shows inserted moving space having a left x position 78, a right x position 82, a moving space width 76, and a trigger point 80 specified by a trigger point offset 74.

Figure 11C:
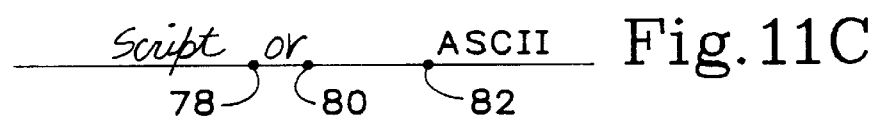

FIG. 11C shows the moving space after the word 'or' was written in it. Notice that a portion of the letter 'r' crossed the trigger point 80.

Figure 11D:
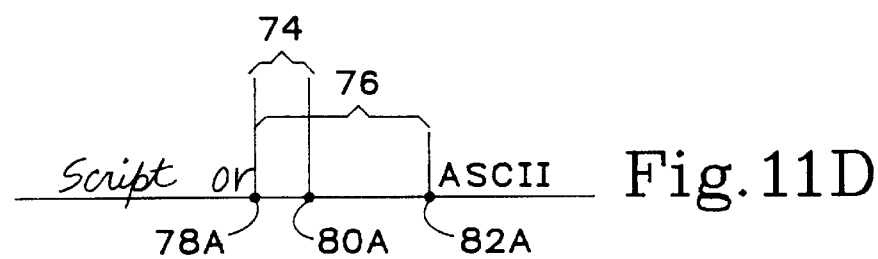

FIG. 11D shows the moving space after it has shifted right due to the trigger point 80 in FIG. 11C having been crossed. Notice that a new left x position 78A exists at the point where the pen was detected crossing the trigger point. A new trigger point 80A and right x position 82A also exist that are relative to the new left x position 78A.

Figure 11E:
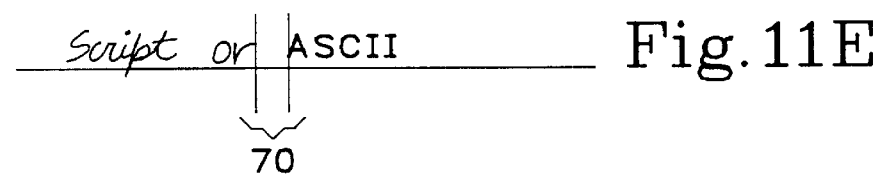

FIG. 11E shows the line of script after the moving space has been collapsed by a Collapse Moving Space Gesture. Note that the moving space was collapsed down to the initial stroke (word) spacing (70) that preceded the word 'ASCII' in FIG. 11A.

Following is a brief description of a set of subroutines, contained in a combination pseudo-code and structured English description in APPENDICES A–D, that implement various steps of the Moving Space Processing. In this description of the process, it is assume that glyphs are ordered within a line by their leftmost point position and that word wrapping is propagated through the document when the process is initiated. Before describing the subroutines, following are definitions of the variables used throughout.

Moving Space Processing Variable Definitions

MOVINGSPACELINE: The number of the document line (DL—See Conversion of Strokes, above) containing the moving space.

MOVINGSPACEACTIVE: Flag indicating whether moving space is currently active.

MOVINGSPACELEFTX: The left-most x position 78 of the moving space 76; initially point 72 in FIG. 11A.

MOVINGSPACERIGHTX: The right-most x position 82 (FIGS>11B–11D) of the moving space 76.

TRIGGERPOINT: The x position 80 (FIGS. 11B–11D) that, when crossed by the pen, will cause more moving space to be opened up. The TRIGGERPOINT controls the amount of input that can be received within the moving space before processing occurs to open up additional moving space. Since opening up moving space consumes a lot of time and results in a visual adjustment of data, the TRIGGERPOINT allows for the fine tuning of space opening so that the user is presented with the most pleasing moving space.

TRIGGERPOINTOFFSET: Offset 74 (FIGS. 11B and 11D) from the MOVINGSPACELEFTX for the TRIGGERPOINT. A separate TRIGGERPOINT OFFSET can exist for moving space initially opened within a word as opposed to moving space opened outside of a word. This value can be adjusted by the user, with a preferred default value and range established as follows:

Default value: Determined by software developer through user testing.

Range:
0<=TRIGGERPOINTOFFSET<MOVINGSPACEWIDTH

MOVINGSPACEWIDTH: The width 76 (FIGS. 11B and 11D corresponding to the number of data points contained within the moving space. A separate MOVINGSPACEWIDTH can exist for moving space initially opened within a word as opposed to outside of a word. This value can be adjusted by the user but should remain at least as large as the BREAKPOINTGAP.

Default value: user adjustable, e.g., 1 inch

The MOVINGSPACEWIDTH should be large enough so that the user will not be able fill the moving space with writing before the system has a chance to process the pen move events and open up additional space. Otherwise, the user might get the impression that ink dribbled,beyond the moving space and over existing glyphs is overwriting the existing glyphs, which it is not. When the system catches up with the user, the user will see that the new writing and preexisting glyphs are separated by moving space.

INITIALGLYPHSPACING: The amount of space 70 that existed between glyphs before the moving space separated them.

Range: 0<=INITIALGLYPHSPACING

SPLITSTROKES: User settable flag that indicates whether a stroke that crosses the starting position 72 specified during opening of moving space or during space insertion can be divided into multiple strokes.

MOVINGSPACETYPE: A value indicating whether the moving space was initially opened within a word or outside of a word.

AUTOSCROLL: Contains the line number (DL) of the document line that needs to be scrolled onto the screen for display.

WRAPGAP: Maintains a value indicating the spacing between words for word wrapping.

BREAKPOINTGAP: The amount of space that must exist between glyphs in order for a word boundary to be recognized.

Description of Subroutines

The subroutine described in APPENDIX A is a shared routine that is used in a number of other subroutines. It opens moving space at the beginning of a document line succeeding a current MOVINGSPACELINE. It causes the succeeding document line to become the current MOVINGSPACELINE, and then returns to the calling routine. The Insert Moving Space Procedure described in APPENDIX B is invoked when the user makes an Insert Moving Space gesture (FIG. 4F). This subroutine tests the location (72) at which the user has asserted the Insert Moving Space command to determine whether it is within a glyph (e.g., a script word), between glyphs as shown in FIG. 11A, or on a line which has no glyphs to the right of point 72. In the first case, the subroutine determines whether point 72 intersects any strokes, and if so it splits and saves the intersected stroke(s). In the second case, the subroutine determines that point 72 is between glyphs, and saves the initial glyph spacing 70 at that point as the variable INITIALGLYPHSPACING for restoration when the Collapse Moving Space Procedure, described below, is invoked. In the third case, when there are no glyphs on the current line to the right of the insertion point 72, the routine searches succeeding lines, so long as a BOL marker is not encountered, to find the next glyph and establish a WRAPGAP spacing as the INITIALGLYPHSPACING, and otherwise to establish the BREAKPOINTGAP as the INITIALGLYPHSPACING. Once this is done, the subroutine sets up the moving space, including establishing the MOVINGSPACELEFTX, TRIGGERPOINT, MOVINGSPACERIGHTX locations; shifting the glyphs to the right of the insert point 72 rightward and wordwrapping as necessary; and redisplaying the rearranged data with the inserted space. The amount or width 76 of inserted space is determined by the MOVINGSPACEWIDTH set by the user for the particular MOVINGSPACETYPE. The TRIGGERPOINTOFFSET 74 is likewise set by the user. In each case, default values can be set.

The Pen Down/Pen Moved Event procedure is implemented in the subroutine in APPENDIX C. This procedure, which is diagrammed in part in FIG. 3C, drives the moving space propagation. Whenever the stylus crosses rightward over the TRIGGERPOINT 80 (See FIG. 11C), this procedure essentially shifts the moving space rightward, shifting any glyphs located to the right of the moving space rightward along the current line and wrapping them down to a succeeding line when the right margin of the current line would be exceeded, as previously described. Then, the user can enter script in the moving space beginning at the user's customary spacing from the last glyph preceding the space. As the user writes in the space, the added script is displayed. When the script crosses the trigger point 80, this subroutine causes the computer and document display to supplement the added space and update the display. The trigger point and moving space width are preferably set so that the user can write for a comfortable distance without overwriting the glyphs at the end of the moving space and without having to update the display too often.

APPENDIX D describes an implementation of a Double Tap Event, which the user invokes while the moving space is active by tapping the stylus twice in a brief period of time in substantially the same location on the digitizer. There are certain instances when the user might want moving space propagation to continue without the user having to enter data (strokes) within the moving space in order to drive the propagation. One instance might be at the end of a line when the user knows a word would not fit in the space remaining on the line (including the space currently occupied by words that would be wrapped forward) but wants the moving space to propagate and move onto the next line. The user need merely double tap at a position to the right of the TRIGGERPOINT where it is desired that the next MOVINGSPACELEFTX be placed. The moving space will move and no data (strokes) will result from the double tap.

The Collapse Moving Space Procedure, shown in APPENDIX E, is invoked when the user again performs the gesture of FIG. 4F, to terminate explicitly the Insert Moving Space mode, or terminates such mode implicitly by invoking a reformatting procedure. Note: It is not possible for a stroke to begin to the left of the MOVINGSPACERIGHTX and pass over the MOVINGSPACERIGHTX because additional space will have been inserted (and MOVINGSPACERIGHTX will have been shifted) preventing the stroke from ever crossing the MOVINGSPACERIGHTX. Hence, any glyphs commencing to the right of MOVINGSPACERIGHTX are presumed to be pre-existing script, text or bit-mapped images, and are shifted accordingly as the initial glyph spacing 70 is restored upon collapsing the moving space.

An alternative to the specific implementation disclosed in the Appendices is a multi-tasking implementation of moving space. The multi-tasking implementation of moving space can be viewed as having two tasks. The first and highest priority task provides for dynamic moving space insertion and moving space line redisplay. The second task receives information from the first task concerning words that have been shifted over the MOVINGSPACELINE right margin. The second task bundles and wraps words forward to succeeding lines, redisplaying those lines that are currently on-screen and have been changed by the word wrapping.

Converting a Bit-Mapped Image

Additional formatting is required in order to manipulate a bit-mapped image using the above-described techniques. Bit-mapped images are typically generated by either a scanner or received from a facsimile (FAX) machine and thereafter input to the pen-based computer. The scanner/FAX optically scans an image on a print media and generates a matrix of bits representing the bit-mapped image. Each bit represents an individual image pixel. The bit is "ON" if the image pixel is visible, and the bit is "OFF" if the image pixel is invisible.

For the following discussion it is assumed that the scanned image is normalized (straightened out) either manually or programmatically and that the document contains only lines of text (possibly after any graphic areas have been blocked-out or excluded in some way). Another assumption, for simplicity, is that no point coordinate translations need to occur in order to account for differences in resolution between the document image and the corresponding script data structures. Further-more, the resolution of the document image must be high enough to perform the described operations. The following description refers to FIGS. 19A and 19B which illustrate a typical bit-mapped document displayed on a pen-based computer, according to the invention. A legend is included under FIG. 19B having symbols 1–9, referred hereinafter as legend symbols 1–9. Most symbols are shown around the perimeter of the display, however, the left/right margin legend symbol 7 is shown on the display for clarity. The legend symbols shown in FIG. 19 are not visible to the user on the display. Rather, the symbols are displayed in the drawing to illustrate graphically the description that follows. The symbols are merely representative of a corresponding data structure stored in the computer itself. Each legend symbol is described below.

The vertical bar symbols, i.e., legend symbols 1, 3, 4 and 5, indicate a height of the corresponding portion of the bit-mapped image. The left/right margin legend symbol 7 indicates the location of a left or right margin as described below. Baseline legend symbol 6 occur in pairs on opposite sides of the display and indicate that a baseline, described further below, spans across the display between the pair of baseline symbols. The legend symbols 8 and 9 are pointers to a top-most row and a left-most visible point of the displayed image containing a visible points, respectively. Legend symbol 2 indicates a middle row of a line space, the determination and use of which will become apparent in the description that follows.

The following description assumes that all horizontal point positions referred to in the following text are numbered in ascending order relative to a left-most visible point on the document image. The rows of points constituting the document image are numbered in ascending order relative to the top-most row containing visible points.

Converting a Faxed/scanned Image Into a Machine Editable Format

In its essence, converting bit-mapped images into a machine editable format requires the image to be decomposed into a series of lines and then mapping the glyphs existing on those lines to line spaces of the appropriate size in a corresponding machine editable document. This is most easily performed with a facsimile or scanned image of typed text. Line positions on document images containing typed text are easily distinguished due to the vertical whitespace (rows containing no visible points) that exists between the lines. All glyphs that fall within the vertical area delineated on either side by separation whitespace are considered to be rooted in the same line. Of course, the same is true for cursive/printed script document images where each line is separated by vertical whitespace. The following discussion therefore applies to all document images containing lines (of typed text or script) that are separated by vertical whitespace.

Finding the Separation Whitespace

Whitespace determination cannot simply identify any vertical separation of dots by no dots. Otherwise, e.g., the separation between the stem of the letter i and its associated dot would constitute whitespace. Neither should the separation immediately above an underline as a separation be considered a whitespace. The process therefore involves looking for a number of rows of whitespace that have been preceded by a number of rows containing visible points (the non-whitespace rows having been observed since the last separation whitespace was detected). The user-definable value for the number of whitespace rows should exceed the number of rows of whitespace that might immediately precede an underline. The user-definable value for the number of rows containing visible points should be greater than the number of rows covered by the dot on an 'i' or 'j'. For a low resolution image, the default for whitespace rows might be 2 and the default for non-whitespace rows might be 3.

Determining the Rows Used for Each Line of Text

In order to find the rows used by the first line of text (see legend symbol 1), the process begins at a top-most row in the document that contains visible points and proceeds downward looking for separation whitespace. Once found, the rows including the first row having visible points and continuing through the row preceding the separation whitespace are the rows used by the first line of text. The rows used by the next line of text are determined by finding a first row of visible points following the first separation whitespace and then searching for another separation whitespace. This process is repeated for all lines in the document.

Line Specific Characteristics

In order to create machine editable line spaces of the appropriate dimensions, certain characteristics for each line of text must be determined:
1) The baseline upon which each line of text is positioned;
2) The height of the line;
3) The line's left and right margins.

Determining the Baseline

A baseline of a line is a row of points that the descender in a letter descends beneath, e.g., "g". The baseline is determined by analyzing the bitmap containing the points for a line in the following manner.

Beginning at a middle row within a line of text (see legend symbol 2), the bits representing visible points on the row are counted. The count is saved and a row beneath the current row is examined. This process is repeated until a row containing only invisible points is encountered or a row containing only a fraction (user-definable value) of the number of visible points in the preceding row is encountered. In the first case, the line has no descenders so the baseline is the whitespace row above which all the visible points (characters) for the line reside. In the second case, descenders for the line have been detected. The baseline is positioned at the top of the descender(s) (ie. at the current row position) with characters having no descenders (the majority of visible points for the line) residing completely above the baseline. This process is repeated for all lines in the document image.

Determining Line Heights

Once the baseline for a line is determined, the height of the line is determined (see legend symbol 5). The height is the vertical space extending upward from a baseline (including the baseline) to a row immediately beneath a baseline of the preceding line. Since the first line on a document page is not preceded by a baseline, the height of the first line is the vertical space from the baseline to the line's top-most row containing visible points.

If the height of a line appears to be a multiple of the height of the preceding visible line and the rows occupied by the text above the baseline (see legend symbol 4) will fit into the vertical area given by the height of the preceding line then it is usually safe to assume that blank lines separate the two visible lines. (This can be seen by comparing FIGS. 19A and 19B. A blank line was detected preceding the word "signed"

in FIG. 19A and is shown resolved in FIG. 19B). The number of blank lines can be determined by applying the following equation:

No. blank lines=(height of current line/height of preceding line)−1

The blank lines are given the same height as the preceding visible line. The baseline position for each blank line is determined by adding the height of the blank line to the baseline position of the preceding visible/blank line. The new height for the current visible line is determined by subtracting from the old height the combined heights of any detected blank lines. This effectively allocates any fractional amount of vertical space remaining after computing the number of blank lines (ie. the remainder from the above division) to the current visible line.

Determining Line Margins

After the height of a line is determined, the left and right margins are determined. The left and right margins are also referred to as the beginning and end points, respectively. The left and right margins of a line (see legend symbol 7) are not always easy to determine. The text on a line can be indented to the right of the line's left margin or the text might not extend to the line's right margin. In both cases the margin under question is not visible and must be determined by some other means. As a simplifying assumption, the process assumes that the right margin for each line is at the right-most visible point position shown on the document image. The position of visible points on the lines preceding/following a current line is used to determine the current line's left margin.

The following structured English describes the steps used according to the invention to determine the left margin for each line. The Structured English description is sufficient to enable someone skilled in the art of computer science to write a computer program to implement the left margin determination process. The. description ignores blank lines, analyzing the lines as if all lines containing visible points were stacked on top of one another. A blank line inherits the margins of the preceding non-blank line.

Structured English for left Margin Determination

If determining the left margin for the first line on the document image then
    If the following line has its left-most point to the left of the left-most point on the first line then
        Set the left margin for the first line to equal the position of the left-most point on the second line. (The first line is assumed to be indented).
    else
        Set the left margin for the first line to equal the line's left-most point.
    endif
else
    If the current line has its left-most point at approximately the same position (plus/minus a user-defined amount) as the left-most point on the preceding line then
        Set the left margin for the current line to the same position as the preceding line.
    else
        If the current line has its left-most point to the left of the left-most point on the preceding line then
            Set the left margin for the current line to equal the line's left-most point
        else
            If the following line has its left-most point approximately at or to the right of the left-most point on the current line then
                Set the left margin for the current line to the line's left-most point.
            else
                Set the left margin for the current line to the left margin position of the preceding line
            endif
        endif
    endif
endif

Mapping the Document Image to Machine Editable

Once the document image is decomposed into a series of lines, each document line must be mapped to a corresponding machine editable line space. The following description maps an image line to a corresponding machine editable line. First, a series of machine editable line spaces each having the same height as the corresponding image line are created. The group of line spaces can be offset vertically within the machine editable document by a user-defined amount, for instance, to center the image on the computer display. The offset could be defined interactively by the user. The default value for the offset could be the number of rows (amount of space) that existed between the top-most row containing visible points on the document image and the top-most row of the document image.

Second, each line space is assigned a left and a right margin corresponding to the left and right margins of the associated document line that was previously determined. The line spaces can be offset to the left/right by a user-defined amount of space, for instance, to provide additional margin writing area. The default value for the offset could be the number of points (amount of space) that existed between the left-most visible point on the document image and the left-most point of the document image.

Third, the glyphs contained in each line of the document image are mapped to the machine editable line spaces. Prior to mapping the glyphs, however, all extraneous characteristics of the glyphs are removed. A typical case, and one described in detail below, is where the glyph is underlined. The underline is removed from the document image because they are not considered to be glyphs, rather they are characteristics of the overlaying glyphs.

Removing Underlines

Assuming the user-definable value for the baseline determination is set appropriately, all underlines in the document will reside below the baseline of a document line containing an underline. The underline removal procedure is repeated for each document line.

First, beginning at a row of points immediately following the baseline, examine a row of points looking for a series of visible points that exceeds a user definable value. Second, continue examining subsequent rows until either a separation whitespace is encountered or an underline series of points is detected. Third, if an underline series of points is detected, the dot positions of a first and a last dots in the series are added to a list of underline segments maintained for each line in the document image. Fourth, the points are then removed from the bit-mapped image, i.e., replaced with invisible points, one at a time by examining a point at the corresponding position in the row preceding the underline row. If the point is visible, the current underline point is not removed from the image because a descender probably crosses the underline at the current point.

Extracting Individual Glyphs from the Document Image

Once the underlines have been removed from the document image, the glyphs comprising the lines from the document image are mapped to a corresponding machine editable line space. In the preferred embodiment, the individual glyphs that together make up a document image are extracted into a collection of bitmaps—one per glyph. Alternatively, the glyphs can be maintained in a stroke form. The glyph extraction is accomplished by scanning the document image for a visible point. Starting at an initial visible point, all visible points connected directly or indirectly to the initial point are considered to be part of the same glyph. The bitmap used to hold the glyph image is rectangular in form having a width and a height. The width is determined by the distance (number of bits) between a left-most visible glyph point and a right-most visible glyph point. The height is the distance between the glyph's bottom-most visible point and a top-most visible point. The visible glyph points are moved from the document image to the bitmap rectangle for the glyph. The glyph bitmap is then mapped into the appropriate machine editable line space, as described below. This process is repeated for every glyph in the document image.

Mapping Glyph Bitmaps to Line Spaces

Each glyph (bitmap) is positioned in the machine editable line space at the same left margin relative horizontal position as the glyph had in the document image line. The baseline of a document image line corresponds to the bottom-most raster row of a machine editable line space. Each glyph is given the same baseline relative vertical position that it had in the document image.

A bit-mapped glyph has an origin corresponding to a left margin relative and bottom-most raster row (baseline) relative coordinate that indicates the position of a lower left corner of the glyph's bitmap in a machine editable line space. Any bit-mapped glyph that has a descender will have a negative vertical origin value because the bitmap will partially cross the bottom-most raster row of the line space. It is also common for glyph bitmap rectangles to partially overlap.

If, by examining the list of underline segments maintained for each line in the document image, it is determined that the current glyph being mapped to the machine editable line space was underlined, the glyph will be assigned an underline attribute within a machine editable data structure that maintains glyph characteristics. The machine will then display the underline when rendering the glyph on the screen.

Machine Editing Bit-Mapped Images

The preferred embodiment of the invention uses the left-most and right-most point positions of a glyph during editing operations. Rather than determine these values 'on the fly', these values are pre-computed and associated with each glyph. These values are maintained as horizontal offsets from the origin of the glyph. For bit-mapped glyphs, the left-most point position is at the same horizontal position as the origin. The right-most point position is 'bitmap width −1' points horizontally to the right of the glyph origin.

Beginning of Line (BOL) Markers

BOL markers are assigned to the appropriate machine editable line spaces using the techniques described in the Beginning Of Line Designation section hereinabove. For instance, all new machine editable line spaces containing glyphs that are preceded by blank lines would be assigned BOL markers.

Once the document image glyphs reside in the machine editable line spaces and the BOL marker positions have been determined, the FAXed/scanned document can be manipulated in the usual machine editable manner.

Moving Space Operation with a Keyboard

The normal method of data entry with moving space is through a pen stroke, but moving space will also allow keyboard input of binary encoded characters. The principles that apply to moving space input with a pen also apply to moving space input with a keyboard.

During keyboard input, a glyph is entered into the moving space as a result of a key being pressed. This glyph will typically be the bitmap of a character that is associated with the key being pressed. If the bit-mapped glyph is considered a single horizontal pen stroke moving from left to right and depositing in the moving space a column of glyph bitmap data where each point of the stroke would reside, it is easy to see that moving space operation described above does not need to change in order to support bit-mapped glyph entry.

Each column of points in the bit-mapped glyph, however, needs to be mapped to an appropriate position in the moving space. Also, it is assumed that each column (or group of columns) causes a pen moved event at the column's position in the moving space. This will cause the moving space to propagate in the usual manner. Typed characters' crossing the right margin would cause the moving space to move to the next line, along with any words that flowed over the right margin.

If the user presses the carriage return key, the moving space moves to the next linespace and a BOL marker is placed on that line. If the backspace key is pressed, the moving space shifts backwards to the position occupied before the glyph (bitmap/stroke) being deleted was manually/automatically entered. All relevant values, for example the MOVINGSPACELEFTX, are adjusted accordingly. The backspace key has the effect of reversing manual/automatic operations used to root a glyph in the line space. If the user does not desire to use a moving space for processing keyboard input, traditional methods of keyboard input could be employed.

Lineless Script Editing

In an alternate embodiment of the invention, a lineless screen is used. Many users may find the lines an artificial limitation on their script entry. It is likely that some users will want to write notes, letters, etc. on a blank page (screen) that does not contain any lines to suggest where words should be placed. Lineless is a misnomer, however. Although the user sees no visible lines on the screen, the invention imposes a best-fit line on the user's script, called a vector, in order to manipulate (edit) the user's script.

The lineless approach roots strokes relative to a center of a line vector. The strokes, e.g., words, slide along the vector, wrapping to the beginning of a subsequent vector. The vectors are straight lines that are placed at a best-fit angle through the points constituting a line. The following describes the conversion process from raw strokes to vectorized lines. The description is made with reference to FIGS. 12A–12D, which illustrate the process of converting the raw script input on a lineless screen to a machine editable format.

Targeting the Strokes

A rectangular input area 120 is defined that comprises a rectangle of points which contain the user strokes. Each point in the rectangle has an x and a y coordinate that is relative to an origin 122 of a lower left corner of the rectangle. As the user writes, each raw stroke is rooted at its pen down location. The temporal order of the strokes is recorded and the strokes are ordered according to their input time.

Analyzing a Series of Strokes

The strokes are analyzed on a line by line basis. Each stroke has a center of gravity (COG). The COG for each stroke is indicated by a dot in FIG. 12A proximately located to the associated stroke. Moving from the earliest stroke to the latest stroke, a change in the center of gravity (COG) between a current stroke and a subsequent stroke (or an end to the strokes) indicates that the user finished writing on one line and moved onto another line (or had finished writing for the time being).

The change in COG typically manifests itself as a change in the COG x coordinate position from its previous position by at least a certain user-definable value distance. The COG y coordinate position would also change from its previous position by a certain amount. For example, compare the COG of a stroke circle-A in FIG. 12A with the COG for a subsequent stroke circle-B. All strokes preceding the stroke that indicated a change in line (or all remaining strokes) would be associated with the same vector.

The line vector is determined from the points contained in the strokes for the line. A straight line that best approximates the center position of the points is computed, as shown in FIG. 12B, using any of a number of 'line fitting' algorithms. This line vector has approximately the same angle as the handwritten line. If a line vector already existed at the approximate location of the line vector computed with the current line data, a new line vector would be computed using a combination of the data from which the individual line vectors were derived. (This would accommodate the addition of text to an existing line, for instance).

Once the line vector is determined, breakpoint analysis is performed to determine the word boundaries within the line. The top and bottom edges of a parallelogram 124, for example, used in breakpoint analysis are parallel to the line vector. The strokes for the line are ordered by left-most x position (according to parallelogram slant) to enable efficient breakpoint analysis. Once the word boundaries are determined, all strokes for the line are then re-rooted relative (directly or indirectly through word root positions) to the vector line for the y-axis and to the vector line's left margin for the x-axis (the left margin having been determined using an approach similar to that described in the discussion of bit-mapped images above). This method, therefore, allows the line vectors (and thus the script) to be leveled and evenly spaced following the breakpoint analysis, as shown in FIG. 12C.

Edit Operations with Line Vectors

The edit operations defined hereinabove (including moving space) require detectable line space boundaries. All machine-editable editing features are available with line vectors once line space boundaries are determined. Line space boundaries are required if edits are targeted to specific lines based on a pen-down position. Line space vertical boundaries for line vectors are assumed to correspond to a mid-point boundary line between adjacent line vectors, as shown in FIG. 12B. A first line vector in the document (or section of the document) will have an upper line space boundary that is parallel to the line vector at a top-most visible point associated with the line. A last line vector in the document will have a lower line space boundary that is parallel to the line vector at a bottom-most visible point associated with the line. Accordingly, lineless documents do not have blank lines, per se. Although it may appear visually to the user that blank lines exist, the apparent blank lines are actually allocated to adjacent vectors.

Editing Enhancements using Line Vectors

Figure 12D:
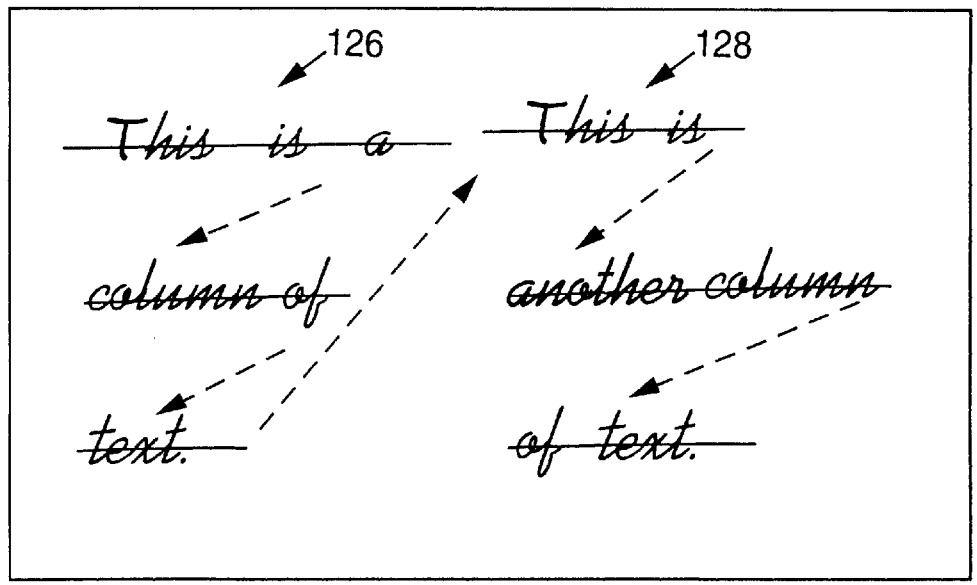

The word wrapping path among the line vectors in a document (section) can be inferred from the order in which the line vectors were created rather than from. the position of the line vectors. This allows, for instance, text to wrap from a last row in a first column to a first row in a second, parallel column where the first column was written before the second column. Two adjacent columns 126 and 128 are shown in FIG. 12D. The first column 126 was completely entered before the second column 128. Thus, even though the lines in each column are approximately collinear, the lines in each column have separate and distinct associated vector line, as shown in FIG. 12D, because the strokes are ordered temporally.

The line vector approach maps structures to existing strokes. In contrast, the line space approach maps strokes to existing structures. It is fairly easy using the line vector approach to correct for sloppy user input. Line vectors are determined dynamically and the data needed to perform handwriting adjustments is readily available as part of the process of determining individual line vectors. For instance, if the user wrote a document without the visual aid of lines to guide the positioning of text, odds are that the text would have some slant to it and the lines would not be evenly spaced. This can be corrected by reorienting the text on the display to remove any inherent slant by aligning each line vector level parallel with the display and respacing the line vectors consistently. Also, the spacing between words can be resized to a consistent spacing, as shown in FIG. 12C.

Having described and illustrated the principles of the invention in a preferred embodiment thereof, it should be apparent that the invention can be modified in arrangement and detail without departing from such principles. I claim all modifications and variations coming within the spirit and scope of the following claims.

APPENDIX A

| Shared Subroutine |
| --- |

```
Open_Moving_Space_At_Beginning_Of_Next_Line:
    Find the first line following the MOVINGSPACELINE
containing a lined area.
    If a line was found then
        MOVINGSPACELINE <- document line number of
        found line.
        If found line was marked with a Beginning Of Line (BOL)
        marker then
            Wrap forward the contents of the found line to
            succeeding line(s).
            Move the BOL marker to the succeeding line.
    Endif
Else
    Insert a line immediately following the MOVINGSPACELINE
    that contains a lined area (current implementation uses same
    margins as MOVINGSPACELINE).
    MOVINGSPACELINE <- document line number of the inserted
    line.
```

APPENDIX A-continued

Shared Subroutine

```
Endif
MOVINGSPACELEFTX <– left margin position of
                MOVINGSPACELINE.
TRIGGERPOINT <– MOVINGSPACELEFTX +
                TRIGGERPOINTOFFSET.
MOVINGSPACERIGHTX <– (MOVINGSPACELEFTX +
                MOVINGSPACEWIDTH) – 1.
If MOVINGSPACERIGHTX exceeds the MOVINGSPACELINE right
margin then
        MOVINGSPACERIGHTX <– right margin position for
                MOVINGSPACELINE
        Proportionately adjust the TRIGGERPOINT position within the
        compressed moving space.
Endif
Insert enough space at the beginning of the
MOVINGSPACELINE (by shifting any following glyphs right)
so that there is an open area of size
(MOVINGSPACERIGHTX – MOVINGSPACELEFTX) + 1.
Wrap forward to succeeding lines any words shifted over
the right margin by the space insertion.
If the MOVINGSPACELINE is off-screen then
    AUTOSCROLL <– MOVINGSPACELINE
Else
    Redisplay the MOVINGSPACELINE showing the inserted
    moving space.
Endif
Redisplay the lines following the MOVINGSPACELINE that are
on-screen AND whose contents changed due to the word
wrapping performed above.
Return to calling routine.
```

APPENDIX B

Insert Moving Space Procedure

```
If pen down occurred in a lined area then
    If (a stroke on the pen down line has a left-most x position
    preceding the pen down x position AND a rightmost x position at or
    following the pen down x position (i.e. a stroke crosses the pen
    down x position)) AND (SPLITSTROKES = true) then
        Repeat for each stroke crossing the pen down x position:
        Traverse the stroke until the pen down x position is reached, then
        split and save the stroke as 2 strokes. If the pen down x position
        was crossed from the left to the right then the first stroke will end
        to the left of the pen down x position and the second stroke will
        begin at the pen down x position. If the pen down x position was
        crossed from the right to the left then the first stroke will end at the
        pen down x position and the second stroke will begin to the left of
        the pen down x position. Continue the traversal using the second
        stroke, repeating the split, save, and traverse process everytime the
        pen down x position is passed until no stroke data remains.
    Endif
    Glyphs whose left-most x position is to the left of or at the pen down
    x position AND whose right-most x position is to the right of or at the
    pen down x position are considered to be at/following the pen down x
    position.
    If (the pen down line contains glyphs) AND (no glyphs
    exist to the left of the pen down x position) then
        INITIALGLYPHSPACING <– WRAPGAP for pen down line
        MOVINGSPACETYPE <– outside of word.
    Else
        If any glyphs on the pen down line are at/following
        the pen down x position then
        INITIALGLYPHSPACING <– the distance between the left-most
        point of the first glyph at/following the moving space insertion point
        (pen down x position) on the pen down line and the right-most x
        position of all glyphs preceding it on the line. Note that the
        INITIALGLYPHSPACING cannot be allowed to fall below 0.
        If INITIALGLYPHSPACING < BREAKPOINTGAP then
            MOVINGSPACETYPE <– within word.
        Else
            MOVINGSPACETYPE <– outside of word.
        Endif
    Else
```

APPENDIX B-continued

Insert Moving Space Procedure

```
        While no lines having a Beginning Of Line (BOL)
        marker are encountered, search for a succeeding line
        (SL) containing a glyph.
        If a non-BOL marked line (SL) containing a glyph was
        found then
            INITIALGLYPHSPACING <– WRAPGAP for SL.
        Else
            INITIALGLYPHSPACING <– BREAKPOINTGAP.
        Endif
        MOVINGSPACETYPE <– outside of word.
        Endif
    Endif
    Use the TRIGGERPOINTOFFSET, MOVINGSPACEWIDTH
    corresponding to the MOVINGSPACETYPE.
        MOVINGSPACEACTIVE <– true.
        MOVINGSPACELEFTX <– pen down x position.
        TRIGGERPOINT <– MOVINGSPACELEFTX +
        TRIGGERPOINTOFFSET.
    MOVINGSPACERIGHTX <– (MOVINGSPACELEFTX +
                            MOVINGSPACEWIDTH) – 1.
        MOVINGSPACELINE <– pen down document line number.
        Shift the glyphs at/following the MOVINGSPACELEFTX (pen
        down x position) on the MOVINGSPACELINE to the right
        beyond the MOVINGSPACERIGHTX so that an open area of
        MOVINGSPACEWIDTH exists.
        Traverse the glyphs on the MOVINGSPACELINE setting
        Breakpoints used for word wrapping.
        Wrap forward to succeeding lines any words shifted over
        the right margin of the MOVINGSPACELINE.
        Redisplay the MOVINGSPACELINE showing the inserted moving
space.
        If (the MOVINGSPACERIGHTX exceeds the MOVINGSPACELINE
        right margin) OR (glyphs existed at/following the pen down
        x position but were all wrapped forward when the moving
        space was opened up) then
            Perform Open_Moving_Space_At_Beginning_Of_Next_Line.
        Else
            Redisplay the lines following the MOVINGSPACELINE that
            are on-screen AND whose contents changed due to the word
            wrapping performed above.
        Endif
Endif
```

APPENDIX C

Pen Down/Pen Moved Event

```
If MOVINGSPACEACTIVE then
If the pen is on the MOVINGSPACELINE AND between the
TRIGGERPOINT and MOVINGSPACERIGHTX (i.e. if the pen is within
the moving space and at or to the right of the TRIGGERPOINT) then
    MOVINGSPACELEFTX <– pen x location.
    TRIGGERPOINT <– MOVINGSPACELEFTX +
                    TRIGGERPOINTOFFSET.
    new MOVINGSPACERIGHTX <– (MOVINGSPACELEFTX +
                            MOVINGSPACEWIDTH) – 1.
    Shift any glyphs following the old MOVINGSPACERIGHTX to the
    right (beyond the new MOVINGSPACERIGHTX) in order to have a
    MOVINGSPACEWIDTH quantity of space following the pen x
    location (MOVINGSPACELEFTX).
    Wrap forward to succeeding lines any words shifted over the
    MOVINGSPACELINE right margin.
    Redisplay the MOVINGSPACELINE showing the shifted moving
    space.
    If (the MOVINGSPACERIGHTX exceeds the
    MOVINGSPACELINE right margin) OR (no glyphs
    remain on the MOVINGSPACELINE following the
    moving space) then
    Perform Open_Moving_Space_At_Beginning_Of_Next_Line.
    Else
            Redisplay the lines following the MOVINGSPACELINE that
            are on-screen AND whose contents changed due to the word
            wrapping performed above.
```

APPENDIX C-continued

Pen Down/Pen Moved Event

```
    Endif
  Endif
Endif
```

APPENDIX D

Double Tap Event

```
If MOVINGSPACEACTIVE then
  If the pen is on the MOVINGSPACELINE AND between the
  TRIGGERPOINT and MOVINGSPACERIGHTX then
      MOVINGSPACELEFTX <- double tap x location.
      TRIGGERPOINT <- MOVINGSPACELEFTX +
              TRIGGERPOINTOFFSET.
      new MOVINGSPACERIGHTX <- (MOVINGSPACELEFTX +
              MOVINGSPACEWIDTH) - 1.
      Shift any glyphs following the old MOVINGSPACERIGHTX
      to the right (beyond the new MOVINGSPACERIGHTX) in
      order to have a MOVINGSPACEWIDTH quantity of space
      following the double tap x location
      (MOVINGSPACELEFTX).
      Wrap forward to succeeding lines any words shifted over the
      MOVINGSPACELINE right margin.
      Redisplay the MOVINGSPACELINE showing the shifted
      moving space.
      If (the MOVINGSPACERIGHTX exceeds the
      MOVINGSPACELINE right margin) OR (no glyphs remain
      on the MOVINGSPACELINE following the moving space)
      then
          Perform Open_Moving_Space_At_Begin-
          ning_Of_Next_Line.
      Else
          Redisplay the lines following the MOVINGSPACELINE that
          are on-screen AND whose contents changed due to the word
          wrapping performed above.
      Endif
  Endif
Endif
```

APPENDIX E

Collapse Moving Space Gesture

```
If MOVINGSPACEACTIVE then
    If a glyph having a right-most x position at or preceding the
    MOVINGSPACERIGHTX exists on the
    MOVINGSPACELINE (i.e., if a glyph precedes or is within
    the moving space) then
        Find the right-most x position (RX) of all glyphs preceding
        or within the moving space.
        If a glyph having a left-most x position following the
        MOVINGSPACERIGHTX exists on the
        MOVINGSPACELINE (i.e. if a glyph follows the moving
        space) then
            Find the left-most x position (LX) of all glyphs
            following the moving space.
            Adjust the space between RX and LX so that an
            amount of space equal to INITIALGLYPHSPACING
            exists. The space adjustment is accomplished by
            shifting to the left (to decrease space) or the right (to
            increase space) the glyphs at and following LX on the
            MOVINGSPACELINE.
            Traverse the glyphs on the MOVINGSPACELINE
            setting
            Breakpoints used for word wrapping.
            If the space between RX and LX was increased then
                Wrap forward to succeeding lines any words
                shifted over the MOVINGSPACELINE right
                margin.
```

APPENDIX E-continued

Collapse Moving Space Gesture

```
            Else
                Wrap backwards any words that will fit into the open
                space at the end of the MOVINGSPACELINE.
            Endif
        Else
            While no lines having a BOL marker are encountered, search for a
            succeeding line (SL) containing a glyph.
            If a non-BOL marked line (SL) containing a glyph was found then
                WRAPGAP for SL <- INITIALGLYPHSPACING.
                Wrap backwards any words that will fit into the open space
                at the end of the MOVINGSPACELINE.
                Traverse the glyphs on the MOVINGSPACELINE setting
                Breakpoints used for word wrapping.
            Endif
        Endif
    Else
        If a glyph having a left-most x position following the
        MOVINGSPACERIGHTX exists on the MOVINGSPACELINE (i.e.
        if a glyph follows the moving space) then
            Find the left-most x position (LX) of all glyphs
            following the moving space.
            Position LX (the glyph containing LX) at the left margin
            shifting to the left all glyphs following it on the
            MOVINGSPACELINE.
        Endif
        Wrap backwards any words that will fit into the open space at the end
        of the MOVINGSPACELINE.
        WRAPGAP for MOVINGSPACELINE <- INITIALGLYPHSPACING.
        Wrap backwards any words that will fit into the open space existing at
        the end of the line preceding the MOVINGSPACELINE.
        If the INITIALGLYPHSPACING was less than the
        BREAKPOINTGAP and glyphs preceding the moving space
        remain at the end of a first line and the glyphs following the
        moving space are on the second line because the combination of
        the two sets of glyphs will not fit on the first line, then the
        glyphs on the first line should be wrapped forward so that they
        can be joined with the glyphs on the second line.
        Traverse the glyphs on the line preceding the MOVINGSPACELINE
        setting Breakpoints used for wordwrapping.
    Endif
    Redisplay the MOVINGSPACELINE and any lines that are on-screen
    whose contents have changed due to the above actions.
    MOVINGSPACELINE <- null.
    MOVINGSPACEACTIVE <- false.
Endif
```

What is claimed is:

1. A computer method for automatically supplementing blank writing space on a dynamic document display containing a defined writing area as available writing space is filled, the method comprising:

forming a series of lines defining line spaces in the writing area;

identifying a range of the line spaces for entry of strokes by a user;

detecting a stroke entered in a line space beyond the identified range of line spaces;

detecting a predetermined user action indicating that the user has stopped writing in the line space beyond the identified range of line spaces; and automatically scrolling the dynamic document display to present one or more additional line spaces on the display, triggered by said user action.

2. A method according to claim 1 in which the additional line spaces containing blank space are scrolled to a position just outside the identified range of the line spaces.

3. A method according to claim I in which one or more additional line spaces containing blank space are scrolled into the identified range of the line spaces.

4. The method of claim 1 wherein detecting a predetermined user action comprises detecting that a user has stopped writing outside of a screen area boundary.

5. The method of claim 4 wherein automatically scrolling the dynamic document display comprises scrolling so that the input area resides within the screen area boundary.

6. The method of claim 4 wherein the screen area boundary is user-specifiable.

7. The method of claim 1 wherein automatically scrolling the dynamic document display comprises scrolling a number of additional lines equivalent to a number of lines used since a previous scrolling operation.

8. A computer-readable medium having computer-executable instructions for performing the method of claim 1.

9. A computer-implemented method, comprising:
providing a writing area on a display, the display connected to an input mechanism for displaying pen input data;
receiving pen input data as strokes; and
detecting that at least part of a stroke that does not correspond to an manual scroll command is outside of the writing area, and when detected, automatically scrolling the writing area until at least the stroke that was outside of the writing area is inside the writing area.

10. The method of claim 9 wherein automatically scrolling the writing area comprises providing blank lines in the writing area.

11. The method of claim 9 wherein automatically scrolling the writing area comprises providing a number of blank lines in the writing area, the number corresponding to a number of lines used since a previous scrolling operation.

12. The method of claim 9 wherein the writing area displays at least part of a document, and wherein automatically scrolling the writing area comprises appending blank lines to the document.

13. The method of claim 9 wherein the writing area is user-specifiable.

14. A computer-readable medium having computer-executable instructions for performing the method of claim 9.

* * * * *

UNITED STATES PATENT AND TRADEMARK OFFICE
CERTIFICATE OF CORRECTION

PATENT NO. : 6,487,570 B1
DATED : November 26, 2002
INVENTOR(S) : Forcier

It is certified that error appears in the above-identified patent and that said Letters Patent is hereby corrected as shown below:

Column 1,
Line 43, "scrip" should read -- script --.

Column 6,
Line 9, "formatted, according to the invention" should read -- formatted according to the invention --.
Line 28, "FIGS. 14A-14C are a top level diagrams" should read -- FIGS. 14A-14C are top level Diagrams --.
Line 35, "a input area" should read -- an input area --.

Column 7,
Line 22, "cm.) such as" should read -- cm) such as --.

Column 8,
Line 60, "FAXED)" should read -- FAXed) --.

Column 10,
Line 53, "document:Line" should read -- document: Line --.

Column 12,
Line 5, "line) of text.) This" should read -- line) of text. This --.

Column 16,
Line 13, "41" should read -- 4I --.

Column 18,
Line 67, "a input" should read -- an input --.

Column 22,
Lines 31-32, "(two lines meeting at right angles." should read -- (two lines meeting at right angles). --.

Column 24,
Line 20, "e.g. ASCII" should read -- e.g., ASCII --.

UNITED STATES PATENT AND TRADEMARK OFFICE
CERTIFICATE OF CORRECTION

Figure 70:
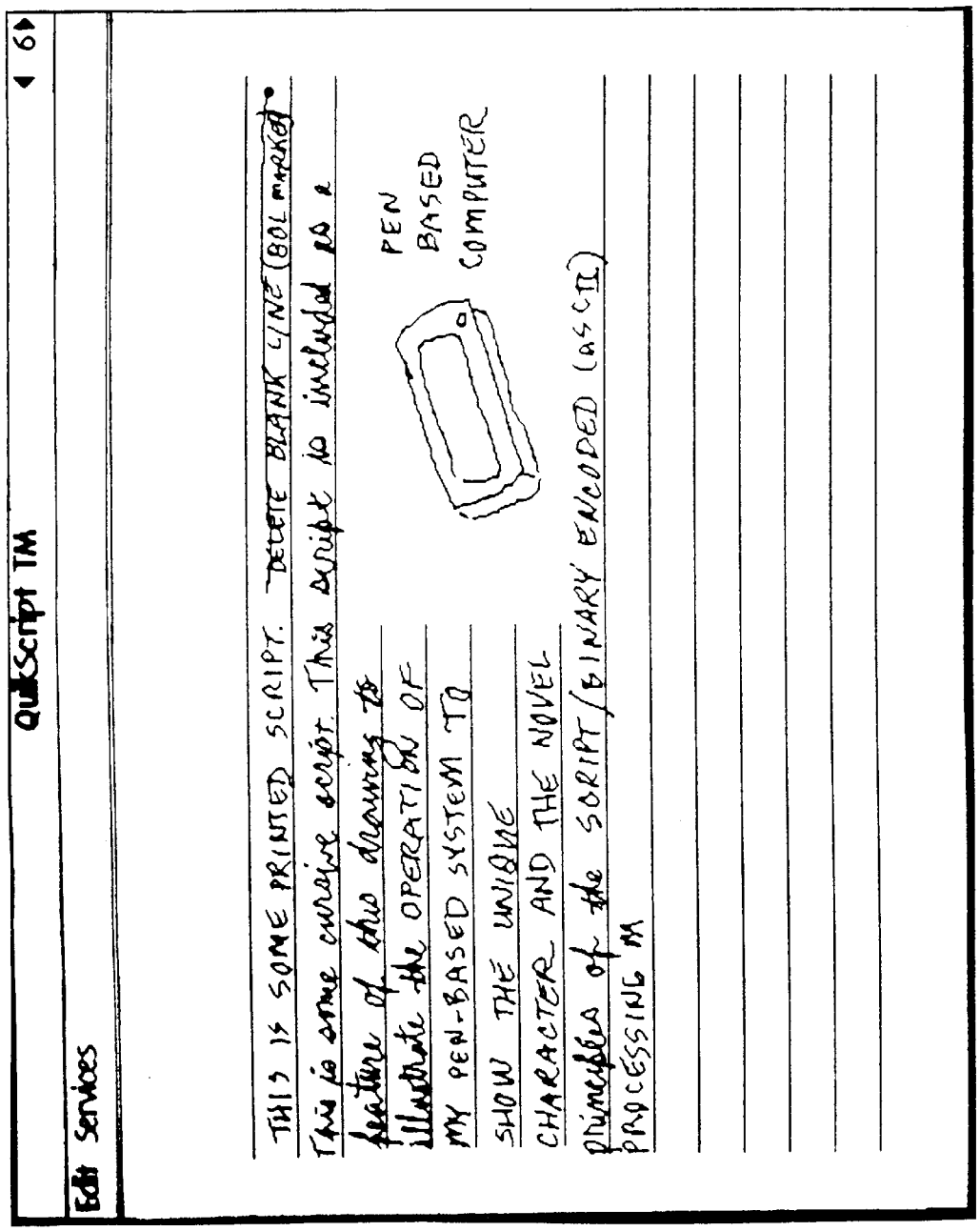

PATENT NO.    : 6,487,570 B1
DATED         : November 26, 2002
INVENTOR(S)   : Forcier It is certified that error appears in the above-identified patent and that said Letters Patent is hereby corrected as shown below:

Column 31,
Line 22, "FIG. 70" should read -- FIG.7O --.

Column 33,
Line 41, "e.g. Collapse" should read -- e.g., Collapse --.

Column 34,
Line 5, "it is assume" should read -- it is assumed --.
Lines 23-24, There should not be a line break between "The" and "TRIGGERPOINT".

Column 38,
Line 46, "ie. at" shouldread -- i.e., at --.

Column 39,
Line 14, "ie. the" should read -- i.e., the --.

Column 48,
Line 62, "claim I" should read -- claim 1 --.

Column 49,
Line 19, "an manual" should read -- a manual --.

Signed and Sealed this

Second Day of August, 2005

JON W. DUDAS
*Director of the United States Patent and Trademark Office*